United States Patent
Sekiguchi et al.

(10) Patent No.: US 7,738,337 B2
(45) Date of Patent: Jun. 15, 2010

(54) OPTICAL INFORMATION RECORDING DEVICE, OPTICAL INFORMATION RECORDING METHOD, AND SIGNAL PROCESSING CIRCUIT

(75) Inventors: Mitsuo Sekiguchi, Gunma (JP); Hiroya Kakimoto, Gunma (JP); Isao Matsuda, Gunma (JP); Yoshikazu Sato, Gunma (JP)

(73) Assignee: Taiyo Yuden Co., Ltd. (JP)

( * ) Notice: Subject to any disclaimer, the term of this patent is extended or adjusted under 35 U.S.C. 154(b) by 1114 days.

(21) Appl. No.: 11/390,686

(22) Filed: Mar. 28, 2006

(65) Prior Publication Data

US 2006/0256690 A1    Nov. 16, 2006

(30) Foreign Application Priority Data

Mar. 29, 2005   (JP) ............................. 2005-095241

(51) Int. Cl.
*G11B 7/00* (2006.01)
(52) U.S. Cl. .............. 369/59.12; 369/47.11; 369/47.53; 369/59.11; 369/116
(58) Field of Classification Search ............. 369/47.11, 369/47.53, 59.11, 59.12, 116
See application file for complete search history.

(56) References Cited

U.S. PATENT DOCUMENTS

| | | | | |
|---|---|---|---|---|
| 7,136,335 | B2 * | 11/2006 | Yumiba et al. | 369/47.28 |
| 7,139,228 | B2 * | 11/2006 | Gushima et al. | 369/53.12 |
| 7,190,651 | B2 * | 3/2007 | Gushima et al. | 369/59.12 |
| 7,236,438 | B2 * | 6/2007 | Furumiya et al. | 369/59.12 |
| 7,420,901 | B2 * | 9/2008 | Yokoi | 369/47.53 |
| 2002/0041554 | A1 * | 4/2002 | Kitamura et al. | 369/53.37 |
| 2004/0257952 | A1 * | 12/2004 | Kimura | 369/59.12 |
| 2005/0157620 | A1 * | 7/2005 | Narumi et al. | 369/47.53 |
| 2006/0203674 | A1 * | 9/2006 | Schreurs et al. | 369/59.11 |
| 2007/0121450 | A1 * | 5/2007 | Shoji et al. | 369/47.53 |
| 2007/0127343 | A1 * | 6/2007 | Tseng et al. | 369/59.12 |
| 2008/0008063 | A1 * | 1/2008 | Van Endert et al. | 369/47.5 |
| 2008/0074969 | A1 * | 3/2008 | Miyashita et al. | 369/47.53 |
| 2008/0205231 | A1 * | 8/2008 | Miyashita et al. | 369/53.36 |

FOREIGN PATENT DOCUMENTS

| | | |
|---|---|---|
| EP | 1033704 A1 | 9/2000 |
| JP | 2000-276734 | 10/2000 |
| JP | 2002-208139 | 7/2002 |
| JP | 2003-30837 | 1/2003 |
| JP | 2004-110995 | 4/2004 |
| JP | 2004-234698 | 8/2004 |

* cited by examiner

*Primary Examiner*—Wayne R Young
*Assistant Examiner*—Brenda Bernardi
(74) *Attorney, Agent, or Firm*—Chen Yoshimura LLP

(57) ABSTRACT

It is an object of certain inventive aspects to provide a recording condition closer to an optimum even for a medium unknown to a drive, and more particularly, to provide means for obtaining a preferable recording condition even for a high-speed recording in which conducting a test recording is difficult. In order to accomplish the object, a power and a phase of a recording pulse are simultaneously corrected at predetermined timing, depending on a recording speed or a recording position such as an inner or outer circumference. For instance, a phase shift ΔPhase generated due to a continuing recording from an inner circumference to an outer circumference at ×2 speed is corrected simultaneously with a correction of a power shift at the timing when a recording speed is changed from ×2 to ×4. For the other recording speed, in the same manner as above, a power and a phase shift are simultaneously corrected at every time when a recording speed is changed.

6 Claims, 34 Drawing Sheets

(a) Configuration of a recording pulse (b) Entire flow for determining a recording condition (a) Configuration of a recording pulse (b) Entire flow for determining a recording condition Fig. 5
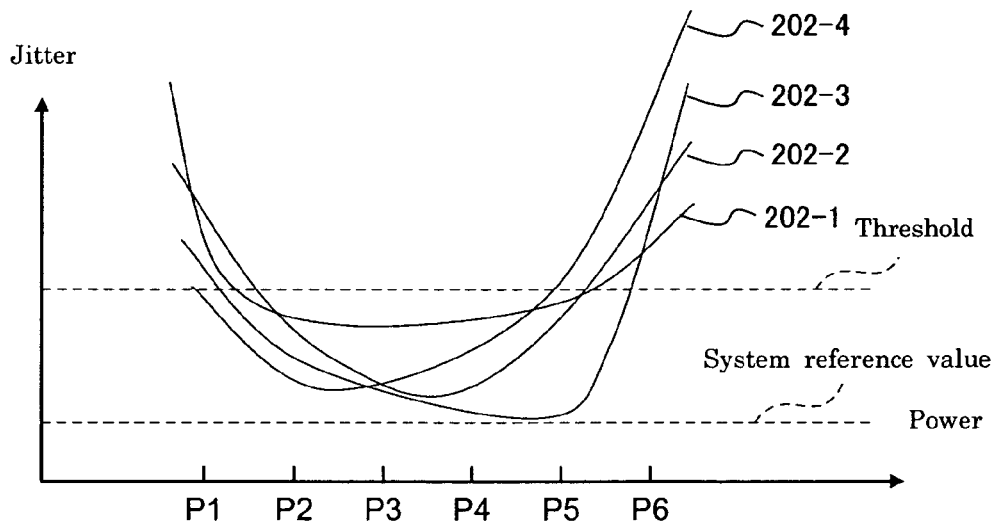
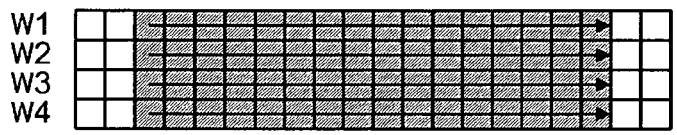
Fig. 6
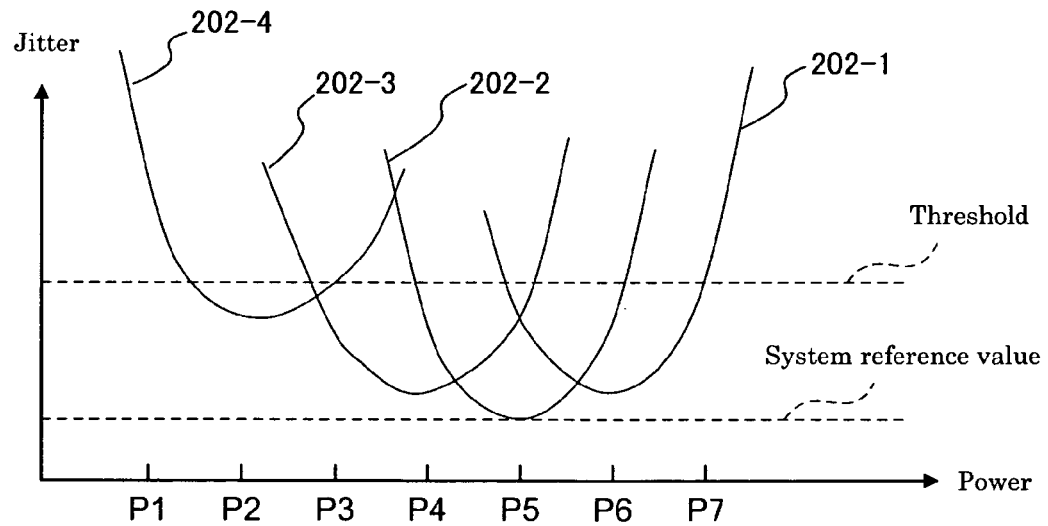
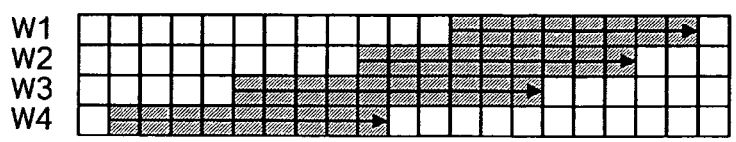

Fig. 9
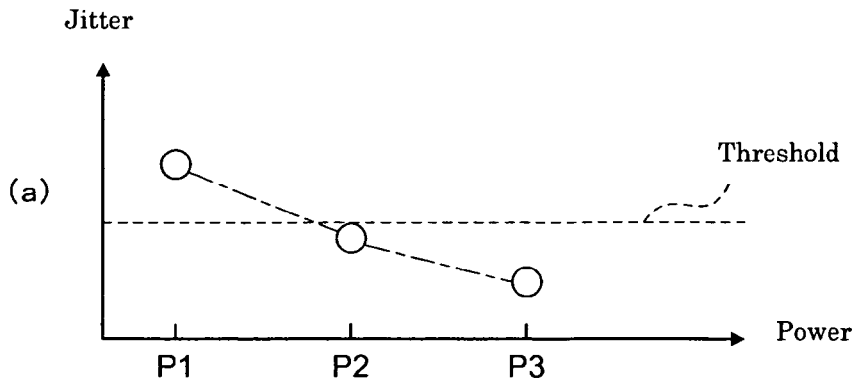
(a)
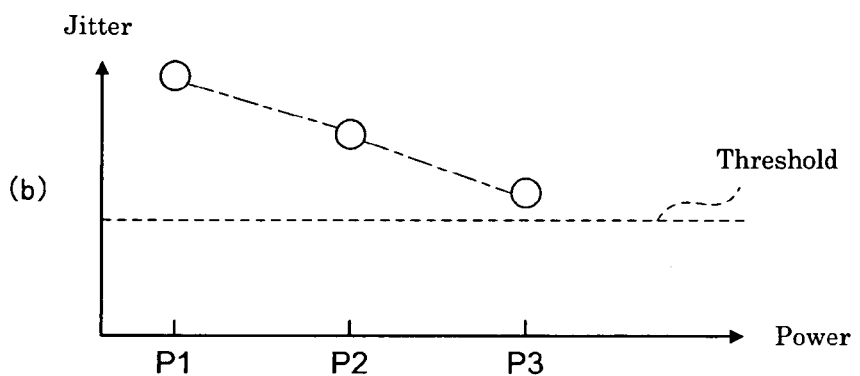
(b)
Fig. 10
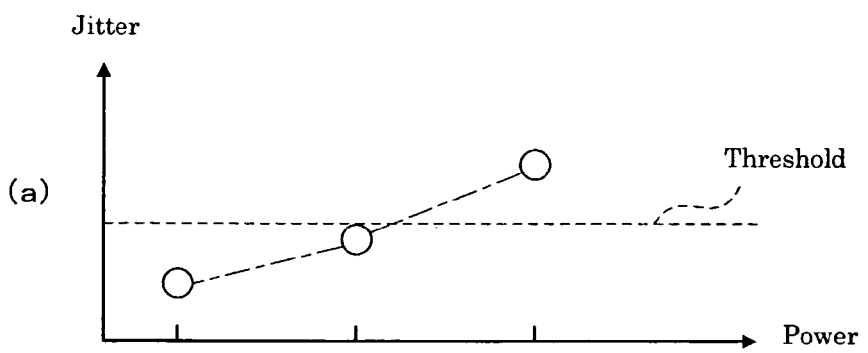
(a)
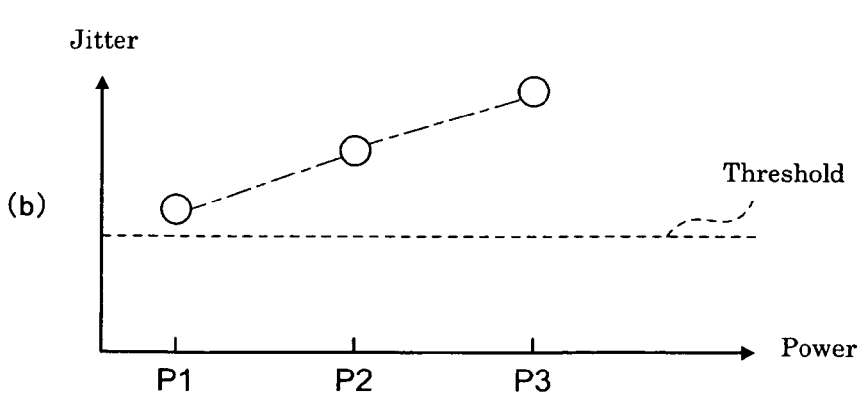
(b)

Fig. 13

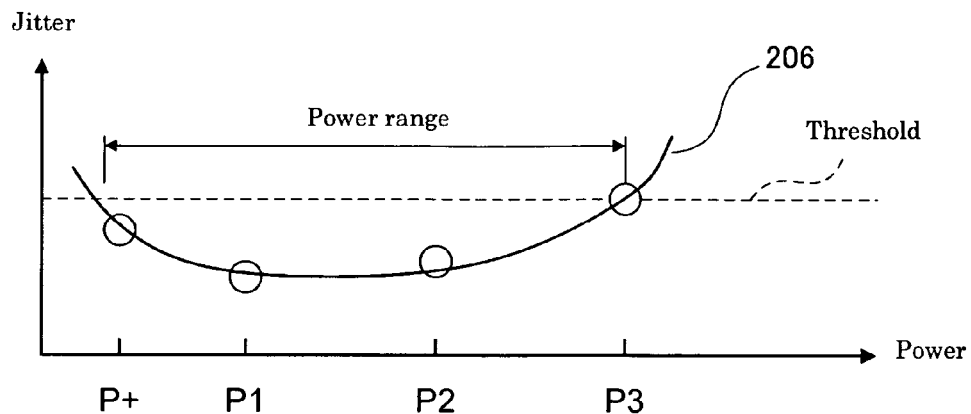

Fig. 14

| Pattern | Shape | Relation with threshold | Prediction of recording characteristics | Pulse width |
|---|---|---|---|---|
| 1 | Given | Max. jitter ≤ threshold | Same sensitivity | ±0.2T |
| 2 | Downwardly convex | Min. jitter ≤ threshold | Same sensitivity | ±0.1T |
| 3 | Downwardly convex | Min. jitter > threshold | Same sensitivity and large difference in feature | ±0.2T |
| 4 | Downward-sloping | Min. jitter ≤ threshold | Slightly lower sensitivity | +0.1T, +0.2T |
| 5 | Downward-sloping | Min. jitter > threshold | Significantly lower sensitivity | +0.2T, +0.4T |
| 6 | Upward-sloping | Min. jitter ≤ threshold | Slightly higher sensitivity | −0.1T, −0.2T |
| 7 | Upward-sloping | Min. jitter > threshold | Significantly higher sensitivity | −0.2T, −0.4T |
| 8 | Upwardly convex | Max. jitter > threshold | NG | ±0.2T |

Fig. 19
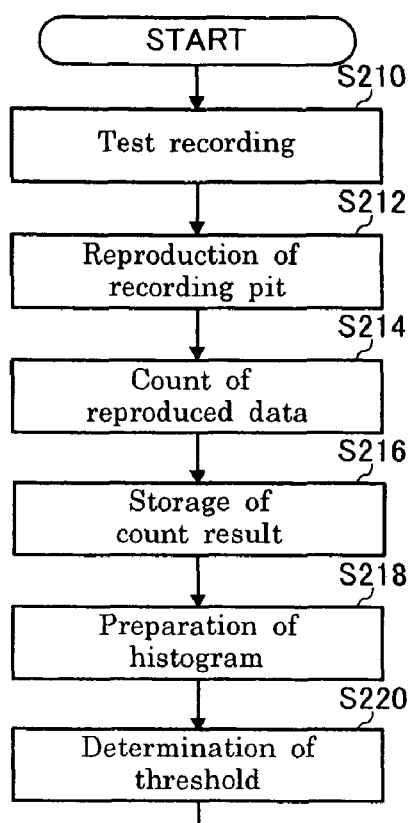
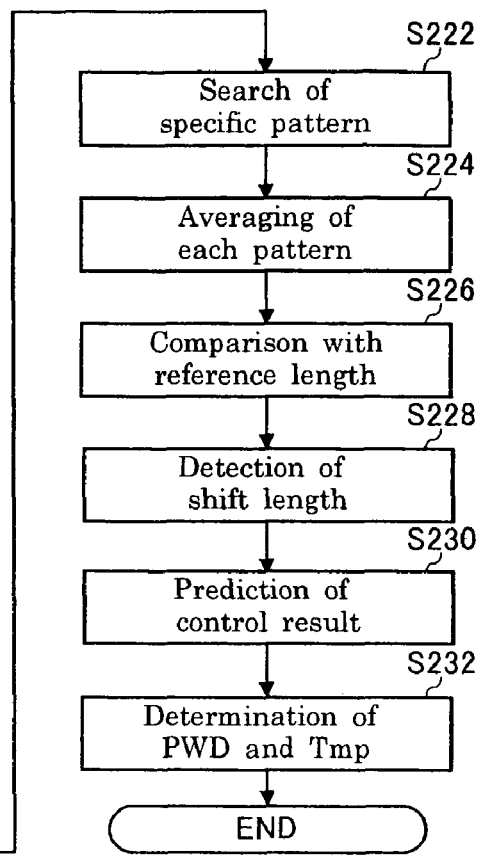

| No | Polarity | Count result |
|----|----------|--------------|
| 1  | Pit      | 5            |
| 2  | Land     | 6            |
| 3  | Pit      | 9            |
| 4  | Land     | 8            |
| 5  | Pit      | 13           |
| 6  | Land     | 8            |
| .  | .        | .            |
| .  | .        | .            |
| .  | .        | .            |

(a) Pit histogram (b) Land histogram (a) Pit histogram (b) Land histogram (a) Pit length threshold

| DATA | Count |
|---|---|
| 2T-3T | 2 |
| 3T-4T | 9 |
| 4T-5T | 18 |
| 5T-6T | 26 |
| 6T-7T | 35 |
| . | . |
| . | . |
| . | . |
| 14T-15T | 100 |

(b) Land length threshold

| DATA | Count |
|---|---|
| 2T-3T | 2 |
| 3T-4T | 10 |
| 4T-5T | 18 |
| 5T-6T | 26 |
| 6T-7T | 35 |
| . | . |
| . | . |
| . | . |
| 14T-15T | 100 |

Fig. 26
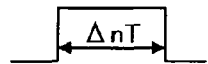
| Search pattern | LxT threshold | | PyT threshold | | LzT threshold | |
|---|---|---|---|---|---|---|
| | min | max | min | max | min | max |
| ≥L6 — P3 — ≥L6 | 26 | 100 | 2 | 9 | 26 | 100 |
| ≥L6 — P4 — ≥L6 | 26 | 100 | 9 | 18 | 26 | 100 |
| ≥L6 — P5 — ≥L6 | 26 | 100 | 18 | 26 | 26 | 100 |
| ≥L6 — P6 — ≥L6 | 26 | 100 | 26 | 35 | 26 | 100 |
| ... | ... | ... | ... | ... | ... | ... |
Fig. 27
| No | Polarity | Count result |
|---|---|---|
| 1 | Pit | 5 |
| 2 | Land | 6 |
| 3 | Pit | 9 |
| ... | ... | ... |
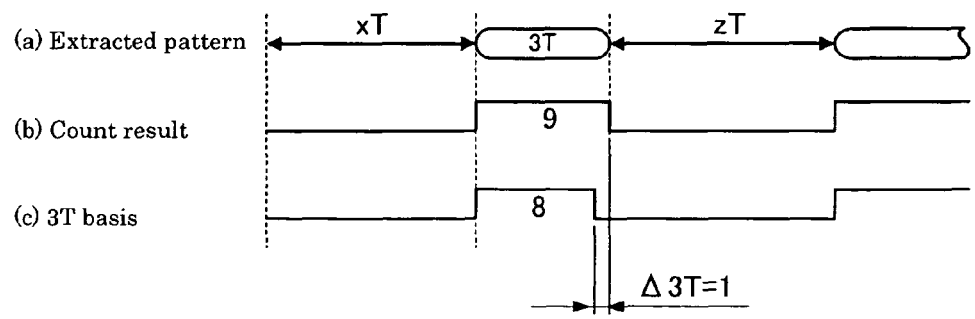

(a) Recording pulse S1
(b) Recording pulse S2

(a1) Pattern S1
(b1) Pattern S2

| Control element | Pit to be corrected | | | | | | | | | |
|---|---|---|---|---|---|---|---|---|---|---|
| | 3T | 4T | 5T | 6T | 7T | 8T | 9T | 10T | 11T | 14T |
| PWD | PW3 | PW4 | PW5 | PW6 | PW7 | PW8 | PW9 | PW10 | PW11 | PW14 |
| Tmp | Tm3 | Tm4 | Tm5 | Tm6 | Tm7 | Tm8 | Tm9 | Tm10 | Tm11 | Tm14 |

(a) Phase shift detection on front side of pit

FPS

| Search pattern | PxT threshold | | LyT threshold | | PzT threshold | |
|---|---|---|---|---|---|---|
| | min | max | min | max | min | max |
| ≥P6 – L4 – P3 | 26 | 100 | 10 | 18 | 2 | 9 |
| ≥P6 – L4 – P4 | 26 | 100 | 10 | 18 | 9 | 18 |
| ≥P6 – L4 – P5 | 26 | 100 | 10 | 18 | 18 | 26 |
| ≥P6 – L4 – P6 | 26 | 100 | 10 | 18 | 26 | 35 |
| ... | ... | ... | ... | ... | ... | ... |

(b) Phase shift detection on rear side of pit

RPS

| Search pattern | PxT threshold | | LyT threshold | | PzT threshold | |
|---|---|---|---|---|---|---|
| | min | max | min | max | min | max |
| P3 – L4 – ≥P6 | 2 | 9 | 10 | 18 | 26 | 100 |
| P4 – L4 – ≥P6 | 9 | 18 | 10 | 18 | 26 | 100 |
| P5 – L4 – ≥P6 | 18 | 26 | 10 | 18 | 26 | 100 |
| P6 – L4 – ≥P6 | 26 | 35 | 10 | 18 | 26 | 100 |
| ... | ... | ... | ... | ... | ... | ... |

HID

| Search pattern | LxT threshold | | PyT threshold | | LzT threshold | |
|---|---|---|---|---|---|---|
| | min | max | min | max | min | max |
| L3 — P4 — ≥L6 | 2 | 9 | 10 | 18 | 26 | 100 |
| L4 — P4 — ≥L6 | 9 | 18 | 10 | 18 | 26 | 100 |
| L5 — P4 — ≥L6 | 18 | 26 | 10 | 18 | 26 | 100 |
| L6 — P4 — ≥L6 | 26 | 35 | 10 | 18 | 26 | 100 |
| ... | ... | ... | ... | ... | ... | ... |

| No | Polarity | Count result |
|---|---|---|
| 1 | Pit | 5 |
| 2 | Land | 6 |
| 3 | Pit | 9 |
| ... | ... | ... |

(a) Reference pattern (b) Comparative pattern (c) Reference count result (d) Comparative count result (a) Ttop correction amount

| Land before pit | Pit to be corrected | | | | | | | | |
|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

(b) Tlast correction amount

| Land after pit | Pit to be corrected | | | | | | | | |
|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

Measurement of high-speed condition of reference medium

|  | 4X | 6X | 8X | 10X | 12X | 14X | 16X |
|---|---|---|---|---|---|---|---|
| Ttop 3T | -3 | -5 | -7 | -8 | -9 | -9 | -9 |
| Ttop 4T | -2 | -3 | -4 | -5 | -5 | -5 | -5 |
| Ttop 5T | -1 | -2 | -2 | -3 | -2 | -2 | -2 |
| Ttop 6T | -1 | -1 | -2 | -2 | -2 | -2 | -2 |
| Ttop 7T | -1 | -1 | -2 | -2 | -2 | -2 | -2 |
| Tlast 3T | 2 | 4 | 6 | 8 | 9 | 9 | 9 |
| Tlast 4T | 1 | 2 | 3 | 4 | 4 | 4 | 4 |
| Tlast 5T | 1 | 1 | 1 | 2 | 3 | 3 | 3 |
| Tlast 6T | 1 | 1 | 1 | 2 | 2 | 2 | 2 |
| Tlast 7T | 1 | 1 | 1 | 2 | 2 | 2 | 2 |

Fig. 52

Obtain difference between x6 and other speed

|  | 4X | 6X | 8X | 10X | 12X | 14X | 16X |
|---|---|---|---|---|---|---|---|
| Ttop 3T | 2 | 0 | -2 | -3 | -4 | -4 | -4 |
| Ttop 4T | 1 | 0 | -1 | -2 | -2 | -2 | -2 |
| Ttop 5T | 1 | 0 | 0 | -1 | 0 | 0 | 0 |
| Ttop 6T | 0 | 0 | -1 | -1 | -1 | -1 | -1 |
| Ttop 7T | 0 | 0 | -1 | -1 | -1 | -1 | -1 |
| Tlast 3T | -2 | 0 | 2 | 4 | 5 | 5 | 5 |
| Tlast 4T | -1 | 0 | 1 | 2 | 2 | 2 | 2 |
| Tlast 5T | 0 | 0 | 0 | 1 | 2 | 2 | 2 |
| Tlast 6T | 0 | 0 | 0 | 1 | 1 | 1 | 1 |
| Tlast 7T | 0 | 0 | 0 | 1 | 1 | 1 | 1 |

Fig. 53

Determination of x6 condition of medium to be recorded

|  | 4X | 6X | 8X | 10X | 12X | 14X | 16X |
|---|---|---|---|---|---|---|---|
| Ttop 3T |  | a1 |  |  |  |  |  |
| Ttop 4T |  | a2 |  |  |  |  |  |
| Ttop 5T |  | a3 |  |  |  |  |  |
| Ttop 6T |  | a4 |  |  |  |  |  |
| Ttop 7T |  | a5 |  |  |  |  |  |
| Tlast 3T |  | b1 |  |  |  |  |  |
| Tlast 4T |  | b2 |  |  |  |  |  |
| Tlast 5T |  | b3 |  |  |  |  |  |
| Tlast 6T |  | b4 |  |  |  |  |  |
| Tlast 7T |  | b5 |  |  |  |  |  |

Predict high-speed condition of medium to be recorded

|         | 4X    | 6X  | 8X    | 10X   | 12X   | 14X   | 16X   |
|---------|-------|-----|-------|-------|-------|-------|-------|
| Ttop 3T | a1+2  | a1  | a1-2  | a1-3  | a1-4  | a1-4  | a1-4  |
| Ttop 4T | a2+1  | a2  | a2-1  | a2-2  | a2-2  | a2-2  | a2-2  |
| Ttop 5T | a3+1  | a3  | a3+0  | a3-1  | a3+0  | a3+0  | a3+0  |
| Ttop 6T | a4+0  | a4  | a4-1  | a4-1  | a4-1  | a4-1  | a4-1  |
| Ttop 7T | a5+0  | a5  | a5-1  | a5-1  | a5-1  | a5-1  | a5-1  |
| Tlast 3T| b1-2  | b1  | b1+2  | b1+4  | b1+5  | b1+5  | b1+5  |
| Tlast 4T| b2-1  | b2  | b2+1  | b2+2  | b2+2  | b2+2  | b2+2  |
| Tlast 5T| b3+0  | b3  | b3+0  | b3+1  | b3+2  | b3+2  | b3+2  |
| Tlast 6T| b4+0  | b4  | b4+0  | b4+1  | b4+1  | b4+1  | b4+1  |
| Tlast 7T| b5+0  | b5  | b5+0  | b5+1  | b5+1  | b5+1  | b5+1  |

OPTICAL INFORMATION RECORDING DEVICE, OPTICAL INFORMATION RECORDING METHOD, AND SIGNAL PROCESSING CIRCUIT

BACKGROUND OF THE INVENTION

1. Field of the Invention

The field relates to a device and a method for optical recording and a signal processing circuit, and more particularly, to a device and a method for optical recording and a signal processing circuit in which a recording condition can be optimized depending on the compatibility between a drive and a medium.

2. Description of the Related Technology

In a recording onto optical information recording media such as CD-R or DVD-R (hereinafter referred to as "media" or a "medium"), the compatibility between a medium to be recorded on and a device to be used for recording (hereinafter referred to as a "drive") depends on each combination of them. This may be caused by the medium side factor wherein an optimum recording condition is varied by the difference in a recording material comprising the medium or the film formation variation during production, or by the drive side factor wherein an optimum recording condition is varied by the difference in a pickup device and/or a semiconductor laser comprising the drive or assembly variation during production. In fact, a suitable recording condition exists for each combination of a medium and a drive due to the combination of those factors.

Accordingly, in a conventional method, ID information of a medium type identifiable by a drive is stored in the medium as well as a recording condition prepared for each medium type is stored in the drive. When a recording is actually conducted, the ID information stored in the medium is read from the medium loaded to the drive, and a recording condition related to the ID information (hereinafter referred to as a "writing strategy") is used.

However, in the conventional method, suitable recording conditions can be selected for pre-verified known media, but prepared recording conditions may not be adequate to accommodate unknown media that are not pre-verified. Further, depending on the changes in recording environments such as a recording speed, disturbance, and change over time, the prepared recording conditions may not be adequate even for known media.

A method contemplated to accommodate such an unknown medium is described in Japanese Unexamined Patent Publication Nos. 2003-30837 and 2004-110995. As described in the paragraph [0020] of the Japanese Unexamined Patent Publication No. 2003-30837 as ". . . a phase error relative to a channel clock is detected for every recording pattern. A recording compensation parameter adjustment section 12 optimizes an emission waveform rule on the basis of a result of the detection at the phase error detection section 11", a method for detecting a phase error by comparing with a channel clock and of correcting the phase error is disclosed.

Also, the paragraph [0024] of Japanese Unexamined Patent Publication No. 2003-30837 describes that "Next, a test pattern for determining an emission waveform rule is recorded. The area onto which the test pattern is recorded is reproduced, and the relationship between a prepared emission waveform rule and a phase error amount is examined. In other words, the phase error amount in the combination of the length of each mark and the length of each space immediately before the mark is measured. An emission waveform rule wherein the phase error amount becomes zero is estimated from the measured phase error amount, whereby a desired emission waveform rule is determined . . . ", disclosing a method for measuring a phase error amount for every combination of a mark and a space, and then estimating an emission waveform rule wherein the phase error amount becomes zero (see FIG. 8 and FIG. 12).

The method disclosed in Japanese Unexamined Patent Publication No. 2003-30837 is effective for optimizing a strategy because correction is made based on a phase error of a recording pattern.

However, because the method disclosed in Japanese Unexamined Patent Publication No. 2003-30837 involves, as conventional methods, a fine adjustment of a prepared strategy stored in a drive, it is difficult to provide favorable recording quality for media to which prepared strategies are not applicable.

Also, the paragraph [0045] of Japanese Unexamined Patent Publication No. 2004-110995 describes that ". . . a top pulse correspondingly to a 3T period and a non-multipulse correspondingly to a 8T period are generated integrally (consecutively) . . . " and the paragraph [0046] of the document describes that ". . . the laser power for a write pulse is adjusted in two levels, and when the ratio between a laser power (a height value of the top pulse) Ph and a laser power (a height value of the non-multipulse) Pm is optimum, an optimum power can be obtained . . . ", suggesting the effectiveness of optimizing the Ph/Pm ratio.

However, in the method disclosed in Japanese Unexamined Patent Publication No. 2004-110995, as described in the paragraph [0067] of the document, initial values of Ph and Pm are temporarily set based on values stored in a drive or a medium, and then the Ph/Pm ratio is calculated. Accordingly, as in the case of Japanese Unexamined Patent Publication No. 2003-30837, it is difficult to provide favorable recording quality for media to which the temporarily set values are not applicable.

On the other hand, in the case of recording data onto a certain recording medium with an optical information recording system, generally, a recording condition suitable for the recording medium is obtained by a test recording using a test area provided on the recording medium prior to an actual data recording.

However, in an optical information recording system to which a high-speed recording is increasingly demanded, the positional relation between the test recording area and an actual recording area and the limited rotation number of a spindle motor that rotates the recording medium make a test recording difficult at the same speed as that used for an actual recording.

Therefore, a conventional method is generally used, wherein a recording condition suitable for each recording speed is pre-stored for each type of media in a recording apparatus that conducts a data recording, and when the high-speed recording is actually conducted, reading out and configuring the recording condition allow the data recording to be conducted.

The conventional method includes a step wherein a recording condition for a high-speed recording is slightly adjusted using the difference between an optimum recording condition obtained by a test recording conducted at a recording speed available for the test recording and that pre-stored in the recording apparatus.

However, this type of conventional method cannot adequately accommodate the variations in characteristics of a recording medium or a recording system. Further, there also exists a problem that it cannot adequately accommodate "unknown media" that are recording media on which information is not pre-stored in the recording apparatus or which is developed after the manufacture of the recording apparatus. Accordingly, there is a demand for a technology to obtain an optimum recording condition for each recording speed, depending on the characteristic of a medium or recording apparatus used for data recording.

To solve the above-described problem, a method wherein the relationship between amplitude information and a recording power at two or more recording speeds, which is pre-stored in the recording medium, is read out to calculate a recording power at a recording speed to be used for recording is disclosed in Japanese Unexamined Patent Publication No. 2004-234698. However, because the above-described method assumes that information for calculating a recording power is pre-stored in a recording medium, there persist three problems that the method: 1) cannot accommodate media on which the information is not pre-stored, 2) causes the decrease in productivity and the increase in cost at a manufacturing stage due to an additional production process for recording the information onto media, and 3) does not adequately accommodate the case where a system has a difficulty in recording with the calculated recording power.

Further, in a recording system such as CAV or CLV in which a recording speed is varied from an inner to outer circumference, an optimum recording condition is shifted due to various factors such as the change in temperature of a drive during recording and the difference in characteristics of a medium between inner and outer circumferences in addition to the change in an optimum recording condition caused by the variation in recording speed.

A method for adjusting such shifts is described in Japanese Unexamined Patent Publication No. 2002-208139. Japanese Unexamined Patent Publication No. 2002-208139 discloses a method comprising: sectioning an optical disk medium in a radial direction into a plurality of recording areas; reproducing an end part recorded on, for each of the recording areas; and correcting a power using characteristics of a resultant reproduction signal.

However, although Japanese Unexamined Patent Publication No. 2002-208139 describes the method for correcting a power in detail, any specific method for correcting a pulse width is not disclosed. Accordingly, a precise correction of a pulse width is not easy even if a known method for correcting a pulse width is simply applied to the method disclosed in Japanese Unexamined Patent Publication No. 2002-208139.

It is therefore an object of certain inventive aspects to provide a method for optimizing a recording condition depending on the compatibility between a drive and a medium. More particularly, certain inventive aspects provide a method effective to obtain a preferable recording condition even for high-speed recordings in which conducting a test recording is not easy, and further, a method effective for configuring an optimum recording condition for CAV or CLV recording in which a recording speed is varied from an inner to outer circumference.

SUMMARY OF CERTAIN INVENTIVIE ASPECTS

In order to accomplish the above object, one embodiment according to claim 1 is characterized by an optical information recording device for forming a recording pattern comprised of a pit and a land on an optical recording medium by irradiating a laser beam based on a recording pulse, the optical information recording device comprising: means for configuring optimum conditions for a power and a phase of the recording pulse by a test recording onto the medium; means for detecting recording states of a pit and a land formed by an actual recording onto the medium; means for deriving correction amounts for the configured power and the configured phase of the recording pulse from the detected recording states; and means for correcting the power and the phase of the recording pulse based on the derived correction amounts.

As described above, correcting both optimum conditions for a power and a phase obtained by a test recording during an actual recording enables a variety of variable factors such as the temperature change in a drive or a characteristic difference between inner and outer circumferences of a medium to be absorbed, resulting in the accommodation of severer recording environments such as a high-speed and a high-density recording.

In addition, a test recording is preferably conducted within a test area provided on an inner circumference of the medium, and an actual recording is preferably conducted within a recording area provided on a circumference outside of the test area.

Another embodiment according to claim 2 is characterized by the optical information recording device according to claim 1, wherein the detection of the recording states is conducted while pausing a recording operation onto the medium and the corrections of the power and the phase are simultaneously implemented during the pausing.

As described, correcting a power and a phase simultaneously during a single pausing enables an optimum condition for a recording pulse to be corrected without two step pausing of a recording operation, i.e., first for correcting a power and second for correcting a phase. The pausing is preferably implemented utilizing a timing when a recording operation such as buffer reading is required to be stopped.

Another embodiment according to claim 3 is characterized by the optical information recording device according to claim 2, wherein the pausing is implemented at a timing when a recording speed for the medium is changed.

As described, by making a correction while pausing at a timing when a recording speed is changed, a change in speed that is likely to cause a shift from an optimum condition can be absorbed, thus accommodating a high-speed recording environment.

Another embodiment according to claim 4 is characterized by an optical information recording device for forming a recording pattern comprised of a pit and a land on an optical recording medium by irradiating a laser beam based on a recording pulse, the optical information recording device comprising: means for configuring optimum conditions for a power and a phase of the recording pulse by a test recording onto the medium; means for detecting recording states of a pit and a land formed by an actual recording onto the medium; means for detecting a power shift amount from the optimum condition based on the detected recording states; means for detecting phase shift lengths of the pit and the land based on the detected recording states; means for subtracting an amount affected by the power shift amount from the detected phase shift length; means for correcting the optimum condition for the phase based on the phase shift length from which the amount affected by the power shift amount is subtracted; and means for correcting the optimum condition for the power based on the detected power shift amount.

As described above, even in the case that a power and a phase are simultaneously corrected by distinguishing a phase shift due to a power variation from those due to other factors, since an effect of a power correction can be subtracted, an excessive correction of the phase can be avoided. As a result, an appropriate correction can be made.

Another embodiment according to claim 5 is characterized by an optical information recording device for forming a recording pattern comprised of a pit and a land on an optical recording medium by irradiating a laser beam based on a recording pulse, the optical information recording device comprising: means for obtaining a correlation between metrics of a power condition and a phase condition for the recording pulse by a test recording onto the medium; means for configuring optimum conditions for a power and a phase of the recording pulse by a test recording onto the medium based on each of the metrics; means for detecting recording states of a pit and a land formed by an actual recording onto the medium; means for detecting a power shift amount from the optimum condition based on the detected recording states; means for detecting phase shift lengths of the pit and the land based on the detected recording states; means for subtracting an amount affected by the power shift amount from the detected phase shift length by using the correlation; means for correcting the optimum condition for the phase based on a phase shift length from which the amount affected by the power shift amount is subtracted; and means for correcting the optimum condition for the power based on the detected power shift amount.

As described, by obtaining a correlation between metrics of a power condition and a phase condition, a phase shift length due to a power variation and those due to other factors can be preferably distinguished.

As a power condition metric, it is preferable to use a known asymmetry or β. Further, as the phase condition metric, it is preferable to use a shift length between a recording pulse and a recording pit.

Another embodiment according to claim 6 is characterized by an optical information recording device for recording information onto an optical recording medium by irradiating a laser beam based on a recording pulse, the optical information recording device comprising: means for conducting a test recording within a test area provided on an inner circumference of the medium; means for determining a condition for the recording pulse in a recording area provided on an outer circumference than the test area, based on the result of the test recording; means for conducting a recording within the recording area using the determined recording pulse condition; means for reproducing a result of the recording; and means for correcting a power and a phase of the recording pulse in the recording area based on a result obtained by the reproduction.

As described, by correcting optimum conditions of a power and a phase obtained on an inner circumference based on a result of an actual recording conducted on an outer circumference, variations from optimum conditions due to the difference between the inner and outer circumferences can be absorbed. Thus, accurate and simultaneous corrections of the power and the phase can be made.

Another embodiment according to claim 7 is characterized by an optical information recording device for recording information onto an optical recording medium at various recording speeds by irradiating a laser beam based on a recording pulse, the optical information recording device comprising: means for conducting a test recording at a first recording speed within a test area provided on an inner circumference of the medium; means for determining a condition for the recording pulse at the first recording speed based on a result of the test recording; means for determining a condition for the recording pulse at a second recording speed faster than the first recording speed, using the condition at the first recording speed; means for conducting a recording at the second recording speed in a recording area provided on an outer circumference than the test area; and means for correcting a power and a phase of the recording pulse by reproducing a result of the recording conducted at the second recording speed.

As described, by correcting an optimum condition obtained by a lower-speed recording on an inner circumference based on a result of a higher-speed recording conducted on an outer circumference, variations from the optimum condition due to the difference between the inner and outer circumferences and the difference in speed can be absorbed. Thus, accurate and simultaneous corrections of a power and a phase are enabled.

Another embodiment according to claim 8 is characterized by an optical information recording method for forming a recording pattern comprised of a pit and a land onto an optical recording medium by irradiating a laser beam based on a recording pulse, the optical information recording method comprising the steps of: configuring optimum conditions for a power and a phase of the recording pulse by a test recording onto the medium; detecting recording states of a pit and a land formed by an actual recording onto the medium; deriving correction amounts for the configured power and the configured phase of the recording pulse based on the detected recording states; and correcting the power and the phase of the recording pulse based on the derived correction amounts.

Another embodiment according to claim 9 is characterized by an optical information recording method for forming a recording pattern comprised of a pit and a land onto an optical recording medium by irradiating a laser beam based on a recording pulse, the optical information recording method comprising the steps of: configuring optimum conditions for a power and a phase of the recording pulse by a test recording onto the medium; detecting recording states of a pit and a land formed by an actual recording onto the medium; detecting a power shift amount from the optimum condition based on the detected recording states; detecting phase shift lengths of the pit and the land based on the detected recording states; subtracting an amount affected by the power shift amount from the detected phase shift lengths; and correcting the optimum condition for the phase based on a phase shift length from which the amount affected by the power shift amount is subtracted.

Another embodiment according to claim 10 is characterized by an optical information recording method for forming a recording pattern comprised of a pit and a land onto an optical recording medium by irradiating a laser beam based on a recording pulse, the optical information recording method comprising the steps of: obtaining a correlation between metrics of a power condition and a phase condition for the recording pulse by a test recording onto the medium; configuring optimum conditions for a power and a phase of the recording pulse by a test recording onto the medium based on each of the metrics; detecting recording states of a pit and a land formed by an actual recording onto the medium; detecting a power shift amount from the optimum condition based on the detected recording states; detecting phase shift lengths of the pit and the land based on the detected recording states; subtracting an amount affected by the power shift amount from the detected phase shift lengths; and correcting the optimum condition for the phase based on a phase shift length from which the amount affected by the power shift amount is subtracted.

Another embodiment according to claim 11 is characterized by an optical information recording method for recording information onto an optical recording medium by irradiating a laser beam based on a recording pulse, the optical information recording method comprising the steps of: conducting a test recording in a test area provided on an inner circumference of the medium; determining a condition for the recording pulse in a recording area provided on an outer circumference than the test area, based on the result of the test recording; conducting a recording within the recording area using the determined recording pulse condition; reproducing a result of the recording; and correcting a power and a phase of the recording pulse in the recording area based on a result obtained by the reproduction.

Another embodiment according to claim 12 is characterized by an optical information recording method for recording information onto an optical recording medium at various recording speeds by irradiating a laser beam based on a recording pulse, the optical information recording method comprising the steps of: conducting a test recording at a first recording speed within a test area provided on an inner circumference of the medium; determining a condition for the recording pulse at the first recording speed based on a result of the test recording; determining a condition for the recording pulse at a second recording speed faster than the first recording speed, using a condition at the first recording speed; conducting a recording at the second recording speed in a recording area provided on an outer circumference than the test area; and correcting a power and a phase of the recording pulse by reproducing a result of the recording conducted at the second recording speed.

Another embodiment according to claim 13 is characterized by a signal processing circuit configured based on the method according to claim 8 or 9, the signal processing circuit being incorporated in an optical information recording device for forming a recording pattern comprised of a pit and a land onto an optical recording medium by irradiating a laser beam based on a recording pulse.

In certain embodiments, it is preferable to configure a recording pulse with a top pulse and a succeeding pulse. Also, it is preferable to configure the top pulse correspondingly to a shortest pit that has the highest appearance rate and is difficult to be recorded. For instance, when a pit stream having 3T to 11T is defined just like in CD-R, or when a pit stream having 3T to 11T, and 14T is defined just like in DVD-R, it is preferable to adapt the top pulse to correspond to a 3T pit.

Further, the succeeding pulse may be in the form of either a non-multipulse or a multipulse, and it is preferable that the recording pulse is optimized by using a power ratio between the top pulse and the succeeding pulse in the case of the non-multipulse, whereas in the case of the multipulse, it is preferable that the recording pulse is optimized by adjusting a duty for each of a plurality of divided pulses that configure the succeeding pulse.

A top pulse condition and a succeeding pulse condition may be defined by any combination of a pulse power, a pulse width, and a duty, and preferably, the recording pulse is optimized by adjusting a ratio between the top pulse and the succeeding pulse.

In addition, determining the succeeding pulse condition after determining the top pulse condition enables more stable recording quality to be obtained. That is, certain embodiments employ a method in which preliminarily determining a top pulse condition assumed to be an optimum enables a top pulse condition closer to an optimum to be found, and then a succeeding pulse condition is determined. On the contrary, in the method wherein a ratio between a top pulse and a succeeding pulse is optimized first as disclosed in the above-mentioned Japanese Unexamined Patent Publication No. 2004-110995, an optimum solution for the top pulse may not be obtained, resulting in the decrease of an accommodation capability for unknown media. In addition, a procedure for determining a top pulse condition and the succeeding pulse condition may be repeated several times in order to improve accuracy.

Preferably, a phase condition for a recording pulse is defined as a positional relation between a front-end and a back-end of the recording pulse, and more preferably, defined in consideration of lengths of lands and pits around the recording pulse, such as lengths of lands immediately before and after the recording pulse, and a length of a pit before the anterior land.

Also, an optimum recording pulse condition is defined as a pulse condition of a laser beam configured to obtain a desired pit shape, and as variations in irradiation intensity or pulse width of the laser beam, a length of a pit to be recorded, a relation with a land length immediately before a pulse, a relation with a land length immediately after the pulse, and/or effects of a heat accumulation or a heat interference should be considered. Consequently, a specific pulse shape is provided as a recording strategy.

Test recordings are to be conducted to check outcomes of conducting an actual recording using the above strategy, and also conducted within a test recording area provided on a medium. The test recordings are further conducted with specific patterns with which a difference between a strategy and an actual recording result can be effectively detected. By reproducing recording patterns comprising a plurality of recording pits formed by the test recordings, reproduction patterns corresponding to the recording patterns are obtained.

A variety of reproduction patterns are obtained by reproducing results of the test recordings. Among them, at least two reproduction patterns effective to detect a difference between the strategy and the result of the actual recording are extracted, and by comparing them, a variety of shifts such as a phase shift and a difference in length are detected.

Both of the two reproduction patterns are comprised of a signal reflecting a difference between the strategy and the actual recording result. Thus, comparing these reproduction patterns with each other enables a relative shift length on a basis of a certain pattern to be detected.

Preferably, these two reproduction patterns respectively comprise a part having a common pit/land length and a part having a different pit/land length. For instance, two reproduction patterns respectively having a configuration of "common pit, common land, and different pit" may be compared with each other to detect a front-side phase shift of a predetermined pit. In the same manner, two reproduction patterns having a configuration of "different pit, common land, and common pit" may be compared to detect a backside phase shift of a predetermined pit, "different land, common pit, and common land" to detect a shift in pit due to a heat interference, and "common land, different pit, and common land" to detect a shift in pit balance.

Certain embodiments are not limited to a method for comparing two reproduction patterns. A method for comparing a plurality of reproduction patterns, for instance, a method in which one of the reproduction patterns is set as a reference pattern and compared to other patterns, is also included.

As described above, certain embodiments enable a recording condition closer to an optimum to be obtained even for a medium that is unknown to a drive. Especially, a preferable recording condition can be obtained even for a high-speed recording in which a test recording is difficult.

BRIEF DESCRIPTION OF DRAWINGS

FIG. 5 is a schematic diagram showing one example of the flow shown in FIG. 4.

FIG. 6 is a schematic diagram showing one example of the flow shown in FIG. 4.

FIG. 9 is a schematic diagram showing an example of a downward-sloping pattern obtained as a result of examining recording quality in the step S120 of FIG. 3.

FIG. 10 is a schematic diagram showing an example of an upward-sloping pattern obtained as a result of examining recording quality in the step S120 of FIG. 3.

FIG. 13 is a schematic diagram showing an example of determining a test area as conducted in the step S122 in the case of an upward-sloping pattern obtained in the step S120 of FIG. 3.

FIG. 14 is a diagram showing an example wherein the step S120 in FIG. 3 is conducted with eight patterns.

FIG. 19 is a flowchart showing an exemplary procedure of the determination flow of a ratio in the step S200 in FIG. 1(b).

FIG. 26 is a schematic diagram showing a table configuration for searching a specific pattern used in the detection of a shift length due to a pit balance.

FIG. 27 is a schematic diagram showing a specific example of a shift length detected by a count result comparison.

FIG. 52 is a data diagram showing an example of the step S502 in FIG. 50.

FIG. 53 is a data diagram showing an example of the step S504 in FIG. 50.

DETAILED DESCRIPTION OF CERTAIN EMBODIMENTS

An optical information recording device according to certain embodiments will hereinafter be described in detail with reference to accompanying drawings. These embodiments may be modified from time to time and shall not be limited to embodiments to be described herein.

Figure 1:
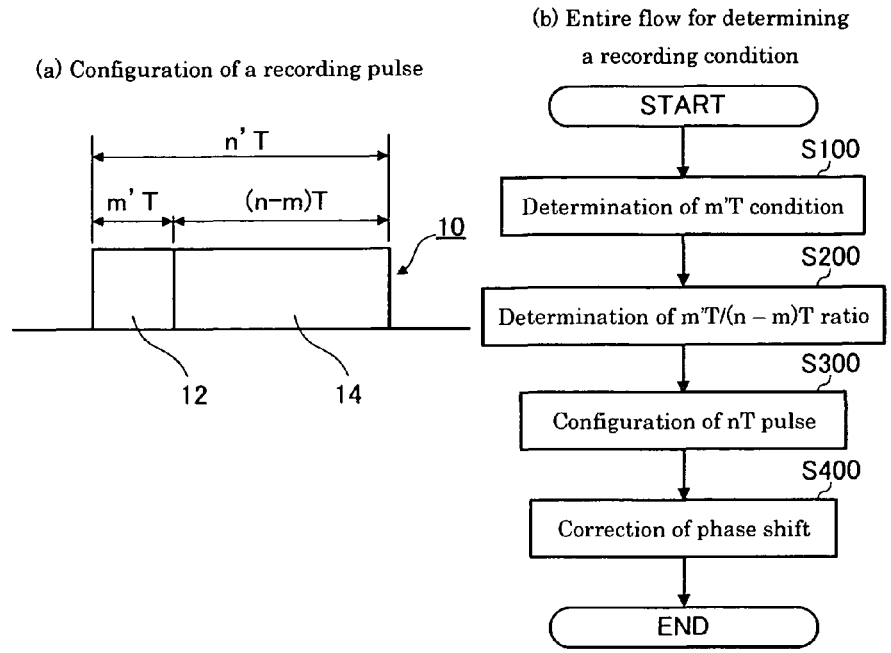
FIG. 1 is a schematic diagram showing a configuration of a recording pulse and an entire flow of determining a recording condition according to one embodiment.

FIG. 1 is a schematic diagram showing a configuration of a recording pulse and an entire flow of determining a recording condition according to one embodiment. As shown in FIG. 1(a), a recording pulse 10 is comprised of a top pulse 12 arranged at the front edge of the recording pulse and a succeeding pulse 14 following the top pulse.

Assuming that the recording pulse 10 has a length of n'T, the top pulse 12 has a length of m'T, and the succeeding pulse 14 has a length of (n−m)T, m and n take the values of m=3 and n=3 to 11 or 14 respectively in this embodiment, where T is a unit time defined by an optical disk system of which a frequency is determined by a clock signal.

A condition for the recording pulse 10 is determined by conducting a flow shown in FIG. 1(b). The flow is conducted with a test recording under the condition of loading a medium (hereinafter referred to as a "medium" or a "disk") into an optical information recording device (hereinafter referred to as a "recording device" or a "drive").

As shown in FIG. 1(b), to determine a condition for the recording pulse 10, a pulse condition for a pulse length of m'T is determined first (step S100), and then using the condition for the pulse length of m'T, m'T/(n−m)T, which is a ratio of the pulse condition for the pulse length of m'T to that of (n−m)T, is obtained (step S200). Then, nT pulse is configured based on the ratio (step S300), and finally a condition for a recording pulse having a length of n'T is determined by correcting a phase shift (step S400).

Figure 2:
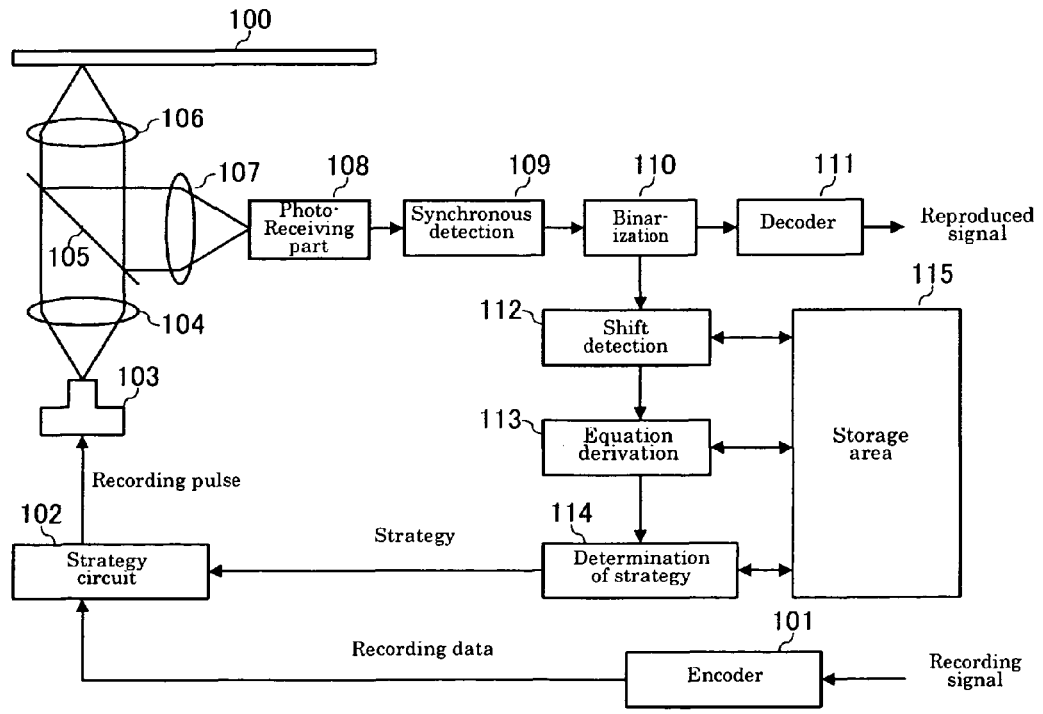
FIG. 2 is a block diagram showing an internal configuration of a drive according to an embodiment of the present invention.

FIG. 2 is a block diagram showing an internal configuration of a drive according to an embodiment of the present invention. As shown in FIG. 2, a drive 100 records/reproduces information onto/from a medium 50 using a laser beam emitted from a laser oscillator 103.

When information is recorded onto the medium 50, a recording signal corresponding to the information desired to be recorded is encoded by an encoder 101 using an EFM method, and the encoded recording data are transmitted to a strategy circuit 102.

In the strategy circuit 102, various setting parameters are configured for a certain strategy. The strategy circuit 102 controls the intensity and pulse width of a laser beam emitted from the laser oscillator 103 by correcting the setting parameters, and generates a recording pulse with which a desired recording state may be obtained.

The recording pulse generated in the strategy circuit 102 is transmitted to the laser oscillator 103, where an output laser beam is controlled based on the recording pulse, and the controlled laser beam is irradiated via a lens 104, a half mirror 105, and a lens 106 to the medium 50 that is rotating at a constant linear velocity or at a constant rotational speed. Consequently, a recording pattern comprised of a pit/land stream corresponding to the desired recording data is recorded onto the medium 50.

In contrast, when reproducing the information recorded on the medium 50, a homogeneous reproduction laser beam emitted from the laser oscillator 103 is irradiated via the lens 104, the half mirror 105, and the lens 106 to the medium 50 that is rotating at a constant linear velocity or at a constant rotational speed.

The reproduction laser beam has lower intensity than the recording laser beam emitted from the oscillator 103 upon recording, and a reflected beam of the reproduction laser beam from the medium 50 is received by a photo-receiving part 108 via the lens 106, the half mirror 105, and a lens 107, and transformed into an electrical signal.

The electrical signal output from the photo-receiving part 108 corresponds to the recording pattern comprised of the pits and lands recorded on the medium 50. A synchronizing signal detection circuit 109 generates a clock signal with a certain cycle based on a wobble component included in the electrical signal output from the photo-receiving part 108. Subsequently, the electrical signal is binarized by a binarization circuit 110, then decoded by a decoder 111, and output as a reproduction signal.

As described, since recording quality of a recording system comprised of a drive and a medium is affected by the variation between optical information recording devices and by the variation between optical information recording media, absorbing such effect with a strategy enables the recording quality to be improved. In addition, various media including dye type media represented by CD-R or DVD-R, and phase-change media represented by CD-RW or DVD-RW may be used as the medium.

The determination flow for the recording pulse condition as shown in FIG. 1(b), which is conducted by the above-described drive, is hereinafter described in detail.

Determination of m'T Condition

Figure 3:
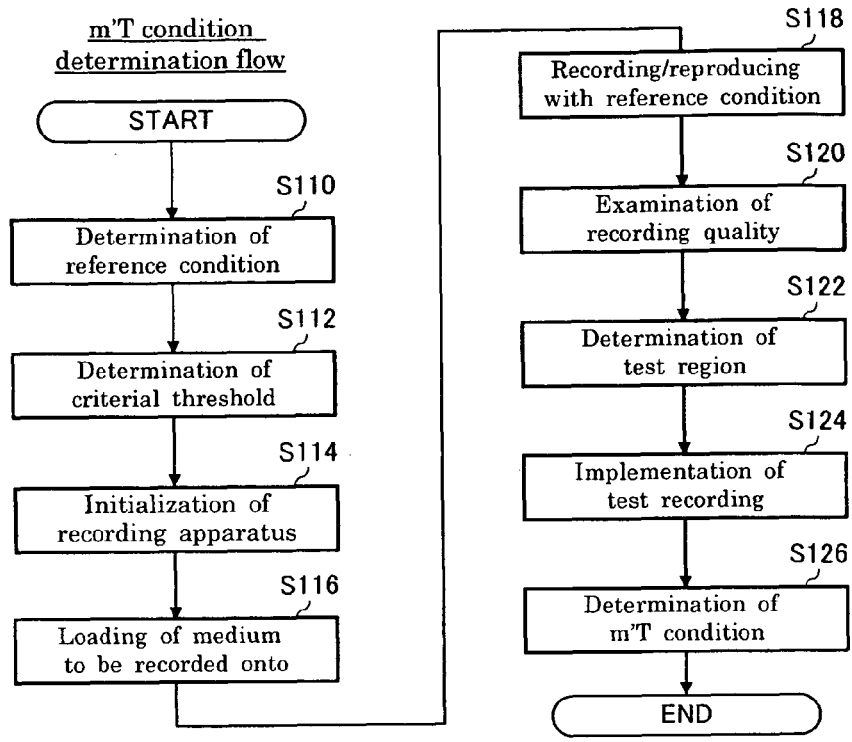
FIG. 3 is a flowchart showing a detailed execution procedure of the determination flow of a condition for m'T shown in FIG. 1.

FIG. 3 is a flowchart showing a detailed execution procedure of the determination flow of the condition for m'T shown in FIG. 1. As shown in FIG. 3, the drive 100 conducts steps S110 to S114 to configure an initial setting, steps S116 to S122 to determine a condition for a test recording, a step S124 to conduct a test recording under the determined condition, and a step S126 to determine a condition for mT pulse based on a result of the test recording. Details of each step are described below.

Determination of Reference Condition

In the step S110 of FIG. 3, a test recording onto any typical medium is conducted while varying a recording speed, whereby one pulse width and three power values are obtained as a reference condition. As the three power values, based on a result of the test recording, a power value with which a jitter value is minimized and two other power values before and after the power value are preferably used. As the two other power values, it is preferable to use values around a threshold that provides a criterion for determining whether or not the jitter value is acceptable. The reference condition obtained in this step is later used for the verification of recording quality.

Determination of Criterial Threshold

As described later in detail, since one embodiment is intended to define a region below a jitter threshold as a range of a test recording condition (hereinafter referred to as "test area"), a criterial threshold should be determined. As the threshold value, a standard value for each drive or medium type may be prepared, but the threshold that indicates a minimum limit of an acceptable jitter is varied depending on optical elements comprising a pickup device shown in FIG. 2 or on the other elements as well as on a recording speed for a medium.

Consequently, it is recommended to set up a more accurate test area to provide a more accurate criterion by obtaining such a threshold for each combination of a drive and a medium that are actually used.

However, since configuring a threshold for each combination of a drive and a medium causes the number of recording steps to be increased, a threshold suitable for each drive may be stored in a storage area 115 during manufacturing of drives, assuming that the variation in a drive is a main cause of the variation in threshold.

Figure 4:
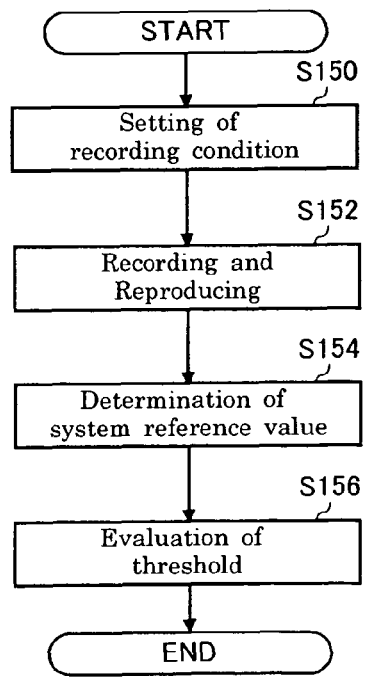
FIG. 4 is a flowchart showing details of a determination step of a reference threshold shown in FIG. 3.

FIG. 4 is a flowchart showing details of a determination step of a reference threshold shown in FIG. 3. As shown in FIG. 4, the reference threshold is determined in such a way that recording/reproducing under a predetermined recording condition is conducted, then a preliminary threshold based on a result of the recording/reproduction is determined, and the value ensuring a certain margin to the preliminary threshold is set as a threshold to be used for determining a test area. Hereinafter, each step is sequentially described.

First, a recording condition is configured by conducting a step S150. In this step, certain patterns of conditions necessary for recording/reproducing including a pulse width, power, recording/reproduction speed, and recording address are prepared. After those recording conditions are configured in a drive, a reference medium is loaded into the drive. As the reference medium, it is preferable to select one having typical characteristics from various media.

Next, conducting a recording/reproducing a step S152 to the reference medium loaded under the recording conditions configured by the above-described step S150 allows recording/reproduction characteristic values for each of the recording conditions, such as a jitter value to be obtained. In this step, a value that indicates recording quality is selected as the characteristic value to be obtained.

Subsequently, a system reference value is determined by conducting a step S154, wherein an optimum value such as a minimum jitter value is obtained from the recording/reproducing characteristic values obtained in the above-described step S152. Consequently, a jitter value considered to be closer to an optimum value for the drive is set as a reference value. In addition, instead of the optimum jitter value, a mean of two values at which a predetermined threshold intersects with an approximated curve for jitter values, that is, a mean value of a power margin may be used as the reference value.

Finally, a step S156 is conducted, wherein a threshold is calculated by multiplying the system reference value obtained in the above-described step S154 by a predetermined coefficient a (preferably $\alpha > 1$). This enables a determination under the condition where the system reference value has the predetermined margin. Specifically, the calculation of the threshold is conducted by multiplying the system reference value by $\alpha$, where the coefficient a preferably be a value around 1.5. In addition, the coefficient a may be a suitable value corresponding to a type of a drive or a medium, for instance, a value approximate to the system reference value, such as $\alpha = 0.8$ to $1.2$, or a larger value such as $\alpha = 2.0$ to $3.0$ is applicable.

FIG. 5 is a schematic diagram showing an example of the flow shown in FIG. 4. The example shown in FIG. 5 illustrates a case where reproduction characteristics 202-1 to 202-4 are obtained by applying a power P1 to P6 to respective pulse widths W1 to W4 while using a jitter value as a characteristic value that indicates recording quality. In the example, the pulse width W1 to W4 and the power P1 to P6 are set as the recording conditions, and a value of the recording characteristic 202-3 that exhibits a minimum jitter value is set as the system reference value. The threshold may be obtained by multiplying the system reference value by, for instance, 1.5. In addition, arrows in a matrix table of the figure indicate the direction of changing a test condition and are hereinafter used as the same meaning.

FIG. 6 is a schematic diagram showing an example of the flow shown in FIG. 4. The example shown in FIG. 6 illustrates a case where reproduction characteristics 202-1 to 202-4 are obtained by applying a power P1 to P6 to respective pulse widths W1 to W4 while using a jitter value as a characteristic value that indicates recording quality. In the example, a value of the reproduction characteristic 202-2 that exhibits a minimum jitter value is the system reference value. The threshold may be obtained by multiplying the system reference value by, for instance, 1.5. As described, the threshold may be determined by changing a power condition for each pulse width.

Figure 7:
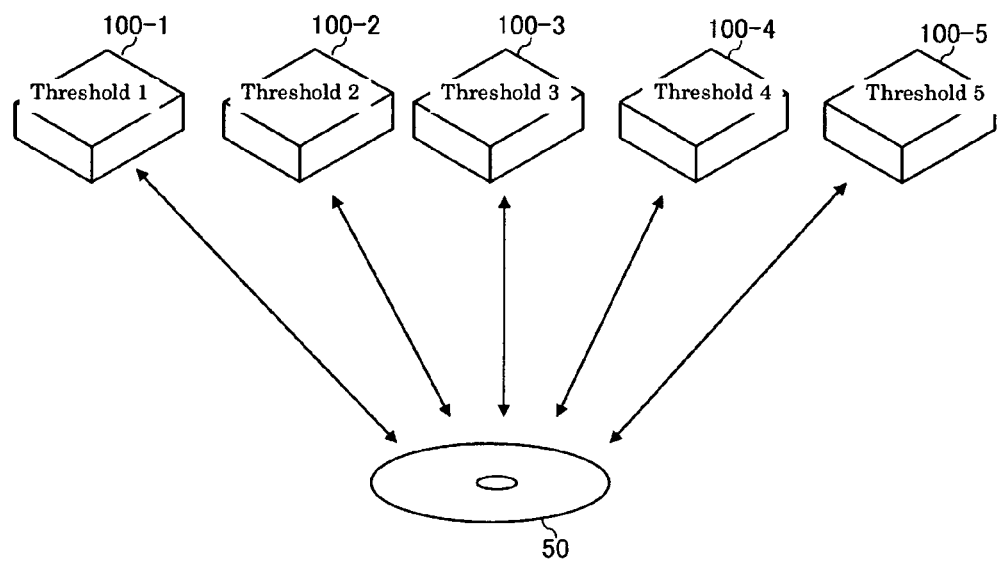
FIG. 7 is a schematic diagram showing a case wherein a threshold is calculated for each drive.

FIG. 7 is a schematic diagram showing an example of a case wherein a threshold is calculated for each drive. If setting a threshold correspondingly to the variation of a drive is desired, as shown in the diagram, a common reference medium 50 is used for recording/reproduction in each of the drives 100-1 to 100-5, and thresholds 1 to 5 unique to the respective drives are stored.

In addition, when a simplified procedure for setting a threshold is desired, an average of thresholds 1 to 5, which are obtained by recording/reproducing onto/from a common reference medium with several typical drives, is calculated, and the average threshold may be used as a threshold for other drives.

The drives used for obtaining the average threshold described above may have an identical or similar design. Further, the average threshold can be used for those drives as a threshold. In addition, the obtained average threshold can be used as a general threshold for drives having an identical or similar design to be manufactured. Also, multiple drives having variations each other are meaningfully prepared, and then an average of thresholds obtained for the drives may be used as the average threshold.

Initial Setting of Recording Device

In a storing step S114, the reference condition and reference threshold obtained in the steps S110 and S112 of FIG. 3 respectively are stored in a recording area 115 of the drive 100. The step S114 is preferably conducted during manufacturing of the derive 100.

Load of Medium for Recording

Subsequently, a step S116 is conducted to load a medium 50, onto which information is to be recorded, into the drive 100 wherein the initial setting is completed in the step S114.

Recording/Reproduction Using Reference Condition

Next, a step S118 is conducted to record information onto the medium 50 loaded at the step S116 under the condition configured in the step S114. Specifically, three jitter values are obtained by recording/reproducing the information with one pulse width and three different power values defined as the reference condition. By plotting those three jitter values against a power axis, the tendency of recording characteristics corresponding to the combination of the drive 100 and the medium 50 becomes apparent.

Examination of Recording Quality

Figure 8:
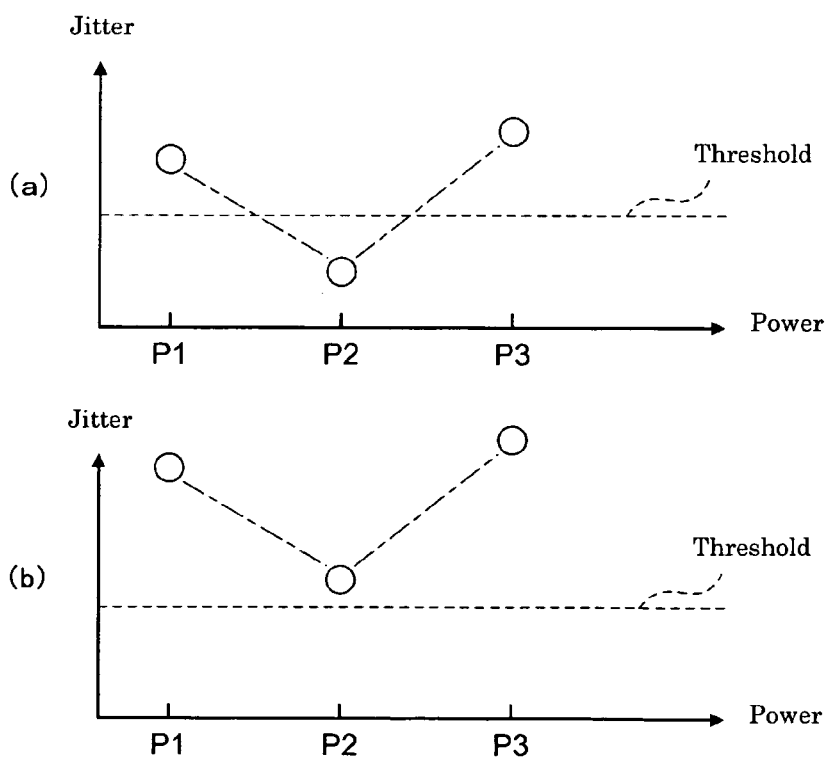
FIG. 8 is a schematic diagram showing an example of a concave pattern obtained as a result of examining recording quality in the step S120 of FIG. 3.

FIG. 8 is a schematic diagram showing an example of a concave pattern obtained as a result of examining recording quality in the step S120 of FIG. 3. As shown in FIG. 8, the examination of the recording quality is conducted using jitter values and thresholds for each of the reference conditions obtained in the above-described steps. The figure exemplifies a case wherein power values P1, P2, and P3 are used respectively as the reference conditions, and a virtual line connecting the jitter values obtained at each power value forms the concave pattern. Such a concave pattern means that the reference medium used in the step S110 and the medium for recording loaded at the step S116 have the same sensitivity and similar recording qualities.

FIG. 8(a) shows an example wherein a minimum value of the concave pattern is equal to or less than a threshold, and FIG. 8(b) an example wherein a minimum value of the concave pattern is more than a threshold. In either pattern, the reference medium and the medium for recording are considered to have the same sensitivity. In such a case where the reference medium and the medium for recording have the same sensitivity, a condition used for a test recording is defined as a plane region of (power)×(pulse width) centering on the reference condition as described below.

In comparison between FIGS. 8(a) and (b), the difference between the reproduction value and the reproduction reference value obtained at each of the recording points P1, P2, or P3, i.e., the difference between the jitter value and the jitter threshold is different, and the obtained reproduction value in FIG. 8(a) is closer to the reproduction reference value than that in FIG. 8(b).

This suggests that the detection of an optimum condition is easier in the case of FIG. 8(a) than in the case of FIG. 8(b). Accordingly, when the recording characteristic shown in FIG. 8(a) is obtained, compared to the case of FIG. 8(b), a smaller number of testing can be set, which allows more suitable solution to be found.

That is, an optimum condition is closer to the reference value when the difference between the reproduction value and the reproduction reference value is smaller, whereas an optimum condition is further from the reference value when the difference between the reproduction value and the reproduction reference value is larger. Thus, when a smaller number of testing is desired, it is preferable to change the number of testing depending on the difference between the reproduction value and the reproduction reference value.

FIG. 9 is a schematic diagram showing an example of a downward-sloping pattern obtained as a result of examining recording quality in the step S120 of FIG. 3. In the example shown in FIG. 9, the downward-sloping pattern wherein a jitter value decreases as a power increases from P1 to P3 is obtained. Such a downward-sloping pattern means that the medium for recording has lower sensitivity than the reference medium.

FIG. 9(a) shows an example wherein a minimum value of the downward-sloping pattern is equal to or less than a threshold, and FIG. 9(b) an example wherein a minimum value of the downward-sloping pattern is more than a threshold. In either pattern, the medium for recording is considered to have lower sensitivity than the reference medium. In such a case where the medium for recording has lower sensitivity than the reference medium, a test recording is conducted under the condition of shifting the test area, which is defined as a plane region of (power)×(pulse width) centering on a reference condition, in the direction of a region with a higher power and a wider pulse width as described below.

Also, when the downward-sloping pattern in FIG. 9 is obtained, recording at a power higher than P3 enables the recording characteristic to be reconfirmed since a minimum jitter value is considered to be present on the higher-power side. In such a case, although the number of testing is increased by 1, accuracy in examining the recording quality can be improved. In addition, in the case that a downward-sloping pattern is obtained, just as in the case of the concave pattern, the number of testing may be changed depending on the difference between the reproduction value and the reproduction reference value.

Further, when the downward-sloping pattern in FIG. 9 is obtained, an optimum solution is considered to be further from the reference condition than in the case of the concave pattern in FIG. 8. Consequently, it is preferable to set a larger number of testing in the case of FIG. 9 compared to the concave pattern case.

FIG. 10 is a schematic diagram showing an example of an upward-sloping pattern obtained as a result of examining recording quality in the step S120 of FIG. 3. In the example in FIG. 10, an upward-sloping pattern wherein a jitter value increases as a power increases from P1 to P3 is obtained. Such an upward-sloping pattern means that the medium for recording has higher sensitivity than the reference medium.

FIG. 10(a) shows an example wherein a minimum value of the upward-sloping pattern is equal to or less than a threshold, and FIG. 10(b) an example wherein a minimum value of the upward-sloping pattern is more than a threshold. In either pattern, the medium for recording is considered to have higher sensitivity than the reference medium. In such a case where the medium for recording has higher sensitivity than the reference medium, a test recording is conducted under the condition of shifting the test area, which is defined as a plane region of (power)×(pulse width) centering on a reference condition, in the direction of a region with a lower power and a narrower pulse width as described below.

Also, when an upward-sloping pattern as shown in FIG. 10 is obtained, since a minimum jitter value is considered to be present on the lower-power side, the recording characteristic can be reconfirmed by recording at a power lower than PI. In such a case, although the number of testing is increased by 1, accuracy in examining the recording quality can be improved. In addition, in the case that a downward-sloping pattern is obtained, just as in the case of the concave pattern, the number of testing may be changed depending on the difference between the reproduction value and the reproduction reference value.

Further, when an upward-sloping pattern as shown in FIG. 10 is obtained, an optimum solution is considered to be further from the reference condition than in the case of the concave pattern shown in FIG. 8. Consequently, it is preferable to set a larger number of testing in the case of FIG. 10 compared to the concave pattern case.

Determination of Test Area

Figure 11:
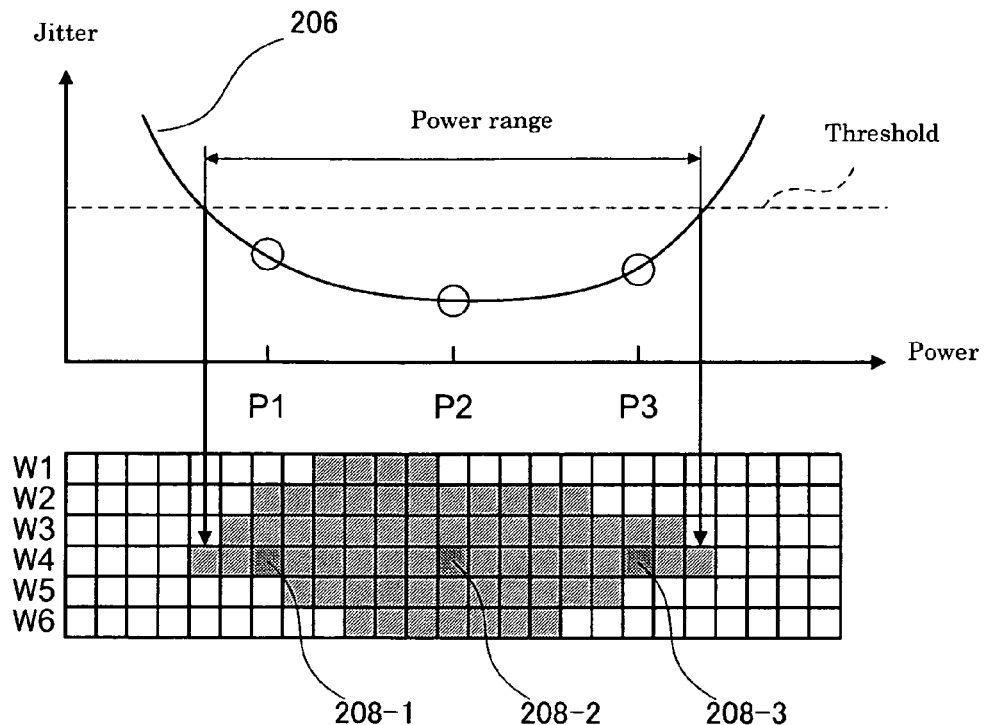
FIG. 11 is a schematic diagram showing an example of determining a test area as conducted in the step S122 in the case of a concave pattern obtained in the step S120 of FIG. 3.

FIG. 11 is a schematic diagram showing an example of determining a test area as conducted in the step S122 in the case wherein a concave pattern is obtained in the step S120 of FIG. 3. As shown in FIG. 11, when a concave pattern is obtained, a power range between two intersections of an approximated curve 206, which represents jitter values obtained at P1 to P3 respectively, with a threshold is defined as a range of changing power used for a test recording. Note that, in certain embodiments, a range of power used for an actual test recording is defined as a "power range," and a range of power with which a jitter value becomes equal to or less than a threshold is defined as a "power margin."

Since the approximated curve 206 varies for each pulse width, recording is conducted for each pulse width at power values of P1 to P3, and intersections of the resulting approximated curve 206 for jitter values with the threshold are obtained. For instance, if the pulse width used as the reference condition is W4, recording is conducted for each of the pulse widths W1 to W6 centering on W4 to find the intersections. As shown in a matrix image of the figure, the power range that is equal to or less than the threshold is obtained for each of the pulse widths, resulting in the test area indicated by a hatched area of the image. In the image, 208-1, 208-2, and 208-3 show the cases wherein recordings are conducted respectively at three power values of P1 to P3, which are used as the reference conditions, for the pulse width W4. The determined test area is defined as a plane region of (power)×(pulse width) centering on the reference condition.

As described, since the area where the jitter value is equal to or less than the threshold is intensively tested to enable to find the power range for each of the pulse widths, more suitable condition can be found with a smaller number of testing.

Also, the number of testing can be reduced by setting larger steps for power variation when a wider power margin is obtained, or by setting smaller steps for power variation when a narrower power margin is obtained. For instance, when a margin of 10 mW is obtained, testing with 2 mW step may be run five times, assuming that an optimum value can be obtained even by rough testing, and when a margin of 1 mW is obtained, testing with 1 mW step may be run ten times, considering that more precise testing are required.

Figure 12:
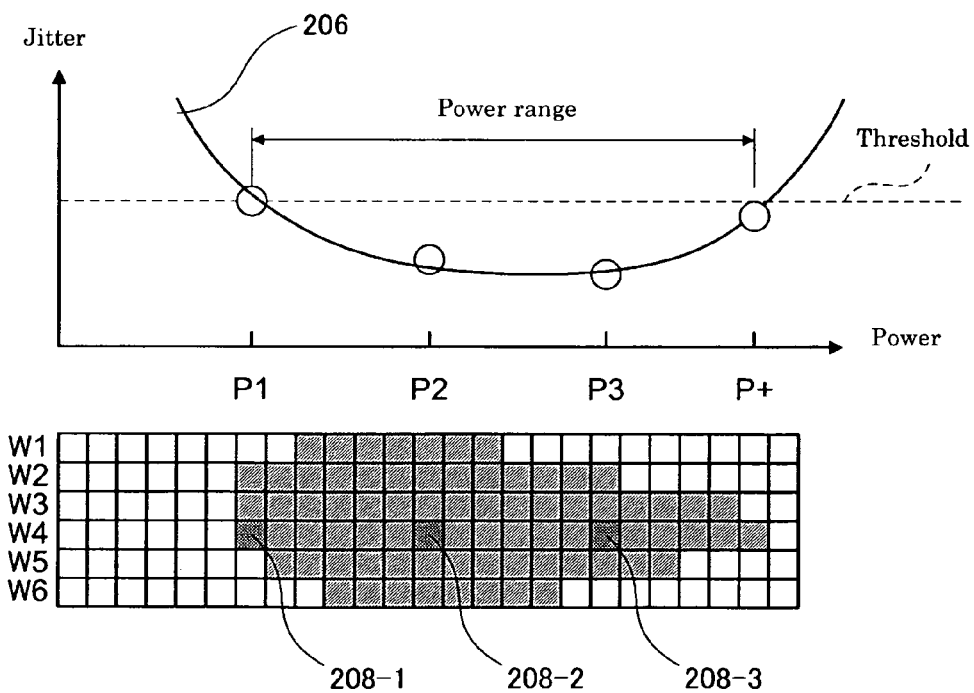
FIG. 12 is a schematic diagram showing an example of determining a test area as conducted in the step S122 in the case of a downward-sloping pattern obtained in the step S120 of FIG. 3.

FIG. 12 is a schematic diagram showing an example of determining a test area as conducted in the step S122 in the case wherein a downward-sloping pattern is obtained in the step S120 of FIG. 3. As shown in FIG. 12, when a downward-sloping pattern is obtained, an optimum condition is considered to be present on a higher-power side. Accordingly, an additional recording is conducted with a power value of P+ (>P3), and a range between two intersections of an approximated curve 206, which represents jitter values obtained at P1 to P3 and P+ respectively, with a threshold is defined as a power range. Conducting this procedure for each pulse width W1 to W6 allows the test area shown in a matrix image of the figure to be obtained.

The test area determined by the above-described procedure is just as a plane region of (power)×(pulse width) centering on a reference condition 208-1, 208-2, and 208-3 shifted to the higher-power side. The pulse widths W1 to W6 used in the case of the concave pattern are also used in this example, but since the medium for recording tends to have lower sensitivity in the downward-sloping pattern, a power range may be shifted to a region with a wider pulse width.

FIG. 13 is a schematic diagram showing an example of determining a test area as conducted in the step S122 in the case wherein an upward-sloping pattern is obtained in the step S120 of FIG. 3. As shown in FIG. 13, when an upward-sloping pattern is obtained, an optimum condition is considered to be present on a lower-power side. Accordingly, an additional recording is conducted with a power value of P+ (<P1), and a range between two intersections of an approximated curve 206, which represents jitter values obtained at P+ and P1 to P3 respectively, with a threshold is defined as a power range. Conducting this procedure for each pulse width W1 to W6 allows the test area shown in a matrix image of the figure to be obtained.

The test area determined by the above-described procedure is just as a plane region of (power)×(pulse width) centering on a reference condition 208-1, 208-2, and 208-3 shifted to the lower-power side. The pulse widths W1 to W6 used in the case of the concave pattern are also used in this example, but since the medium for recording tends to have higher sensitivity in the upward-sloping pattern, a power range may be shifted to a region with a narrower pulse width.

Since the above-described method involves examining recording quality for each pulse width and determining the number of testing for each pulse width based on a result of the examination, reduction in the number of testing can be expected. The examination of recording quality described hereinabove is an example wherein the jitter variation during recording under the reference condition is patterned, and more preferably, it is recommended that the following eight patterns be used.

FIG. 14 is a diagram showing an example wherein the step S120 in FIG. 3 is conducted with eight patterns. As shown in FIG. 14, a pattern 1 is applied to any patterns including the concave, upward-sloping, and downward-sloping patterns when a maximum jitter value is equal to or less than a threshold. When this pattern is obtained, the medium for recording is considered to have comparable sensitivity to the reference medium as well as a wider margin in which jitter values are equal to or less than the threshold can be obtained, and therefore a power condition is extended to both lower- and higher-power sides. In other words, additional recordings are conducted on both lower- and higher-power sides in the pattern 1 because values approximate to the threshold are not obtained.

Subsequently, a curve approximation is conducted to the jitter characteristics obtained as a result of the above-described additional recordings, and the interval between the large and small values at which the approximated curve intersects with the jitter threshold is set as a reference power range.

Further, when the pattern 1 is obtained, a pulse width area with a reference value ±0.2T is defined as a test area, and upon a test recording, an optimum recording condition is detected while varying the pulse width within the test area by 0.2T at one time. In addition, T represents a unit time of a recording pit.

Assuming that a pulse width to be a reference value is a pulse condition 1 and the two extended points are pulse conditions 2 and 3 respectively, the pulse conditions 2 and 3 of the pattern 1 are the pulse widths obtained by extending the pulse condition 1 by ±0.2T. Along with this variation in the pulse width condition, the power range used as a test condition should be slightly modified.

That is, when the pulse width is varied by 0.1T, the power range for the pulse width is set as (the reference power range)×(1−0.05×1) mW, and when the pulse width is varied by 0.2T, the power range for the pulse width is set as (the reference power range)×(1−0.05×2) mW. Further, when the pulse width is varied by −0.1T, the power range for the pulse width is set as (the reference power range)×(1−0.05×(−1)) mW.

Accordingly, test conditions in the case of the pattern 1 are comprised of the following three sets.
 (1) A reference pulse width and a reference power range
 (2) A reference pulse width −0.2T and (a reference power range)×(1−0.05×(−2)) mW
 (3) A reference pulse width +0.2T and (a reference power range)×(1−0.05×(+2)) mW In certain embodiments, the reference condition provided in the above (1) is not necessarily used for an actual test recording.

A pattern 2 is the case in which a concave pattern is obtained, and is applied when a minimum jitter value is equal to or less than a threshold. When this pattern is obtained, the medium for recording is considered to have the same sensitivity as the reference medium, and therefore (a reference value ±0.1T) is selected as a pulse width condition. Subsequently, a power range is defined for each pulse condition by the same procedure as in the case of the pattern 1. Consequently, test conditions in the case of the pattern 2 are comprised of the following three sets.
 (1) A reference pulse width and a reference power range
 (2) A reference pulse width −01.T and (a reference power range)×(1−0.05×(−1)) mW
 (3) A reference pulse width +0.1T and (a reference power range)×(1−0.05×(+1)) mW A pattern 3 is the case in which a concave pattern is obtained, and is applied when a minimum jitter value is more than a threshold. When this pattern is obtained, the medium for recording is considered to have the same sensitivity as the reference medium and a large difference therebetween, and therefore (a reference value ±0.2T) is selected as a pulse width condition, followed by defining a power range for each pulse condition by the same procedure as in the case of the pattern 1. Consequently, test conditions in the case of the pattern 3 are comprised of the following three sets.
 (1) A reference pulse width and a reference power range
 (2) A reference pulse width −0.2T and (a reference power range)×(1−0.05×(−2)) mW
 (3) A reference pulse width +0.2T and (a reference power range)×(1−0.05×(+2)) mW A pattern 4 is the case in which a downward-sloping pattern is obtained, and is applied when a minimum jitter value is equal to or less than a threshold. When this pattern is obtained, the medium for recording is considered to have slightly lower sensitivity than the reference medium, and therefore three pulse width conditions: a reference value, +0.1T, and +0.2T, are selected. Subsequently, a power range for each pulse condition is defined by the same procedure as in the case of the pattern 1. Consequently, test conditions in the case of the pattern 4 are comprised of the following three sets.
 (1) A reference pulse width and a reference power range
 (2) A reference pulse width +0.1T and (a reference power range)×(1−0.05×(+1)) mW
 (3) A reference pulse width +0.2T and (a reference power range)×(1−0.05×(+2)) mW A pattern 5 is the case in which a downward-sloping pattern is obtained, and is applied when a minimum jitter value is more than a threshold. When this pattern is obtained, the medium for recording is considered to have significantly lower sensitivity than the reference medium, and therefore three pulse width conditions: a reference value, +0.2T, and +0.4T, are selected. Subsequently, a power range for each pulse condition is defined by the same procedure as in the case of the pattern 1. Consequently, test conditions in the case of pattern 5 are comprised of the following three sets.
 (1) A reference pulse width and a reference power range
 (2) A reference pulse width +0.2T and (a reference power range)×(1−0.05×(+2)) mW
 (3) A reference pulse width +0.4T and (a reference power range)×(1−0.05×(+4)) mW A pattern 6 is the case in which an upward-sloping pattern is obtained, and is applied when a minimum jitter value is equal to or less than a threshold. When this pattern is obtained, the medium for recording is considered to have slightly higher sensitivity than the reference medium, and therefore three pulse width conditions: a reference value, −0.1T, and −0.2T, are selected. Subsequently, a power range for each pulse condition is defined by the same procedure as in the case of the pattern 1. Consequently, test conditions in the case of the pattern 6 are comprised of the following three sets.
 (1) A reference pulse width and a reference power range
 (2) A reference pulse width −0.1T and (a reference power range)×(1−0.05×(−1)) mW
 (3) A reference pulse width −0.2T and (a reference power range)×(1−0.05×(−2)) mW A pattern 7 is the case in which an upward-sloping pattern is obtained, and is applied when a minimum jitter value is more than a threshold. When this pattern is obtained, the medium for recording is considered to have significantly higher sensitivity than the reference medium, and therefore three pulse width conditions: a reference value, −0.2T, and −0.4T, are selected. Subsequently, a power range for each pulse condition is defined by the same procedure as in the case of the pattern 1. Consequently, test conditions in the case of the pattern 7 are comprised of the following three sets.
 (1) A reference pulse width and a reference power range
 (2) A reference pulse width −0.2T and (a reference power range)×(1−0.05×(−2)) mW
 (3) A reference pulse width −0.4T and (a reference power range)×(1−0.05×(−4)) mW A pattern 8 is the case in which a convex pattern is obtained, and is applied when a minimum jitter is more than a threshold. When this pattern is obtained, it is considered as an error pattern and (a reference value ±0.2T) is selected as a pulse width condition. Subsequently, a power range for each pulse condition is defined by the same procedure as in the case of the pattern 1. Consequently, test conditions in the case of the pattern 8 are comprised of the following three sets.
(1) A reference pulse width and a reference power range
(2) A reference pulse width −0.2T and (a reference power range)×(1−0.05×(−2)) mW
(3) A reference pulse width +0.2T and (a reference power range)×(1−0.05×(+2)) mW In addition, when any pattern other than the pattern 2 wherein the medium for recording is closest to the reference medium is detected among the above-described 8 patterns, a jitter may be further detected by again reproducing the recording result, from which a pattern is obtained, in order to confirm that the pattern is not due to a reproduction error. When a characteristic other than the pattern 2 is again obtained by the additional reproduction, a new recording condition may be added or the existing recording condition may be extended based on the conditions shown in FIG. 14.

When the pattern 8 is obtained as a result of checking the reproduction error as described above, recording is conducted again with the reference pulse width before conducting an additional recording and a pulse width extension since a recording error may exist. When the pattern 8 is again obtained as a result of reproducing the recording, an extension of pulse condition, i.e., the extension of the pulse conditions 2 and 3 is conducted instead of conducting an additional recording, i.e., a power extension to measure the margin for the pulse condition 1. A power extension corresponding to the extension of the pulse conditions 2 and 3 can be conducted by the aforementioned procedure.

That is, when the pattern 8 is obtained, a reference power range for the extension cannot be determined since a margin cannot be ensured with the pulse condition 1. Accordingly, the initial power condition range is set as a reference power range.

Determination of Test Area: Determination of Power Range by Approximation Method Further to the above-described procedure that enables to determine the test area in which an optimum solution can be obtained by the smallest possible number of testing, a determination method of a power range, which is important for the determination of the test area, should be described below.

Since it is one object of certain embodiments to improve the accuracy of finding an optimum solution with the smallest possible number of testing, test conditions are concentrated in the area equal to or less than a threshold as described above. Based on such an idea, a power range used for a test recording may be obtained from larger and smaller power values that indicate a margin for a threshold. The "margin for a threshold" means a range where a characteristic value equal to or less than the threshold can be obtained, and "larger and smaller power values" means two values on lower- and higher-power sides respectively that define a range of the margin.

Considering the time reduction in a test recording for each type of media and the efficient use of a test area in a medium such as a write-once medium having a limited test recording area, the smallest possible number of recording points is preferably required. However, since a power range obtained in this procedure is an important parameter to be a criterion of an optimum recording condition, the highest possible accuracy is much more required rather than the smallest possible number of testing.

Obtaining a more accurate power range means more intensive testing in a selected area, and accordingly contributes to the reduction in the number of testing. For instance, when conducting a test recording once for every 0.1 mW, the test recording is conducted 10 times for the power range of 1 mW and 20 times for the power range of 2 mW, and thus, narrowing the power range can contribute to the reduction in the number of testing.

In consideration of recording quality of the recording/reproduction signal that shows a variation like a quadratic curve having an extremal value as an optimum point against the variation in recording power, certain embodiments propose a method in which a desired margin amount is obtained by approximating a characteristic curve using several recording points. Such an approximating method enables a power range to be precisely and easily obtained with several recording points, and the number of testing to be reduced.

Figure 15:
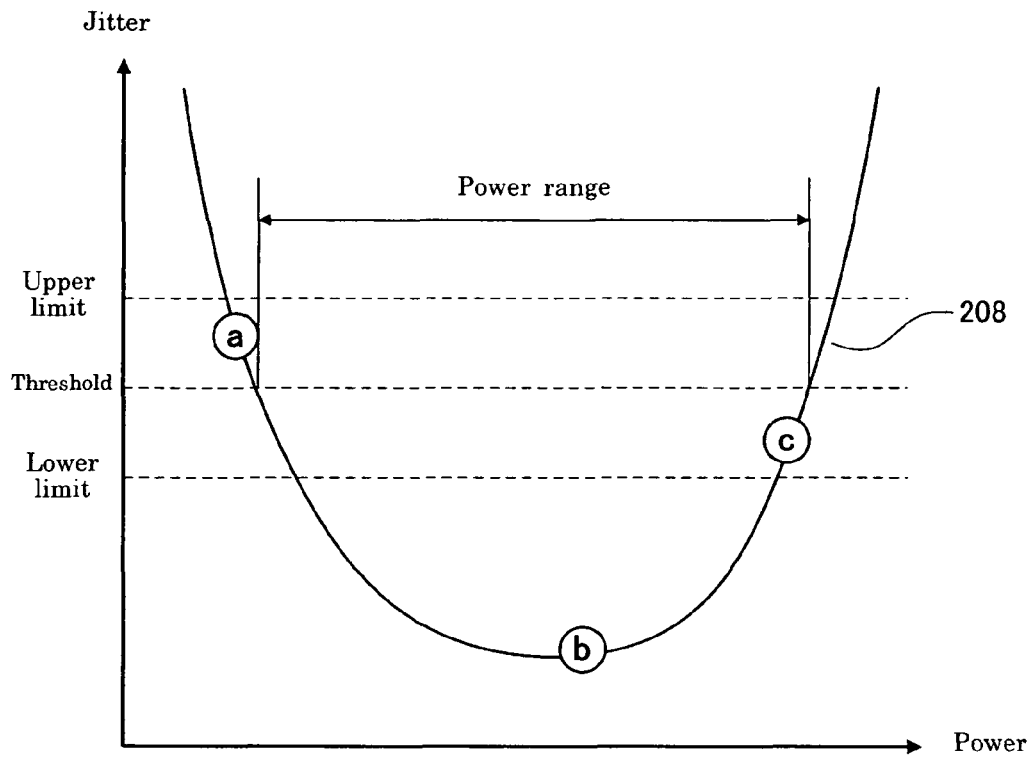
FIG. 15 is a schematic diagram showing a method for obtaining a power range used in the step S122 of FIG. 3 by curve approximation.

FIG. 15 is a schematic diagram showing a method for obtaining the power range used in the step S122 of FIG. 3 by curve approximation. As shown in FIG. 15, an approximation is conducted by first selecting points a, b, and c, wherein the points a and c are on lower- and higher-power sides respectively, at which jitter values criterial for recording characteristics are in a vicinity of a threshold, and the point b is located between the points a and c, at which a jitter value is smaller than that at the point a, point c, or the threshold. Accordingly, the relation between the points a, b, and c is expressed as below.

$$a>b, c>b, \text{ and threshold}>b \quad \text{Equation (1)}$$

As shown in FIG. 15, the "vicinity of a threshold" is defined as a range between upper and lower limits that are away from the threshold by certain amount. Preferably, the upper limit value is set to be 40% more than the threshold, and the lower limit value to be 5% less than the threshold. Subsequently, the values at the points a, b, and c are approximated with a quadratic function, and the difference between larger and smaller points, at which the quadratic function intersects with the threshold, is defined as a power range. In addition, a range defined as the vicinity of a threshold can be modified in consideration of the interval between recording points, such as −5% to +40% or −10% to +30%.

Figure 16:
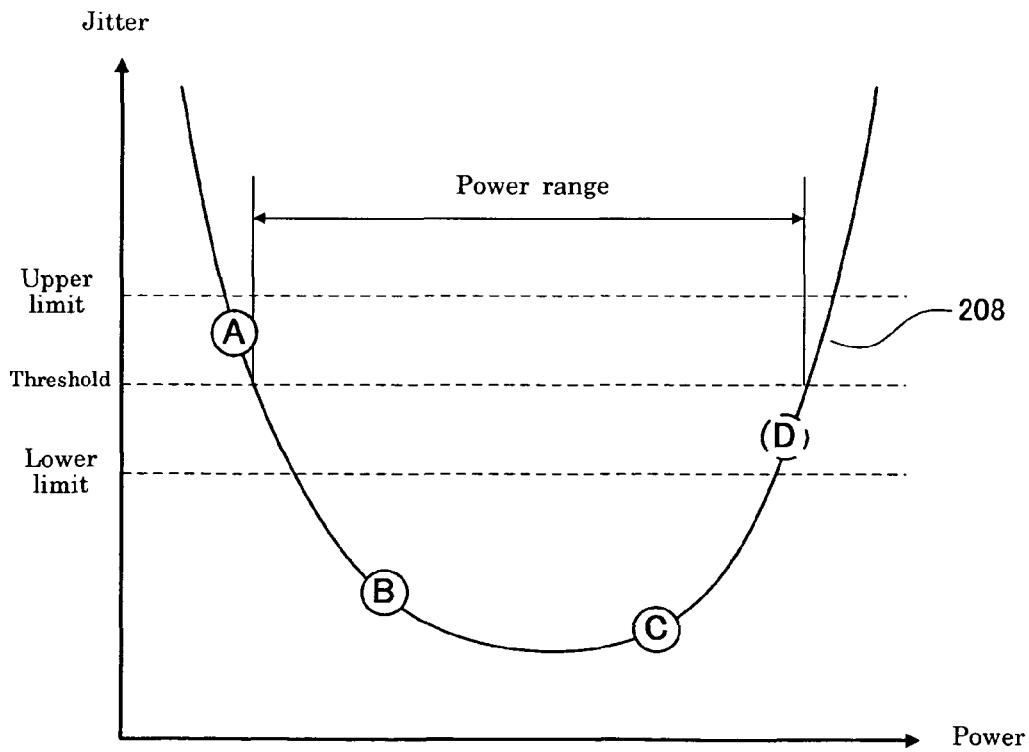
FIG. 16 is a schematic diagram showing another example of a method for obtaining the power range used in the step S122 of FIG. 3 by curve approximation.

FIG. 16 is a schematic diagram showing another example of a method for obtaining the power range used in the step S122 of FIG. 3 by curve approximation. As shown in FIG. 16, when the conditions of A, B, and C are not sufficient to satisfy the above-described relationship of "a>b, c>b, and threshold>b," it is preferable to obtain another value in the vicinity of a threshold by adding a point D on a higher-power side.

Further, when the relationship of B>C exists as shown in the figure, it is preferable to obtain an approximation expression with the three points A, C, and D without the use of B.

Since the relationship between the three recording points and the threshold is "A>C, D>C, and threshold>C" that is suitable for drawing an approximation curve, a highly accurate approximated curve can be obtained by using the three points. In addition, an additional recording condition for the point D may be determined according to the relationship of the recording points A, B, and C prior to the additional recording, i.e., A>B and B>C, and a threshold.

Also, contrary to FIG. 15, recording can be conducted under a power condition lower than at the point A when a value in the vicinity of a threshold does not exist on a lower-power side. Depending on the relation between recording points and the threshold, one or more recording conditions may be added.

In addition, a power range used for the additional recording condition may have a constant variation to a predetermined power step, or a power condition may be set after preliminarily obtaining the relation between a jitter variation and a power variation.

In case that appropriate recording points for finding a power range are not obtained even by adding a recording condition as described above, recording points may be changed by a further addition of a recording condition with the aforementioned procedure.

In case of a medium with a limited test recording area such as a write-once medium, or in case of avoiding the use of significant amount of testing time, the number of the above-described additional recording conditions may have an upper limit. Also, a recording power may have an upper limit in order to prevent the recording power from exceeding a specified maximum laser output power due to the additional recording conditions.

Further, a power range is obtained by the three-point approximation in the above-described example, but it may also be determined in such a way that two points closest to a threshold are first selected, and then the difference between two power values corresponding to those two points is obtained.

Another method for selecting two points in the vicinity of a threshold may be configured, wherein recording is repeated with varying a power until larger and smaller points that are respectively located on higher and lower sides of the threshold are obtained, and two points that are closest to the threshold among all of the recorded points or two points that are located on either side of the threshold are selected. Details of the method are described below.

Determination of Test Area: Determination of Power Range by Sampling

Figure 17:
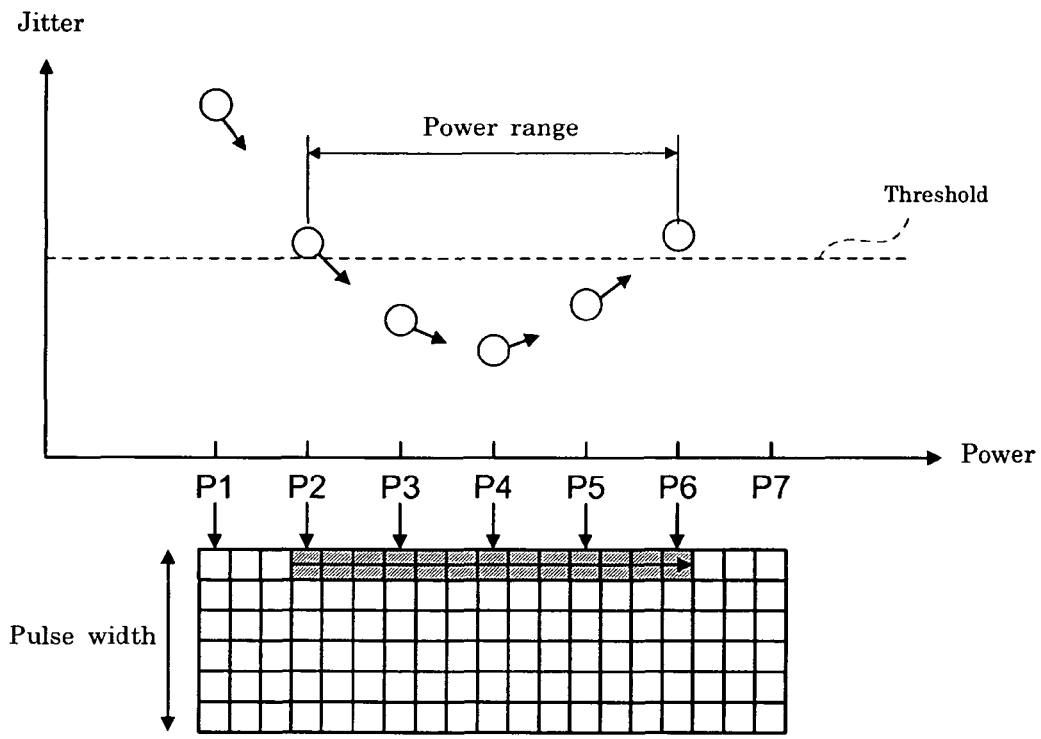
FIG. 17 is a schematic diagram showing an example of obtaining the power range used in the step S122 of FIG. 3 by sampling.

FIG. 17 is a schematic diagram showing an example of obtaining the power range used in the step S122 of FIG. 3 by sampling. As shown in FIG. 17, instead of approximating three points as described above, the power range is obtained on the basis of larger and smaller power values that are close to a threshold while gradually varying a power until values close to the threshold are obtained.

In other words, as shown in FIG. 17, recording/reproduction is repeated while varying the recording power from P1 to P2, P3, . . . up to a power of P6 at which a value more than the threshold is obtained. A matrix image of this step shows that the power is varied from P1 to P6, but the power range is between P2 on a lower-power side and P6 on a higher-power side that are both closest to the threshold. Thus, a power range may be determined by selecting two points respectively located on either side of a threshold.

A method for selecting the two points, higher and lower, closest to a threshold involves selecting the use of one of the following as appropriate.

1) A method for selecting higher and lower points that define a power margin, that is, selecting two points that are in a power area wherein a reproduction reference value is satisfied, and both closest to a reproduction reference value.
2) Selecting two points closest to a reproduction reference value that are slightly outside of a power margin.
3) Selecting two points that are on either side of a reproduction reference value and on a lower-power side.
4) Selecting two points that are on either side of a reproduction reference value and on a higher-power side.
5) Selecting two points that are on either side of a reproduction reference value and on the lower- and higher-power sides respectively, and both close to a reproduction reference value.

Also, approximating recording characteristics using two points selected by one of the above-described methods allows two points at which the approximated curve intersects with a reproduction reference value to be selected.

Determination of m'T/(n−m)T Ratio

Figure 18:
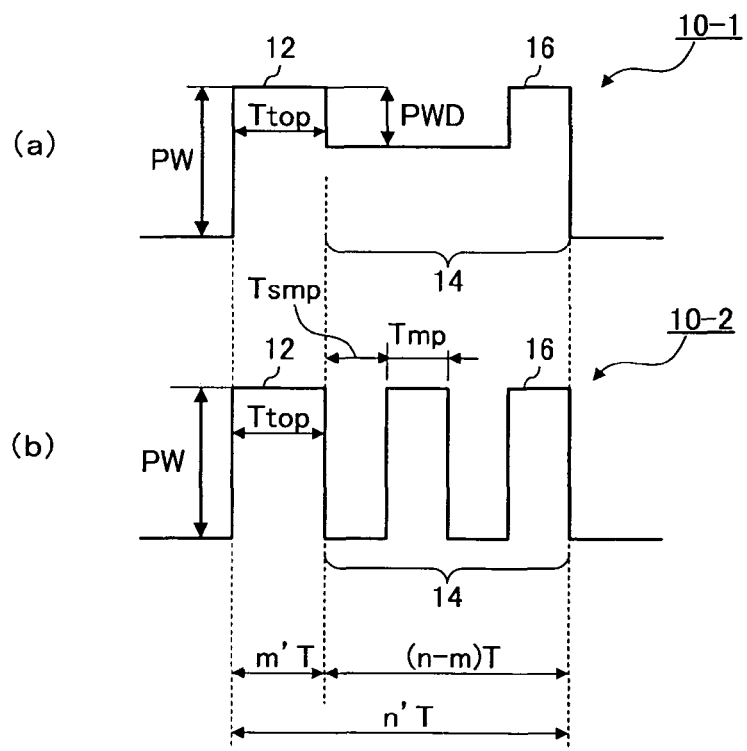
FIG. 18 is a schematic diagram showing an example of a test recording pulse that is used for the determination of a ratio in the step S200 in FIG. 1(b).

FIG. 18 is a schematic diagram showing an example of a test recording pulse that is used for the determination of a ratio in the step S200 of FIG. 1(b). FIG. 18(a) is an example of a case using a single pulse comprised of a single pulse pattern, and FIG. 18(b) a multipulse comprised of a plurality of pulse patterns. As shown in the figure, a single pulse 10-1 and multipulse 10-2 are comprised of a top pulse 12 located at the front of a recording pulse and a succeeding pulse 14 that follows the top pulse, wherein the succeeding pulse 14 has a rear-end pulse 14 at the end of the recording pulse.

An energy amount of the entire recording pulse is defined by the height of a main power PW, and an initial energy amount supplied to the initial position of a recording pit is defined by the length of a top pulse width Ttop. The main power PW preferably has the highest value in the recording pulse 10-1 or 10-2, and the top pulse width Ttop has a width that corresponds to the shortest recording pit having a length of 3T. Since the recording pulse having the shortest width has the highest appearance rate and significantly affects recording quality, an optimum condition for the power PW and the pulse width Ttop of the top pulse 12 is first determined in the above-described determination flow of the m'T condition.

Subsequently, a determination flow of m'T/(n−m)T ratio is conducted to determine a condition for the succeeding pulse 14. As a succeeding pulse condition in the case of the single pulse 10-1, as shown FIG. 18(a), a lower-power area where the power is lower than the main power PW by PWD is defined in the lower-power area, whereby a recording pit is prevented from forming a tear drop shape. Similarly, in the case of the multipulse 10-2, as shown in FIG. 18(b), defining an intermediate pulse width Tmp located between the front top pulse 12 and the rear-end pulse 14 or a duty ratio between Tmp and Tsmp prevents a recording pit from forming a tear drop shape. The determination of the succeeding pulse condition is conducted on the basis of the top pulse condition.

FIG. 19 is a flowchart showing a procedure of the determination flow of a ratio in the step S200 in FIG. 1(b). As shown in FIG. 19, the drive shown in FIG. 2 conducts a test recording to the medium 50 with a plurality of recording patterns obtained by varying the condition for (n−m)T in order to set various parameters for a recording strategy to be implemented by the strategy circuit 102 (step S210). In this step, an m'T pulse condition is fixed to the value obtained in the above-described determination flow of m'T condition. Then, a recording pattern obtained by the test recording is reproduced (step S212), and a binarized reproduction signal obtained through a binarization circuit 110 is counted in a recording shift detection part 112 using a counter synchronized with a predetermined clock (step S214). Subsequently, lengths of pits and lands included in the binarized reproduction signal are stored in a recording area 115 as count data (step S216).

Then, the recording shift detection part 112 generates a histogram showing an appearance rate of each count value using the count data stored in the recording area 115 (step S218) and a threshold for count data that provides a criterion for a pit or land length (step S220).

Subsequently, the recording shift detection part 112 searches various types of specific patterns including a specific pit/land pattern from the count data stored in the recording area 115 on the basis of the threshold (step S222), and average lengths of respective pits and respective lands comprising the specific patterns are evaluated by averaging the count results for the pits, which are considered to have the same pit length included in the specific patterns, and by averaging the count results for the lands considered to have the same land length (step S224).

Subsequently, the recording shift detection part 112 configures one of the extracted specific patterns as an extracted pattern, and comparing a recording pit length included in the extracted pattern with the reference length (step S226) allows a shift length of a pit relative to the recording pulse to be detected independently (step S228).

Then, an equation derivation part 113 derives an equation for determining an optimum strategy based on the shift length detected by the recording shift detection part 112. A strategy determination part 114 predicts a control result of various parameters using the equation derived by the equation derivation part 113 (step S230), and then PWD and Tmp shown in FIG. 18 are determined based on the prediction and configured to the strategy circuit 102 (step S232).

Figures 20, 21:
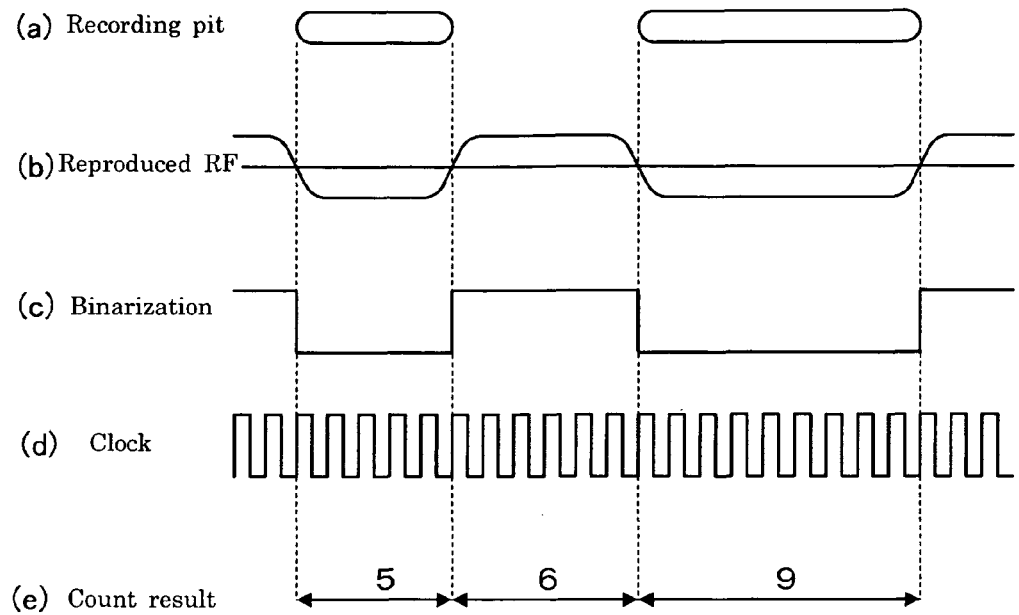
FIG. 20 is a schematic diagram showing an operational concept from the step of a test recording to the step of detecting an amplitude level shown in FIG. 19.
FIG. 21 is a schematic diagram illustrating an image of storing count results shown in FIG. 19.

FIG. 20 is a schematic diagram showing an operational concept from the step of a test recording to the step of detecting an amplitude level shown in FIG. 19. As shown in FIG. 20, a test recording forms recording pits as shown in FIG. 20(a) onto an optical disk. Then, when the recording pits are reproduced, as shown in FIG. 20(b), a reproduction RF signal corresponding to the recording pits is obtained. By binarizing the reproduction RF signal, a binarized reproduction signal shown in FIG. 20(c) is obtained, and by counting a length of each pulse having either polarity shown in the binarized signal with a clock signal as shown in the diagram (d), a count result shown in FIG. 20(e) is obtained.

FIG. 21 is a schematic diagram showing an image of storing the count result shown in FIG. 19. As shown in FIG. 21, the count result for each pulse having either polarity obtained by counting the binarized signal using the clock signal is stored in a table provided in the storage area 115 in time-series order. The table shown in FIG. 21 is stored along with addresses that enable later searching.

Figure 22:
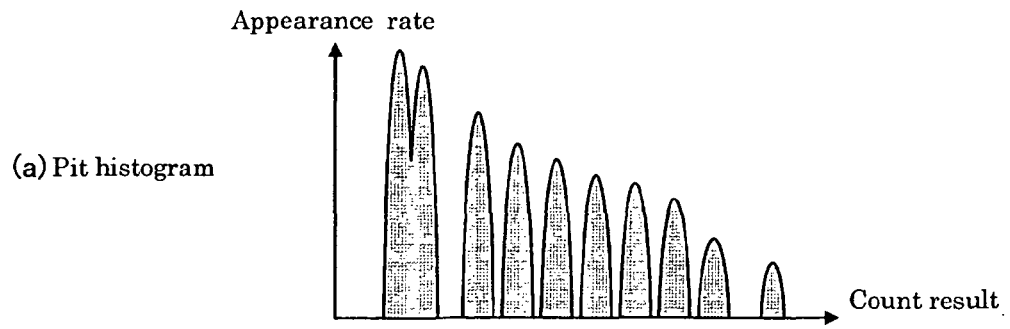
FIG. 22 is a schematic diagram illustrating an image of creating a histogram shown in FIG. 19.

FIG. 22 is a schematic diagram showing an image of creating a histogram shown in FIG. 19. As shown in FIG. 22, a histogram is obtained by graphing appearance rates for the respective count values, and creating separate histograms for pits and lands respectively enables two different types of histograms, that is, a pit histogram showing a count tendency of pits (FIG. 22(a)) and a land histogram showing that of lands (FIG. 22(b)) to be obtained. Thus, since each unit length $nT$ ($n=3, 4, 5, \ldots 14$) based on the reference clock is inevitably determined in optical disks, peaks showing the distribution of appearance rates for respective unit lengths $nT$ are obtained.

Figure 23:
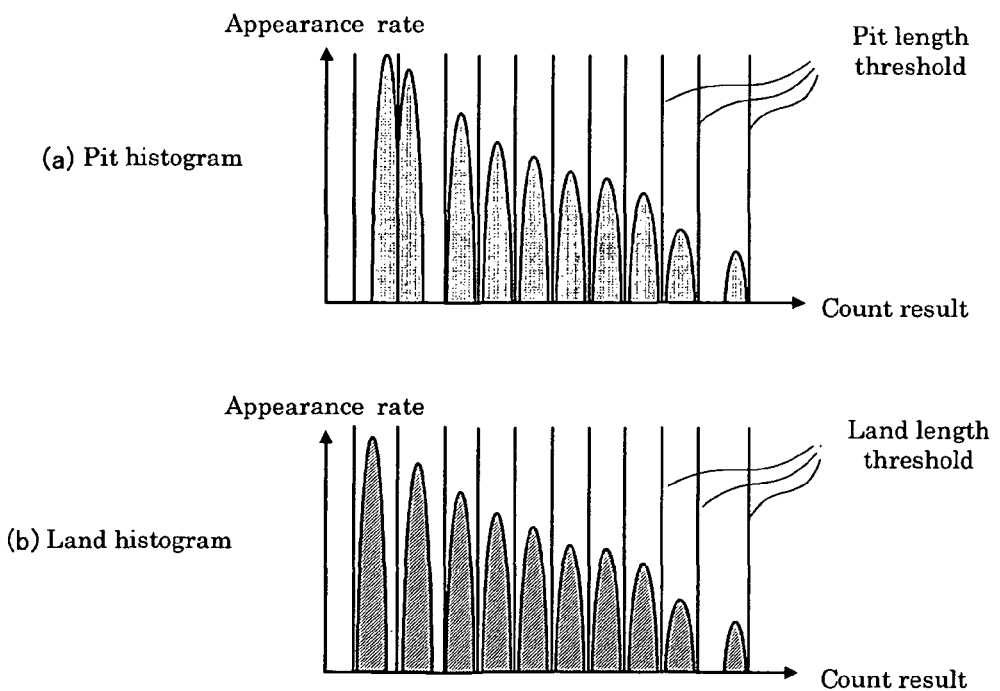
FIG. 23 is a schematic diagram illustrating an image of the determination of a threshold shown in FIG. 19.

FIG. 23 is a schematic diagram showing an image of the determination of a threshold shown in FIG. 19. As shown in FIG. 23, since each valley portion formed between two adjacent peaks in each of the histograms can be used as a criterial threshold for each of unit lengths $nT$, a pit length threshold that provides a criterion for each of pit lengths and a land length threshold that provides a criterion for each of land lengths are defined regarding the pit histogram and land histogram respectively.

Figures 24, 25:
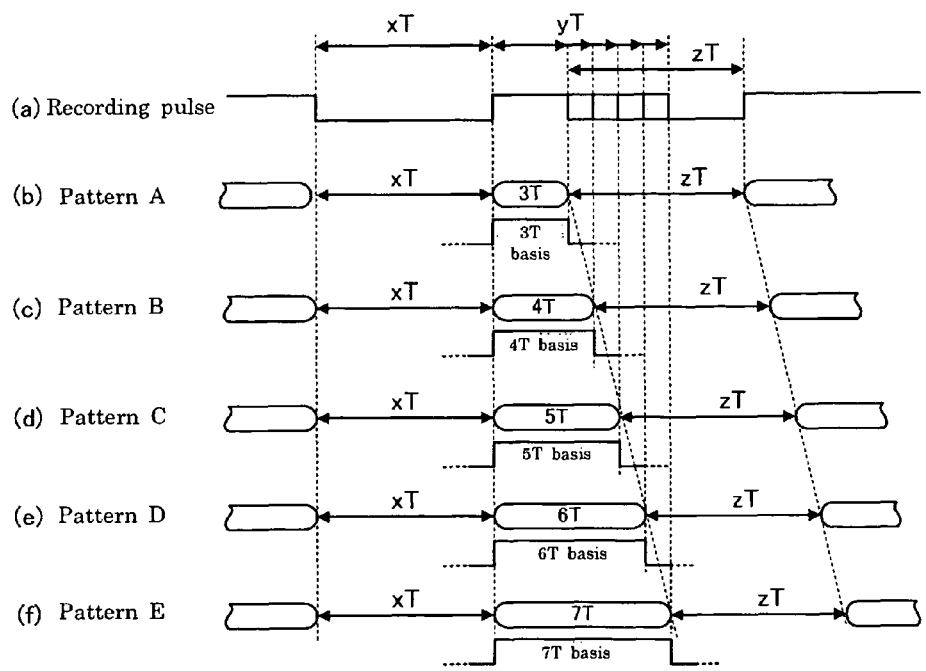
FIG. 24 is a schematic diagram showing an example of thresholds obtained by the method shown in FIG. 23.
FIG. 25 is a schematic diagram showing an example of a recording pattern for detecting a shift length due to a pit balance.

FIG. 24 is a schematic diagram showing an example of thresholds obtained by the method shown in FIG. 23. Each pit length threshold is defined for each boundary between two adjacent pit lengths as shown in FIG. 24(a), and each land length threshold is defined for each boundary between two adjacent land lengths as shown in FIG. 24(b). The example in FIG. 24(a) shows that a threshold provided at a boundary between 2T and 3T is "count value=2", between 3T and 4T is "count value=9" and a threshold is defined up to the boundary between 14T and 15T. The example in FIG. 24(b) shows that a threshold provided at a boundary between 2T and 3T is "count value=2" and between 3T and 4T is "count value=10". Likewise, a threshold is defined up to the boundary between 14T and 15T.

Next, each of the steps shown in FIG. 19, from the step of searching a specific pattern (step S222) to the step of detecting a shift length (step S228), is described below in details. The steps are conducted in the recording shift detecting part 112, based on a principle for detecting various types of shifts.

FIG. 25 is a schematic diagram showing an example of a recording pattern for detecting a shift length due to a pit balance, where the "pit balance" means the balance between the above-described top and succeeding pulses. As shown in FIG. 25, in order to detect a shift length due to the pit balance, a test recording is conducted using a recording pulse shown in FIG. 25(a). The recording pulse includes a pattern comprised of a land LxT, a pit PyT, and a land LzT successively and is generated by, while fixing the lengths of the fixed lands LyT and LzT, varying the pit length of the variable pit PyT from 3T to 7T as shown in FIGS. 25(b) to (f). Although not shown in the figure, the length of the variable pit PyT is varied up to 14T.

When the length of each variable pit PyT in the recording pattern is measured, it should correspond to an ideal pit length under an ideal recording condition.

However, if the length of the variable pit PyT is shifted from the predetermined ideal length, since the lengths of the lands LxT and LzT are fixed, the shift length of each of the variable pits PyT, i.e., P3T, P4T, . . . or P14T, from the predetermined length corresponds to a shift length relative to each unit length 3T, 4T, . . . or 14T of the recording pulse generated with a strategy during recording.

Thus, a test recording is conducted with a certain strategy, and then based on the reproduction pattern of the test recording using the recording pulse, a shift length of each pit from the reference length can be detected by comparing the recording result of the variable pit PyT with the reference length of each pit as shown in FIGS. 25(b) to (f).

FIG. 26 is a schematic diagram showing a table configuration for searching a specific pattern used in the detection of a shift length due to a pit balance. In the case of detecting a shift length due to a pit balance, data stored in the storage area 115 shown in FIG. 2 are searched according to the threshold range for a land LxT, a pit PyT, or a land LzT defined for each specific pattern (step S222 in FIG. 19), and a data stream that satisfies the threshold range is extracted.

Subsequently, count values for each of the land LxT, the pit PyT, and the land LzT are sorted and averaged (step S224 in FIG. 19). Conducting the pattern comparison shown in FIG. 25 using the averages of the count values allows a front-side phase shift length of each pit length to be obtained.

FIG. 27 is a schematic diagram showing a specific example of a case wherein a shift length is detected by a count result comparison. As shown in FIG. 27, when detecting a shift by a comparison with an ideal reference length, a specific pattern shown in FIG. 27(a) is searched in and extracted from a group of the data stored in the storage area, and then a count result for the specific pattern and a count value for the reference length are compared as shown in FIGS. 27(b) and (c). In the example shown in the figure, a 3T pit is used as the reference length for the comparison. Thus, the count result of "9" for the specific pattern shown in FIG. 27(b) and that of "8" for the reference length shown in FIG. 27(c) are compared with each other to obtain the difference therebetween, resulting in the shift length of "1" for the 3T pit.

Figure 28:
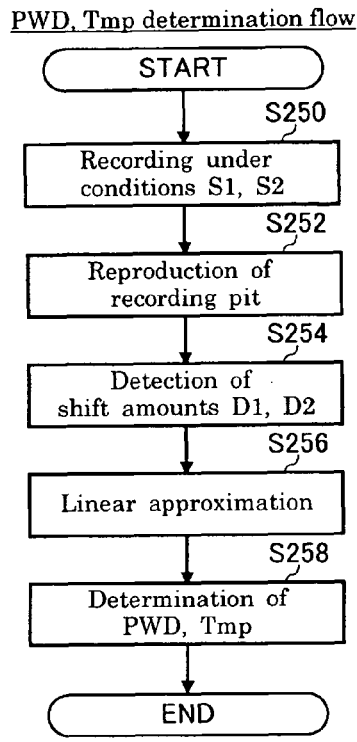
FIG. 28 is a flowchart showing an example of executing the prediction of a control amount shown in FIG. 19.

FIG. 28 is a flowchart showing an example of executing the prediction of a control amount shown in FIG. 19. As shown in FIG. 28, a control amount is predicted by a method comprising: conducting a procedure of a test recording under two or more types of recording conditions including S1 and S2 (step S250); reproducing recording pits obtained by the test recording (step S252); comparing the obtained reproduction patterns in order to find a shift length D1 under the condition of S1 and a shift length D2 under the condition of S2 (step S254); then linearly approximating the relationship between (S1, D1) and (S2, D2) (step S256); and finally determining an optimum correction amount using the approximated line (step S258).

The shift lengths D1 and D2 detected as described above vary depending on various setting parameters of a strategy, and it has been clarified as a result of analysis that the shift lengths D1 and D2 vary almost linearly.

Thus, the shift lengths in the respective test recordings detected in the recording shift detection part 112 can be understood as a linear variation that is approximated based on a least-square method.

When a test recording is repeated twice for instance in the drive of certain embodiments, an optimum strategy can be determined by using the linear relationship between various setting parameters of the strategy and the detected shift lengths D1 and D2. In addition, certain embodiments also allow a curve approximation to be used instead of linear approximation.

Specifically, a typical parameter to be varied with changing the recording condition from S1 to S2 is PWD in a single pulse case or Tmp in a multipulse case. Varying the parameter with changing the recording condition from S1 to S2 enables shift lengths to be detected as D1 and D2 respectively. Then, a linear approximation is conducted with those two sets, and using the approximated line, a correction amount to cancel the shift lengths is obtained.

Figure 29:
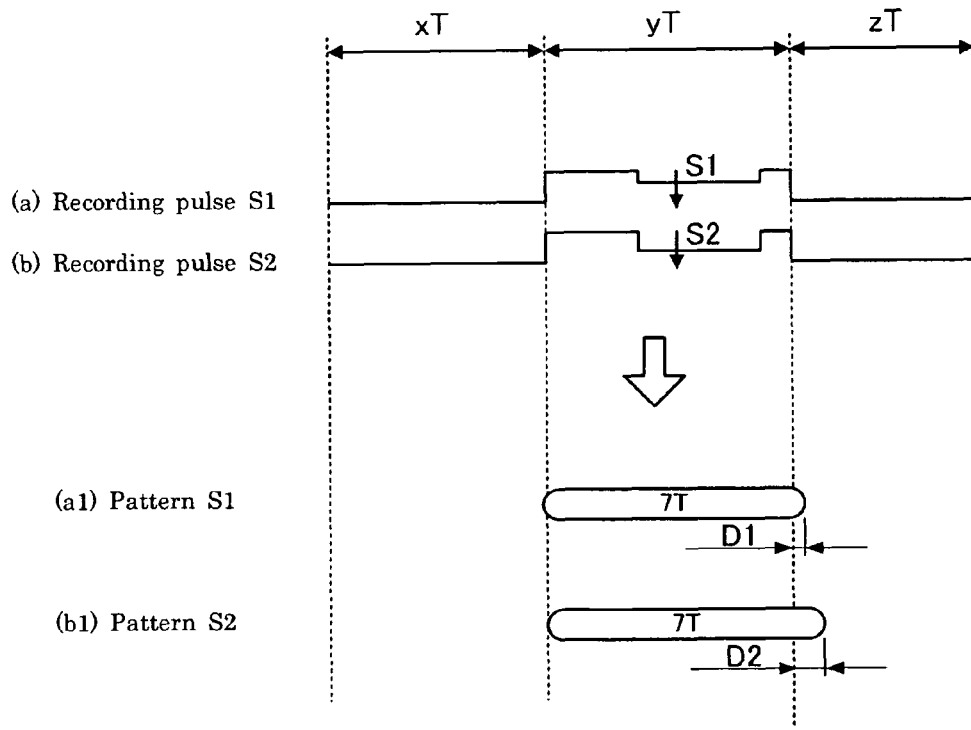
FIG. 29 is a schematic diagram showing a relation between recording conditions (S1 and S2) and shift lengths (D1 and D2) in the case of varying PWD to determine a correction amount.

FIG. 29 is a schematic diagram showing the relation between recording conditions (S1 and S2) and shift lengths (D1 and D2) in the case of varying PWD to determine a correction amount. A recording pulse shown in FIG. 29(a) is a recording pulse S1 obtained by varying PWD by the amount of S1, and FIG. 29(b) is a recording pulse S2 obtained by varying PWD by the amount of S2, and the two recording pulses are used for test recordings.

As a result, a pattern S1 shown in FIG. 29(a1) is obtained correspondingly to a recording pulse shown in FIG. 29(a), and a pattern S2 shown in FIG. 29(b1) is obtained correspondingly to a recording pulse shown in FIG. 29(b). A shift length D1 is caused by the control amount S1 in the pattern S1, and a shift length D2 is caused by the control amount S2 in the pattern S2.

When the shift lengths D1 and D2 respectively corresponding to the control amounts S1 and S2 are obtained, a shift length caused by applying a control amount to any of the parameters becomes predictable. Accordingly, a prediction of a control amount and a determination of a correction value are conducted using the above relationship between a control amount applied to a parameter and a shift length caused thereby.

Figure 30:
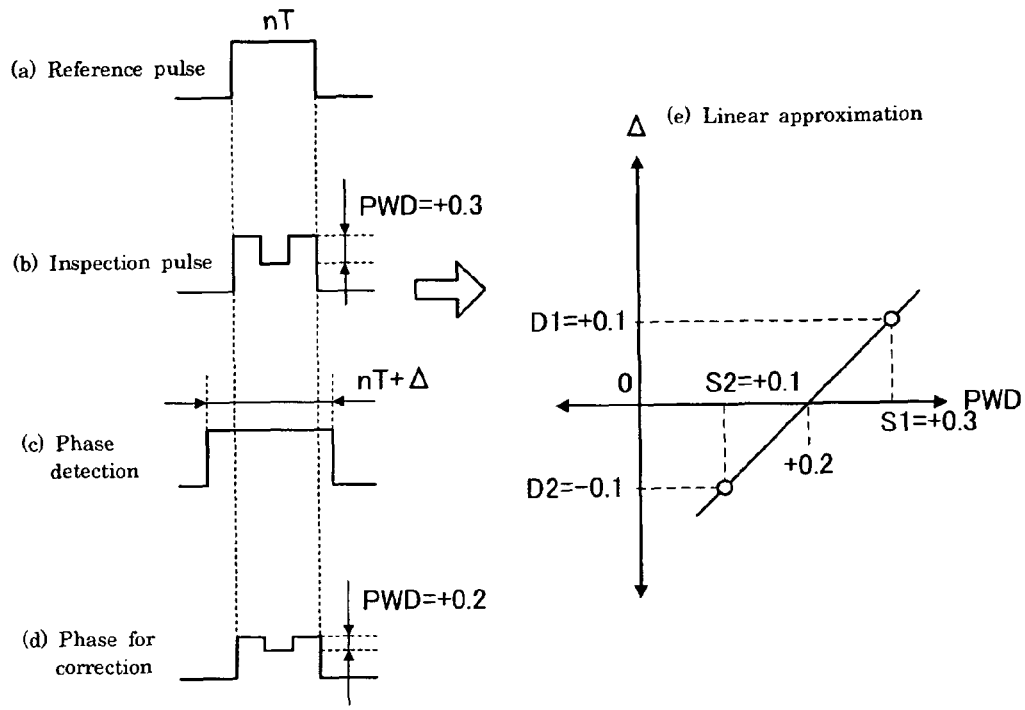
FIG. 30 is a schematic diagram showing an example of correcting a shift length using a linear approximation in the case of a single pulse.

FIG. 30 is a schematic diagram showing an example of correcting a shift length using a linear approximation in the case of a single pulse. A determination of a correction amount PWD corresponding to the shift length involves: when a reference waveform nT is adapted to have a reference pulse length (FIG. 30(a)), conducting a test recording with a waveform that lacks the center of the pulse by the amount of PWD (FIG. 30 (b)); and detecting a shift length Δ of an obtained reproduction signal (FIG. 30(c)).

In the example shown in FIG. 30, varying the amount PWD from S1=+0.3 to S2=+0.1 results in respective shift lengths Δ as D1=+0.1 and D2=−0.2. Then, using the obtained (S1, D1) and (S2, D2), the relationship between the control amount PWD and the resulting shift length Δ is linearly approximated as shown in FIG. 30(e), and the approximated line is used to find the correction amount PWD=+0.2 as an optimum correction amount, with which a shift length is canceled. In this procedure, a top pulse condition is fixed.

As described above, a linear or curve approximation can be applied to the relationship between the variations in strategy (S1 and S2) and in shift length (D1 and D2) when at least two points for each of the variations are obtained, and the approximated line (curve) enables an optimum correction amount with which a shift length becomes zero to be found.

Specifically, a procedure comprising: obtaining several shift lengths D by varying a strategy S; substituting several sets of the strategy S and the corresponding shift length D into a general expression of "D=a*S+b"; and solving simultaneous equations obtained by the substitution enables the constants a and b in the expression to be determined, resulting in the determination of a strategy S for an ideal shift length D. Applying the strategy S to the strategy circuit 102 shown in FIG. 1 enables a recording pulse to be optimally corrected.

For instance, assuming that the recording shift detection part 112 shown in FIG. 2 detects a shift length as D1 from a reproduction pattern of a test recording using a strategy S1 and that as D2 using the other strategy S2, the following simultaneous equations are obtained:

$$D1=a*S1+b, \qquad \text{Equation (2)}$$

and $$D2=a*S2+b. \qquad \text{Equation (3)}$$

From the above equations, the constants a and b are calculated, whereby the following relationship between S and D is obtained:

$$S=(D-b)/a. \qquad \text{Equation (4)}$$

Substituting an output shift length D for improving recording quality, for instance, an output shift length for correcting an initial output shift length arising in an equalizer or the like, into the above relationship enables an optimum strategy S to be determined.

Figure 31:
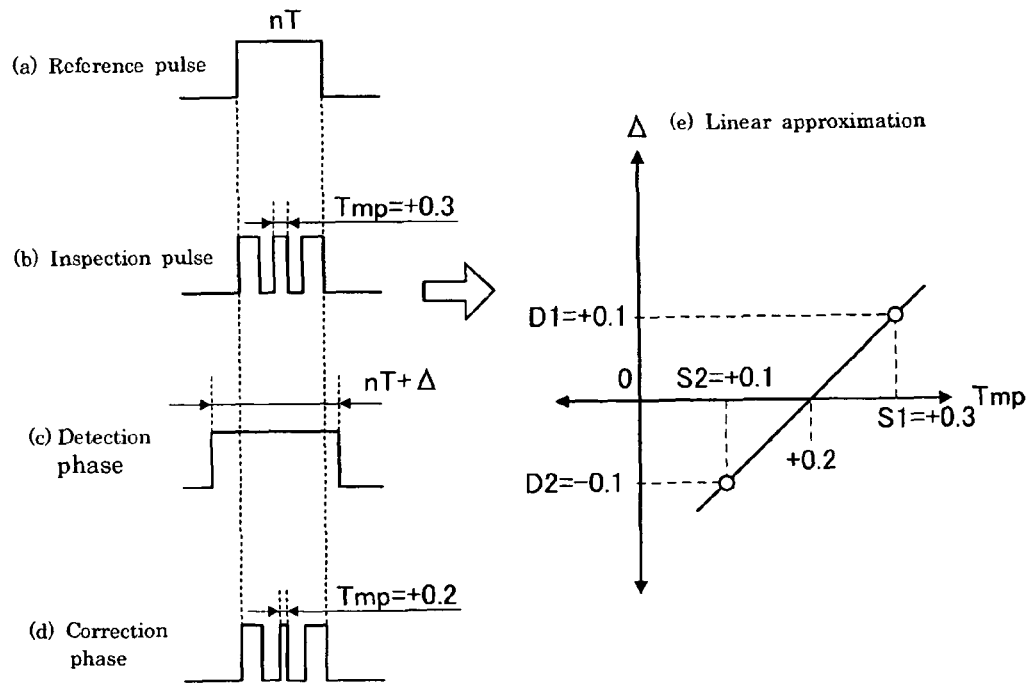
FIG. 31 is a schematic diagram showing an example of correcting a shift length using a linear approximation in the case of a multipulse.

FIG. 31 is a schematic diagram showing an example of correcting a shift length using a linear approximation in the case of a multipulse. A determination of a correction amount Tmp corresponding to the shift length involves: when a reference waveform nT is adapted to have a reference pulse length (FIG. 31(a)), conducting a test recording with a waveform having an intermediate pulse length of Tmp (FIG. 30(b)); and detecting a shift length Δ of an obtained reproduction signal (FIG. 30(c)). In this procedure, a top pulse condition should be kept constant.

In the example shown in FIG. 31, varying the correction amount Tmp from S1+0.3 to S2=+0.1 results in respective shift lengths Δ as D1=+0.1 and D2=−0.2. Then, using the obtained (S1, D1) and (S2, D2), the relationship between the control amount Tmp and the resulting shift length Δ is linearly approximated as shown in FIG. 31(e), and the approximated line is used to find the correction amount Tmp=+0.2 as an optimum correction amount, with which a shift length is canceled.

Figures 32, 33:
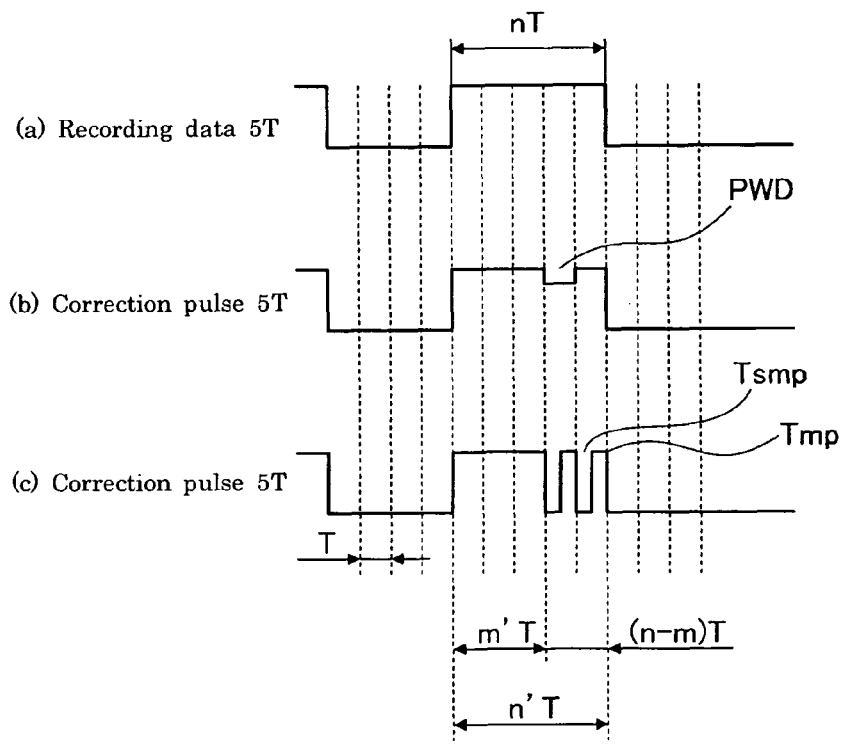
FIG. 32 is a schematic diagram showing a table configuration for storing correction amounts PWD and Tmp.
FIG. 33 is a schematic diagram showing a concept of an nT pulse configuration conducted in the step S300 of FIG. 1.

FIG. 32 is a schematic diagram showing a table configuration for storing correction amounts PWD and Tmp. As shown in the figure, the correction amounts PWD and Tmp are defined for each pit length to be corrected. For instance, a correction amount PWD for a pit to be corrected having a length of 3T is stored in an area indicated as "PW3" in the figure, and that for a pit to be corrected having a length of 3T is stored in an area indicated as "Tm3" in the figure. In the same manner, for each of the pit lengths 5T to 14T, correction amounts PWD and Tmp are stored respectively.

FIG. 33 is a schematic diagram showing a concept of an nT pulse configuration conducted in the step S300 of FIG. 1. As shown in FIG. 31(a), in the case of forming an nT pulse having 5T pit for instance, a recording datum is output as a pulse signal having a length of nT that corresponds to the length of 5 cycles of the clock signal. As shown in FIG. 33(b) or FIG. 33(c), a corrected pulse for the recording pulse is output as a pulse signal having a length of n'T with a top pulse length of m'T. If the corrected pulse is a single pulse, a PWD is defined within a part of the pulse indicated as (n−m)T, and if it is a multipulse, a Tmp is defined within a part of and (n−m)T pulse.

Since PWD and Tmp are the values obtained under a fixed condition for a top pulse, these values are dependent on an optimum m'T/(n−m)T ratio based on an mT pulse condition. As a result, the nT pulse comprised of a top pulse and a succeeding pulse provides a preferable value for improving recording quality. However, since a phase condition is not yet defined at this point in time, a following procedure to determine a phase condition should be conducted to obtain an optimum strategy.

Phase Shift Correction

Figure 34:
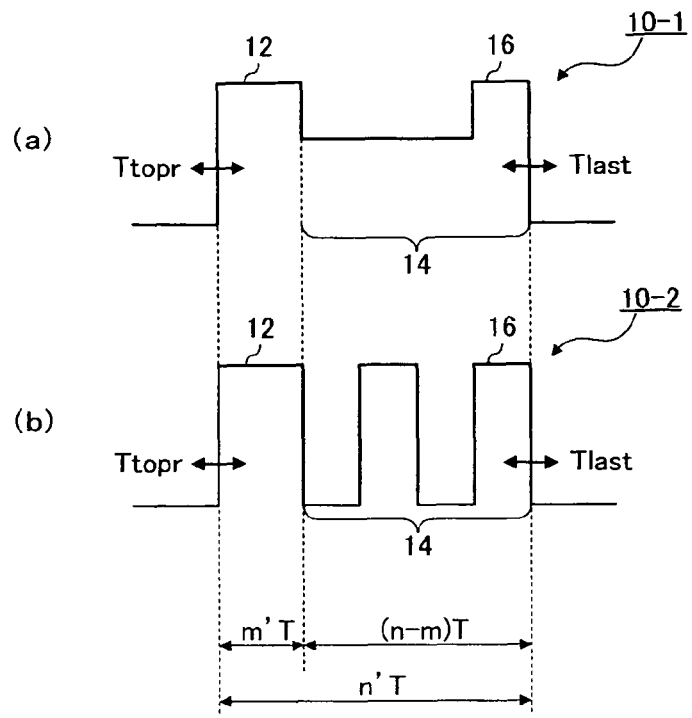
FIG. 34 is a schematic diagram showing an example of a test recording pulse that is used for the correction of a phase shift in the step S400 of FIG. 1(b).

FIG. 34 is a schematic diagram showing an example of a test recording pulse that is used for the correction of a phase shift in the step S400 of FIG. 1(b). FIG. 34(a) is an example of a case using a single pulse comprised of a single pulse pattern, and FIG. 34(b) using a multipulse comprised of a plurality of pulse patterns.

As shown in FIG. 34, in either case of the single pulse 10-1 or the multipulse 10-2, Ttopr that adjusts the start position of a top pulse 12 and Tlast that adjusts the end position of a last pulse 16 are defined as phase conditions for a recording pulse. By adjusting these values, a pit length after recording is further optimized. In addition, these phase conditions are determined by conducting a test recording based on conditions for the top pulse and the succeeding pulse determined with the above-described procedure.

Figure 35:
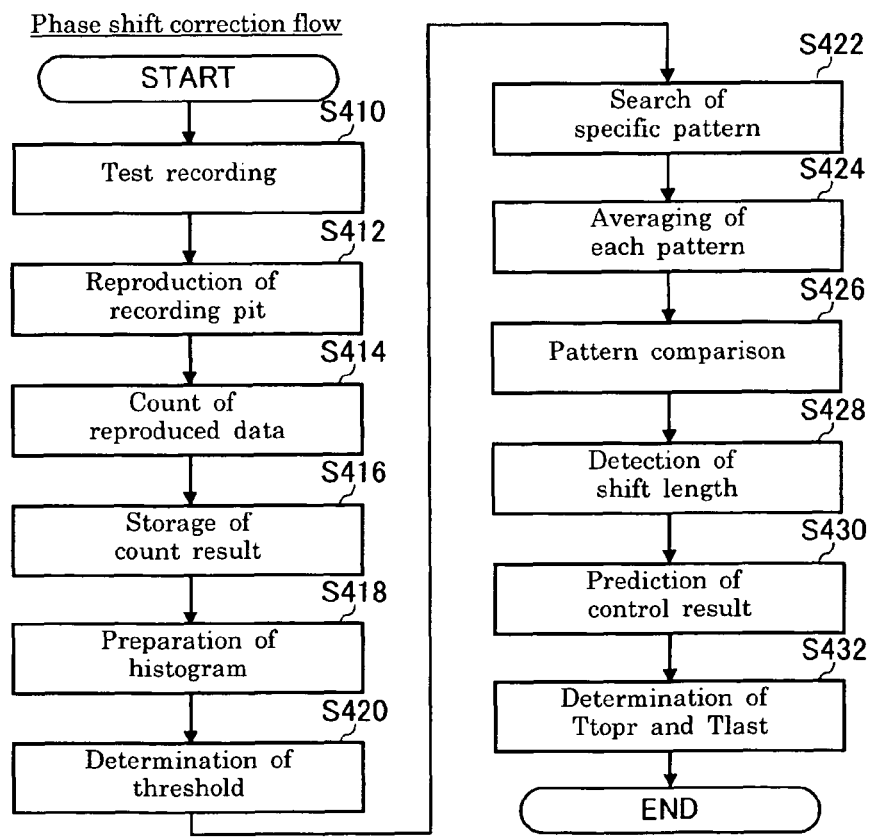
FIG. 35 is a flowchart showing an execution of a determination flow of a phase condition in the step S400 of FIG. 1(b).

FIG. 35 is a flowchart showing an execution of a determination flow of a phase condition in the step S400 of FIG. 1(b). As shown in FIG. 35, the drive shown in FIG. 2 conducts a test recording onto the medium 50 using various recording patterns obtained by varying the phase condition for nT pulse comprised of an mT pulse and (n−m)T pulse (step S410). In this step, conditions for the mT pulse and the (n−m)T pulse are fixed to the values obtained with the above-described procedure. Then, after a recording pattern obtained by the test recording is reproduced (step S412), the recording shift detection part 112 counts the binarized reproduction signal obtained through the binarization circuit 110 using a counter synchronized with a predetermined clock (step S414), and lengths of pits and lands included in the binarized reproduction signal are stored into the recording area 115 as count data respectively (step S416).

Subsequently, the recording shift detection part 112 generates a histogram showing an appearance rate of each of the count values using the count data stored in the recording area 115 (step S418), and a threshold for the count data, which provides a criterion for a pit or land length, is determined (step S420).

Subsequently, the recording shift detection part 112 searches various types of specific patterns including a specific pit/land pattern from the count data stored in the recording area 115 on the basis of the threshold (step S422), and average lengths of respective pits and respective lands comprising the specific patterns are evaluated by averaging count results for the pits considered to have the same pit length included in the specific patterns and by averaging count results for the lands considered to have the same land length (step S424).

Subsequently, the recording shift detection part 112 sets one of the extracted specific patterns as a reference pattern, and comparing the reference pattern with other patterns (step S426) allows the following shift lengths to be detected independently (step S428):

1) Front-side phase shift length of a pit relative to the recording pulse,
2) Backside phase shift length of a pit relative to the recording pulse, and
3) Shift length of a pit relative to the recording pulse due to heat interference.

Then, the equation derivation part 113 derives an equation for determining an optimum strategy based on the shift length detected by the recording shift detection part 112. After that, the strategy determination part 114 predicts a control result of various parameters using the equation derived by the equation derivation part 113 (step S430), and then Ttopr and Tlast shown in FIG. 34 are determined based on the prediction and set for the strategy circuit 102 (step S432).

Since the steps from a test recording (S410) to averaging (S424) are implemented in the same manner as in the case of FIGS. 20 to 24, detailed descriptions of these steps are omitted here.

Figure 36:
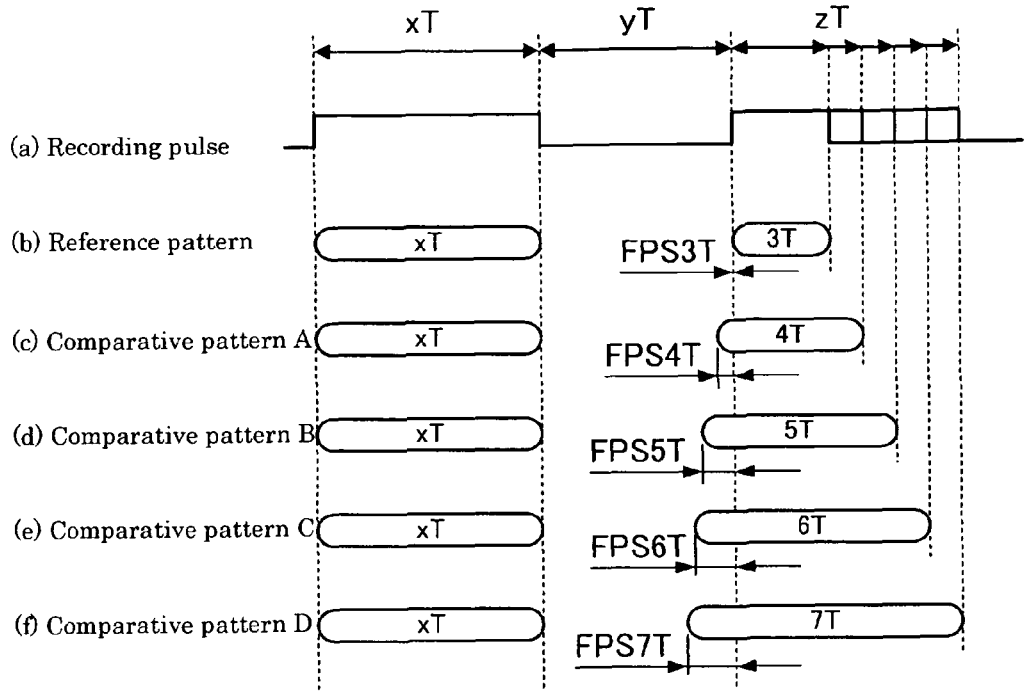
FIG. 36 is a schematic diagram showing an example of a recording pattern and a reproduction pattern for detecting a front-side phase shift length in each pit length.

FIG. 36 is a schematic diagram showing an example of a recording pattern and a reproduction pattern for detecting a front-side phase shift length in each pit length. As shown in FIG. 36, in the case of detecting a front-side phase shift length of each pit, a test recording is conducted using a recording pulse shown in FIG. 36(a). The recording pulse includes a pattern comprised of a fixed pit PxT, a fixed land LyT, and a variable pit PzT successively, and is generated by varying a length of the variable pit PzT from 3T to 7T while fixing lengths of the fixed pit PxT and the fixed land LyT as shown in FIGS. 36(b) to (f). Although not shown in the figure, the length of the variable pit PzT is varied up to 14T.

When the length of the fixed land LyT in the recording pattern is measured, it should be constant under an ideal recording condition. However, if the length of the fixed land LyT is shifted from a predetermined ideal length, since the length of the pit PxT is fixed, the shift length of each fixed land LyT from the predetermined length corresponds to the front-side phase shift length of each variable pit, P3T, P4T, . . . or P14T for each unit length 3T, 4T, . . . or 14T in the recording pulse generated with a strategy during recording.

Accordingly, under the condition that a pattern shown in FIG. 36(b), wherein the variable pit PzT has a length of 3T, is set as a reference pattern and the rest of the patterns shown in FIGS. 36(c) to (f) as comparison patterns, comparing each of the comparison patterns with the reference pattern in terms of the fixed land length LyT enables a front-side phase shift length FPS4T to FPS7T relative to the reference pattern to be obtained as shown in the figure.

Since it is only necessary to detect each of the shift lengths FPS3T to FPS7T as a value relative to any position, the front-side phase shift length FPS3T of the reference pattern may be defined as zero or detected as a shift length from the ideal length. Also, instead of the pattern in FIG. 36(b), one of the patterns shown in FIGS. 36(c) to (f) may be selected as the reference pattern.

Figure 37:
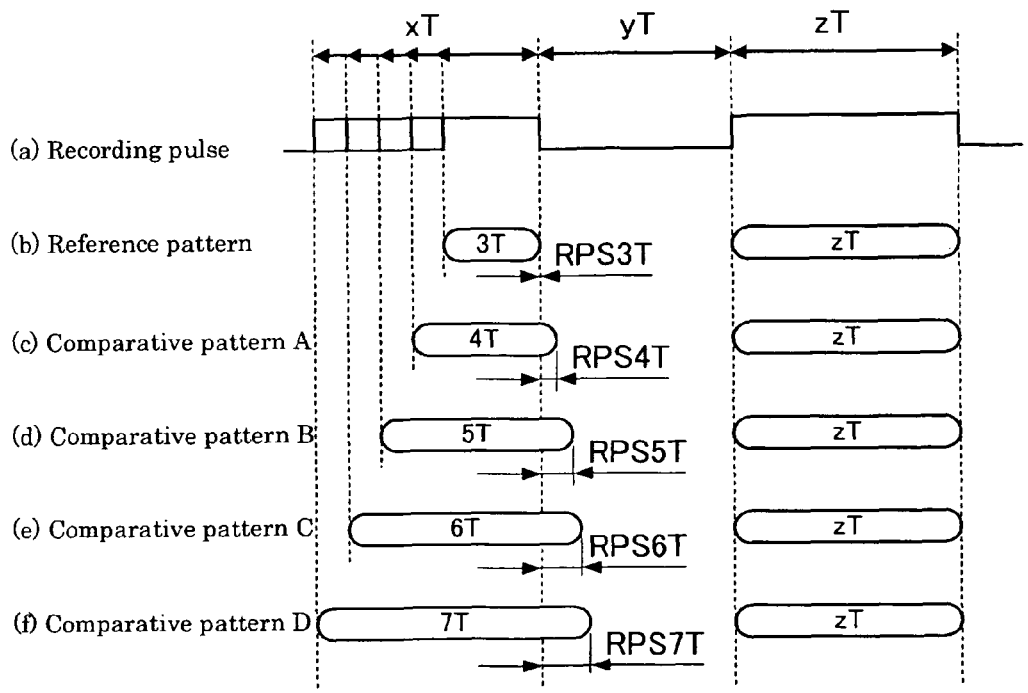
FIG. 37 is a schematic diagram showing an example of a recording pattern and a reproduction pattern that are used for detecting a backside phase shift length of each pit.

FIG. 37 is a schematic diagram showing an example of a recording pattern and a reproduction pattern that are used for detecting a backside phase shift length of each pit. As shown in FIG. 37, in the case of detecting a backside phase shift length of each pit, a test recording is conducted using a recording pulse shown in FIG. 37(a). The recording pulse includes a pattern having a variable pit PxT, a fixed land LyT, and a fixed pit PzT successively and is generated by varying a length of the variable pit PxT from 3T, 4T, . . . to 7T while fixing lengths of the fixed land LyT and the fixed pit PzT as shown in FIGS. 37(b) to (f). Although not shown in the figure, the length of the variable pit PxT is varied up to 14T.

When the length of the fixed land LyT in the recording pattern is measured, it should be constant under an ideal recording condition. However, if the length of the fixed land LyT is shifted from a predetermined ideal length, since the length of the pit PzT is fixed, the shift length of each fixed land LyT from the predetermined length corresponds to the backside phase shift length of each variable pit, P3T, P4T, . . . or P14T for each unit length 3T, 4T, . . . or 14T in the recording pulse generated with a strategy during recording.

Accordingly, under the condition that a pattern shown in FIG. 37(b), wherein the variable pit PxT has a length of 3T, is set as a reference pattern and the rest of the patterns shown in FIGS. 37(c) to (f) as comparison patterns, comparing each of the comparison patterns with the reference pattern in terms of the fixed land length LyT enables a backside phase shift length RPS4T to RPS7T relative to the reference pattern to be obtained as shown in the figure.

Since it is only necessary to detect each of the shift lengths RPS3T to RPS7T as a value relative to any position, the backside phase shift length RPS3T of the reference pattern may be defined as zero or detected as a shift length from the ideal length. Also, instead of the pattern in FIG. 37(b), one of the patterns shown in FIGS. 37(c) to (f) may be selected as the reference pattern.

Figures 38, 39:
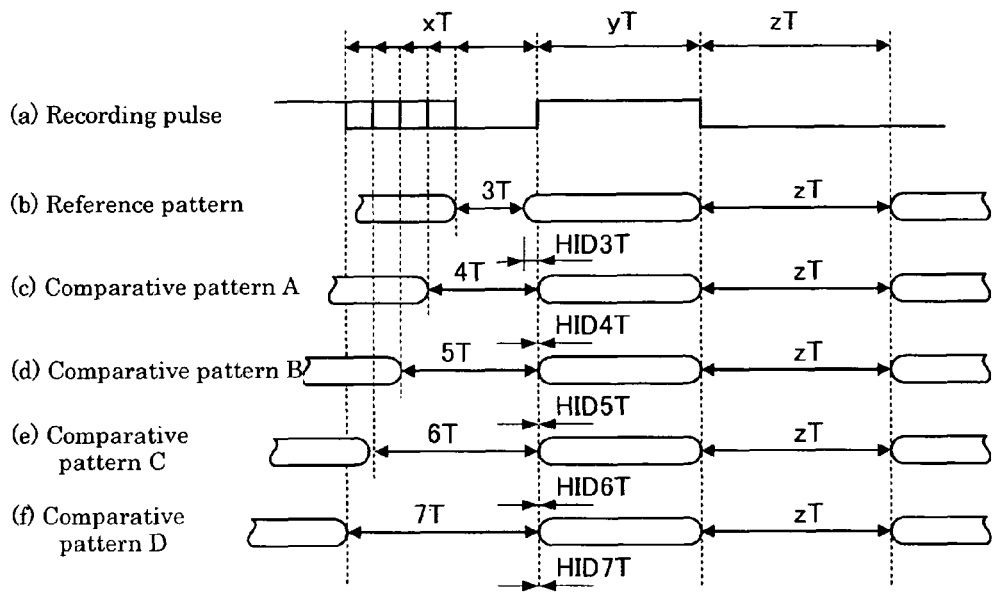
FIG. 38 is a schematic diagram showing an example of a recording pattern for detecting a shift length of each pit due to heat interference.
FIG. 39 is a schematic diagram showing a table configuration for searching a specific pattern used in the detection of a front-side or backside phase shift length of a pit.

FIG. 38 is a schematic diagram showing an example of a recording pattern for detecting a shift length of each pit due to heat interference. As shown in FIG. 38, in the case of detecting a shift length of a pit due to heat interference, a test recording is conducted using a recording pulse shown in FIG. 38(a). The recording pulse includes a pattern having a land LxT, a pit PyT, and a land LzT successively and is generated by varying a length of the variable land LxT from 3T, 4T, . . . to 7T while fixing lengths of the fixed pit PyT and the fixed land LzT as shown in FIGS. 38(b) to (f) in the figure. Although not shown in the figure, the length of the variable land LxT is varied up to 14T.

When the length of the fixed pit PyT in the recording pattern is measured, it should be constant under an ideal recording condition. However, if the length of the fixed pit PyT is shifted from a predetermined ideal length, since the length of the land LzT is fixed, the shift length of the fixed pit PyT from the predetermined length corresponds to the shift length due to heat interference arising from a pit formed immediately before the variable land LxT.

Accordingly, under the condition that a pattern shown in FIG. 38(b), wherein the variable land LxT has a length of 3T, is set as a reference pattern and the rest of the patterns shown in FIGS. 38(c) to (f) as comparison patterns, comparing each of the comparison patterns with the reference pattern in terms of the fixed pit length PyT enables a front-side phase shift length HID3T to HID7T relative to the reference pattern to be obtained as shown in the figure.

Since it is only necessary to detect each of the shift lengths HID3T to HID7T as a value relative to any position, the front-side phase shift length HID3T of the reference pattern may be defined as zero or detected as a shift length from an ideal length. Also, instead of the pattern in FIG. 38(b), one of the patterns shown in FIGS. 38(c) to (f) may be selected as the reference pattern.

FIG. 39 is a schematic diagram showing a table configuration for searching a specific pattern used in the detection of a front-side or backside phase shift length of a pit. In the case of detecting a front-side phase shift of a pit, data stored in the storage area 115 shown in FIG. 2 are searched based on a threshold range shown in FIG. 39(a) for a pit PxT, a land LyT, or a pit PzT defined for each specific pattern (step S422 in FIG. 35), and a data stream that satisfies the threshold range is extracted.

Subsequently, count values for each of the pit PxT, land LyT, and pit PzT are sorted and averaged (step S424 in FIG. 35). Conducting the above-described pattern comparison using the averages of the count values allows a front-side phase shift length of each of the pits to be obtained. FIG. 39(b) shows an example of a threshold in the case of detecting a backside phase shift of a pit, and the concept and operations in the case are the same as in the case of a front-side phase shift of a pit.

Figure 40:
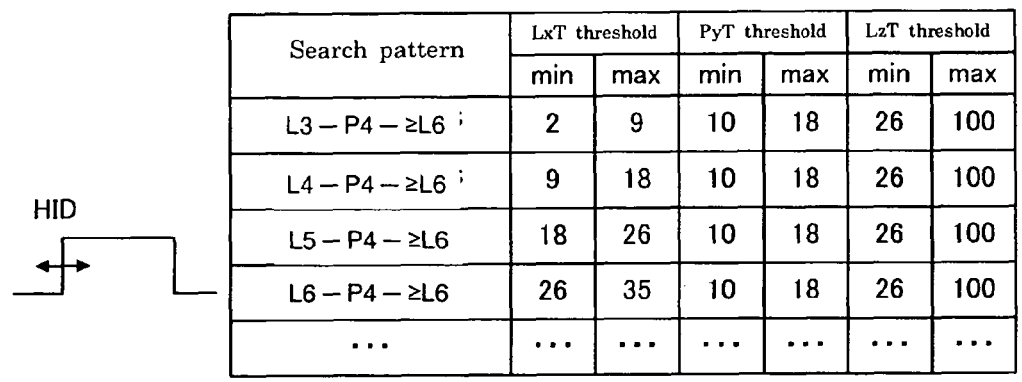
FIG. 40 is a schematic diagram showing a table configuration for searching a specific pattern used in the detection of a shift length of a pit due to heat interference.

FIG. 40 is a schematic diagram showing a table configuration for searching a specific pattern used in the detection of a shift length of a pit due to heat interference. As shown in FIG. 40, a detection of a shift due to heat interference is conducted by the same procedures as in the case of detecting a front-side or backside phase shift of a pit described in FIG. 39.

Figure 41:
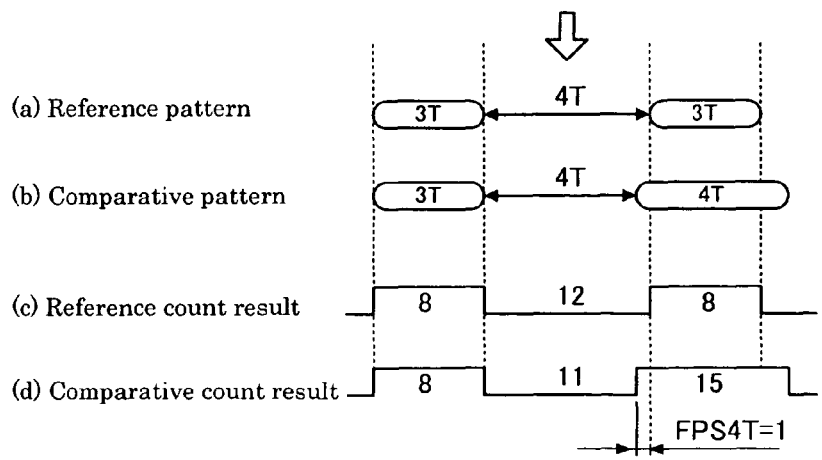
FIG. 41 is a schematic diagram showing a specific example of detecting a shift length by a comparison of count values.

FIG. 41 is a schematic diagram showing a specific example of detecting a shift length by a comparison of count values. The diagram shows an example of detecting a front-side phase shift of a pit, but the same method is also applied to the detection of other shift lengths. In the case of detecting a shift length, a reference pattern and a comparison pattern shown in FIGS. 41(a) and (b) respectively are searched in and extracted from data stored in the storage area, and then count values for parts supposed to have a fixed length are compared. In the example shown in the figure, a land LyT is used as a reference length for the comparison. Thus, the count value of "12" shown in FIG. 41(c) for the reference pattern and that of "11" shown in FIG. 41(d) for the comparison pattern are compared with each other to obtain the difference therebetween, and the obtained difference of "1" is the value of a shift length FPS4T.

Figure 42:
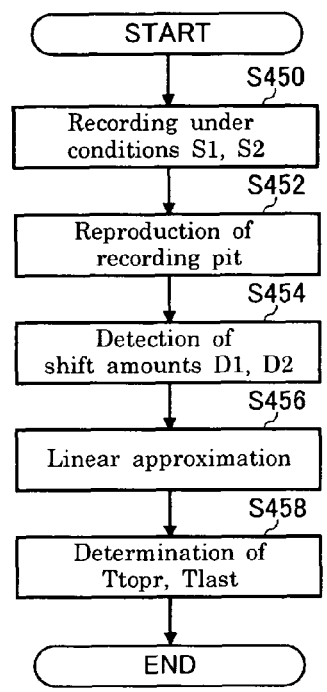
FIG. 42 is a flowchart showing an example of the determination of Ttopr and Tlast by predicting a control amount shown in FIG. 35.

FIG. 42 is a flowchart showing an example of the determination of Ttopr and Tlast by predicting a control amount shown in FIG. 35. As shown in FIG. 42, the control amount is predicted by implementing a series of steps of: conducting a test recording under two or more types of recording conditions including S1 and S2 (step S450); reproducing recording pits obtained by the test recording (step S452); comparing the obtained reproduction patterns in order to find a shift length D1 under the condition of S1 and a shift length D2 under the condition of S2 (step S454); then linearly approximating the relationship between (S1, D1) and (S2, D2) (step S456); and finally determining optimum Ttopr and Tlast using the linearly approximated line (step S458).

Figure 43:
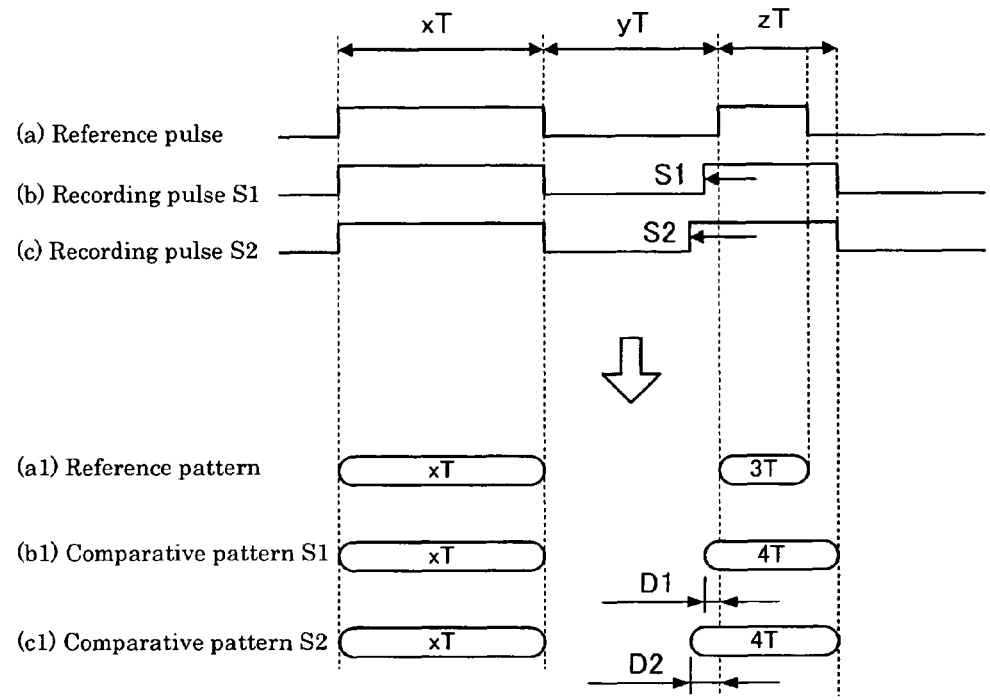
FIG. 43 is a schematic diagram showing the relationship between the variation in recording conditions (S1 and S2) and the corresponding shift lengths (D1 and D2).

FIG. 43 is a schematic diagram showing the relationship between the variation in recording condition (S1 and S2) and the corresponding shift length (D1 and D2). A recording pulse having "PzT=3T" shown in FIG. 43(a) is used as a reference pulse, and two recording pulses of "PzT=4T," which are obtained by shifting front edges of PzTs by S1 and S2 respectively as shown in FIGS. 43(b) and (c), are used as recording pulses to be compared. Then, test recordings are conducted using these recording pulses.

As a result, a reference pattern shown in FIG. 43(a1) is obtained correspondingly to the recording pulse shown in FIG. 43(a), and a comparison pattern S1 in FIG. 43(b1) corresponding to the recording pulse in FIG. 43(b) and a comparison pattern S2 in FIG. 43(c1) corresponding to the recording pulse in FIG. 43(c) are obtained. A shift length D1 is caused by the control amount S1 in the comparison pattern S1, and a shift length D2 by the control amount S2 in the comparison pattern S2.

When the shift lengths D1 and D2 corresponding to the control amounts S1 and S2 respectively are obtained, a shift length caused by applying a control amount to any of the parameters becomes predictable. Accordingly, a prediction of a control amount and a determination of a correction value are conducted using the relationship between the control amount and the shift length.

Figure 44:
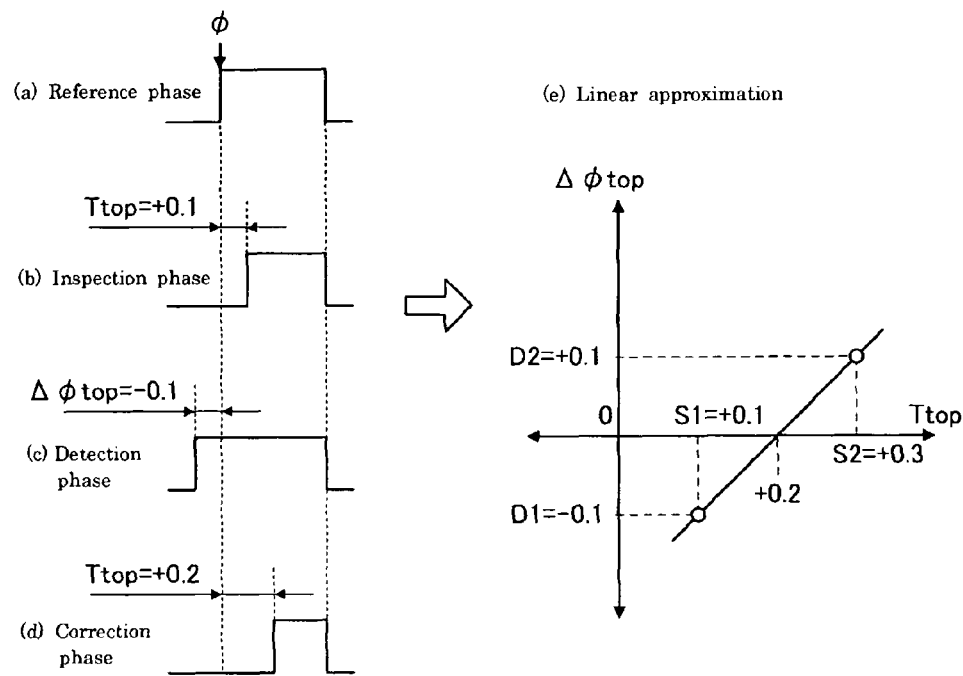
FIG. 44 is a schematic diagram showing an example of correcting a front-side phase shift using a linear approximation.

FIG. 44 is a schematic diagram showing an example of correcting a front-side phase shift using a linear approximation. In the case of determining a correction amount Ttop for a front-side phase shift, a test recording is conducted first with a pulse shape having a pulse position shifted relative to a reference phase φ as shown in FIG. 44(a) by an amount of Ttop as shown in FIG. 44(b) (recording condition S1 or S2). Consequently, as shown in FIG. 44(c), a phase shift Δφtop for an obtained reproduction signal is detected (shift length D1 or D2).

In the example shown in FIG. 44, varying the control amount Ttop from S1=+0.1 to S2=+0.3 results in the variation of a phase shift A+top from D1=−0.1 to D2=+0.1. Then, using the obtained (S1, D1) and (S2, D2), the relationship between the control amount Ttop and the resulting phase shift Δφtop is linearly approximated as shown in FIG. 44(e), and the approximated line is used to find a correction phase Ttop=+0.2 as an optimum correction amount, with which a phase shift is canceled.

As described above, a linear or curve approximation can be applied to the relationship between the variations in strategy (S1 and S2) and in shift length (D1 and D2) when at least two points for each of the variations are obtained, and the approximated line (curve) enables an optimum correction amount with which a shift length becomes zero to be found.

Specifically, a procedure comprising: obtaining several shift lengths D by varying a strategy S; substituting the several strategies S and the corresponding shift lengths D into a general expression of "D=a*S+b"; and solving simultaneous equations obtained by the substitution enables the constants a and b in the expression to be determined, resulting in the determination of a strategy S for an ideal shift length D. Applying the strategy S to the strategy circuit 102 shown in FIG. 1 enables a recording pulse to be optimally corrected.

For instance, assuming that the recording shift detection part 112 shown in FIG. 1 detects a shift length as D1 from a reproduction pattern of a test recording using a strategy S1 and that as D2 using the other strategy S2, the following simultaneous equations are obtained:

$$D1 = a*S1 + b,$$ Equation (5)

and $$D2 = a*S2 + b.$$ Equation (6)

From the above equations, the constants a and b are deduced, whereby the following relationship between S and D is obtained:

$$S = (D-b)/a.$$ Equation (7)

Substituting an output shift length D for improving recording quality, for instance, an output shift length for correcting an initial output shift length arising in an equalizer or the like, into the above relationship enables an optimum strategy S to be determined.

In addition, the relationship to determine an optimum strategy S may be obtained for each of the pits P3T, P4T, . . . and P4T having the length of 3T, 4T, . . . and 14T respectively. Further, it may also be obtained for each recording speed.

Figure 45:
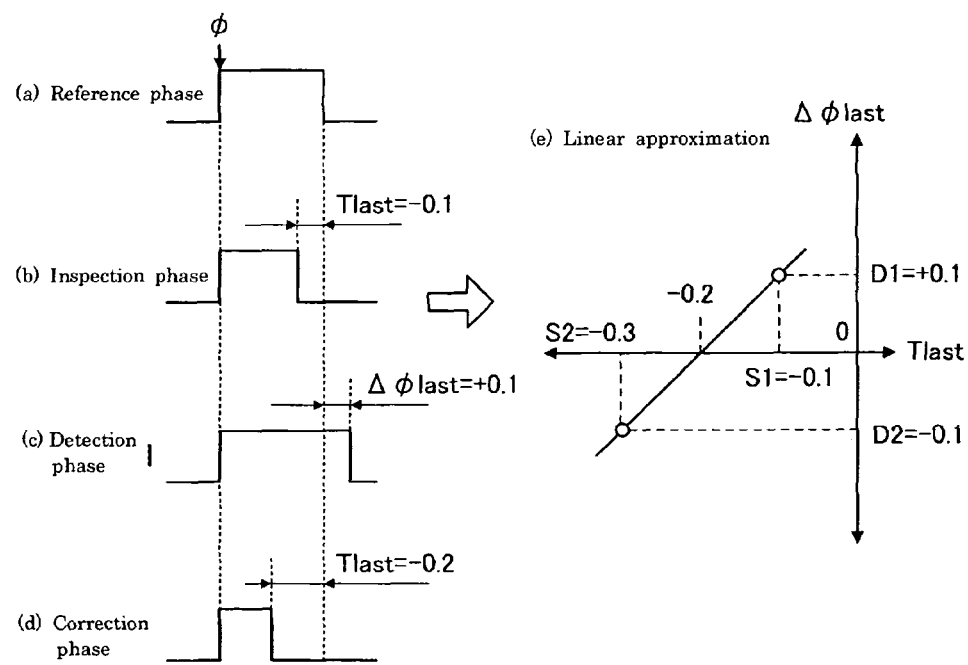
FIG. 45 is a schematic diagram showing an example of correcting a backside phase shift using a linear approximation.

FIG. 45 is a schematic diagram showing an example of correcting a backside phase shift using a linear approximation. In the case of determining a correction amount Tlast for a backside phase shift, a test recording is conducted first with a pulse shape having a pulse position shifted relative to a reference phase φas shown in FIG. 45(a) by an amount of Tlast as shown in FIG. 45(b). Consequently, a phase shift Δφlast for a reproduction signal is detected as shown in FIG. 45(c).

In the example shown in FIG. 45, varying the correction amount Tlast from S1=−0.1 to S2=−0.3 results in the variation of a phase shift Δφlast from D1=+0.1 to D2=−0.1. Then, using the obtained (S1, D1) and (S2, D2), the relationship between the control amount Tlast and the resulting phase shift Aφlast is linearly approximated as shown in FIG. 45(e), and the approximated line is used to find a correction phase Tlast=−0.2 as an optimum correction amount, with which a phase shift is canceled.

Figures 46, 47:
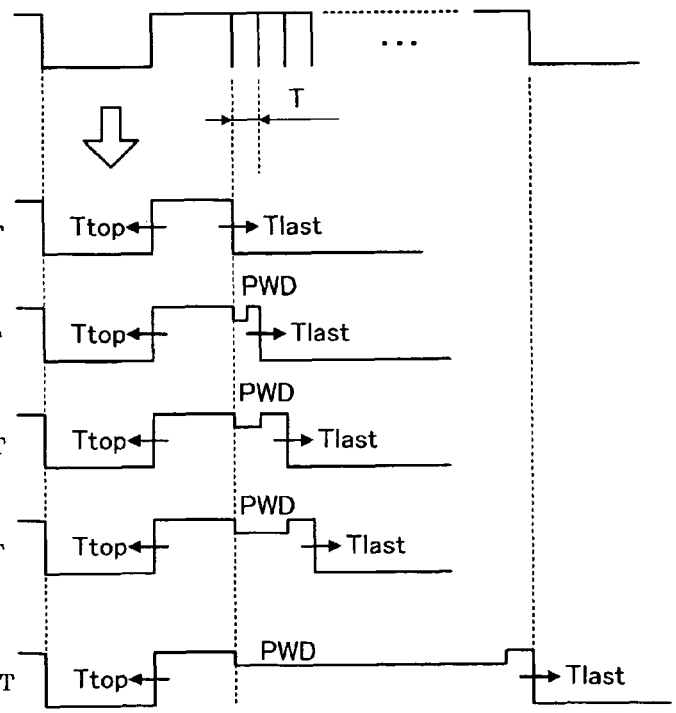
FIG. 46 is a schematic diagram showing a table configuration for storing correction amounts Ttop and Tlast.
FIG. 47 is a schematic diagram showing an example of a corrected single pulse.

FIG. 46 is a schematic diagram showing a table configuration for storing correction amounts Ttop and Tlast. As shown in FIG. 46(a), the correction amount Ttop is defined for each pit length to be corrected in combination with a land length located before the pit. For instance, when a pit to be corrected has a length of 3T and a land before the pit has a length of 3T, a correction amount is stored in an area indicated as "3-3" in FIG. 46(a). Similarly, when a pit to be corrected has a length of 4T and a land before the pit has a length of 3T, a correction amount is stored in an area indicated as "3-4" in the figure. In the same manner as the case of 3T or 4T, for each of the pit lengths 5T to 14T, a correction amount Ttop is stored correspondingly to a length of a land located before the pit.

Further, as shown in FIG. 46(b), the correction amount Tlast is defined for each pit length to be corrected in combination with a land length located after the pit. For instance, when a pit to be corrected has a length of 3T and a land after the pit has a length of 3T, a correction amount is stored in an area indicated as "3-3" in FIG. 46(b). Similarly, when a pit to be corrected has a length of 4T and a land after the pit has a length of 3T, a correction amount is stored in an area indicated as "3-4" in FIG. 46(b). In the same manner as the case of 3T or 4T, for each pit length 5T to 14T, a correction amount Tlast is stored correspondingly to a length of a land after the pit.

FIG. 47 is a schematic diagram showing an example of a corrected single pulse. As shown in FIGS. 47(a) to (f), when recording data in FIG. 47(a) are recorded onto an optical disk, a strategy to which an optimum correction value is applied is set for each pit length. For instance, in the case of recording a 3T pit as shown in FIG. 47(b), a front correction value Ttop of the 3T pit is read out correspondingly to a length of a land before the pit as well as reading out a rear correction value Tlast of the 3T pit correspondingly to a length of a land after the pit from the table shown in FIG. 47. Then, the front and rear ends of the recording pulse are corrected with the Ttop and Tlast respectively.

Also, in the case of correcting pits having a length of 4T or longer, as shown in FIGS. 47(c) to (f), a PWD correction value for each pit length is read out from the table shown in FIG. 32 in addition to reading out the Ttop and Tlast, and a pulse shape is corrected correspondingly to the PWD value.

Figure 48:
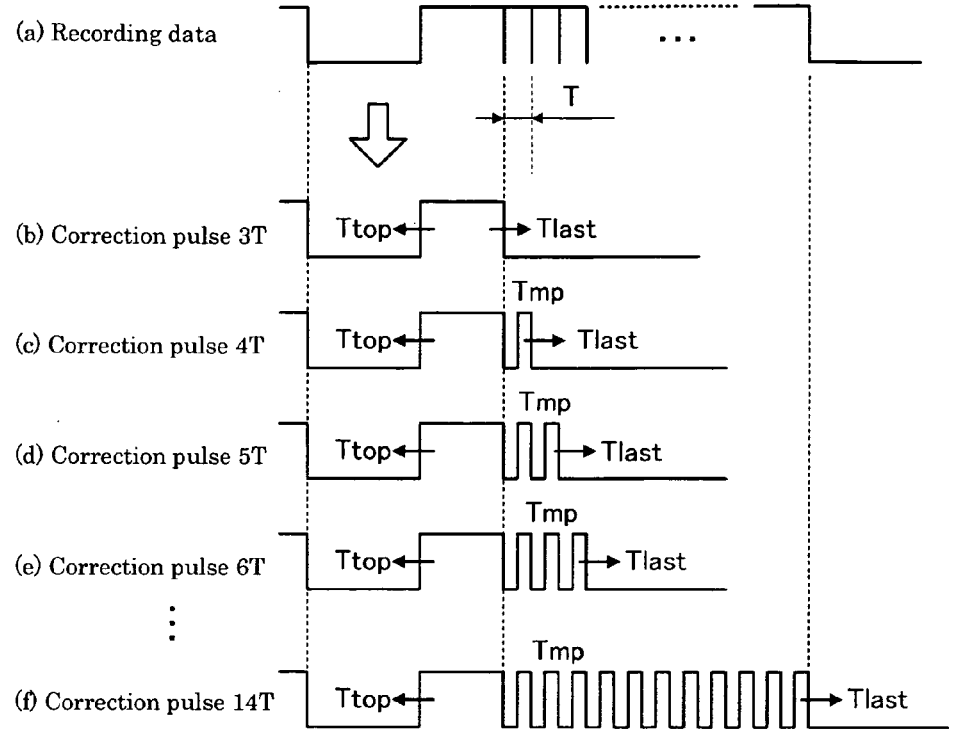
FIG. 48 is a schematic diagram showing an example of a corrected multipulse.

FIG. 48 is a schematic diagram showing an example of a corrected multipulse. In the case of correcting a multipulse as shown in FIG. 48, instead of the PWD correction value used for correcting a single pulse as described above, a Tmp correction value is read out from the table shown in FIG. 32, and a pulse shape is corrected correspondingly to the Tmp value. Other steps are the same as in the single pulse case.

In addition, the above-described example shows the case wherein an optimum strategy S is determined by substituting the shift length D into the relationship to find the optimum strategy, however, the optimum strategy S may be determined by using a correction table preliminary obtained with the relationship.

Further, the above-described procedure of setting an optimum strategy may be conducted every time the type of optical disk is changed, or as a recording speed is changed. Also, under the condition that optimum strategy conditions for various types of optical disks or recording speeds, which are determined by the above-described procedure of setting an optimum strategy, are preliminarily stored in a memory, when recording onto one of the optical disk types or at one of the recording speeds stored in the memory, a corresponding optimum strategy stored in the memory may be read out and used.

Figure 49:
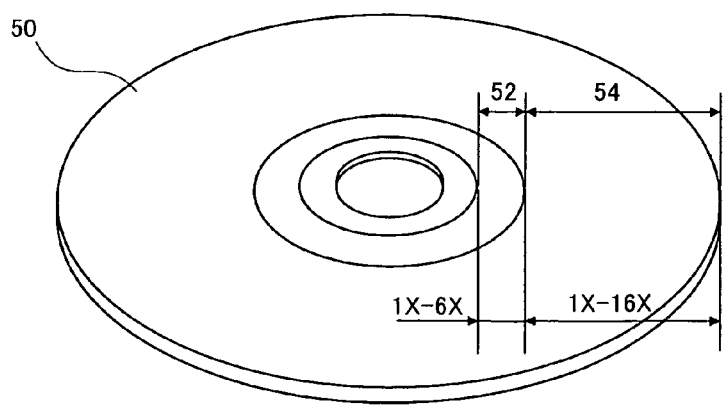
FIG. 49 is a schematic diagram showing the relation between an inner or outer circumference of a medium and an applicable recording speed.

FIG. 49 is a schematic diagram showing the relation between an inner or outer circumference of a medium and a recording speed applicable to the circumference. As shown in the figure, the medium 50 comprises a test area 52 provided on an inner circumferential side and a recording area 54 provided from the inner to outer circumference outside of the test area. A test recording for determining a recording condition is conducted within the test area 52 provided on the inner circumferential side.

Because of factors such as the limited rotation number of a spindle motor, a recording speed is varied between the inner and outer circumferences. In DVD-R for instance, a recording speed of ×16 is applicable to the outermost circumference, whereas a recording speed of ×6 is the upper limit on the test area 52 provided on the inner circumference.

Accordingly, as shown in the figure, the applicable recording speed within the test area 52 is in the range of ×1 to ×6, whereas the applicable speed within the recording area 54 is in the range of ×1 to ×16. However, as described above, since a condition for configuring a strategy is determined by a test recording, an actual measurement cannot be conducted at any speed higher than ×6. Thus, one embodiment proposes a method for configuring recording conditions for higher-speed recordings in which a test recording cannot be conducted in a test area.

Figures 50, 51:
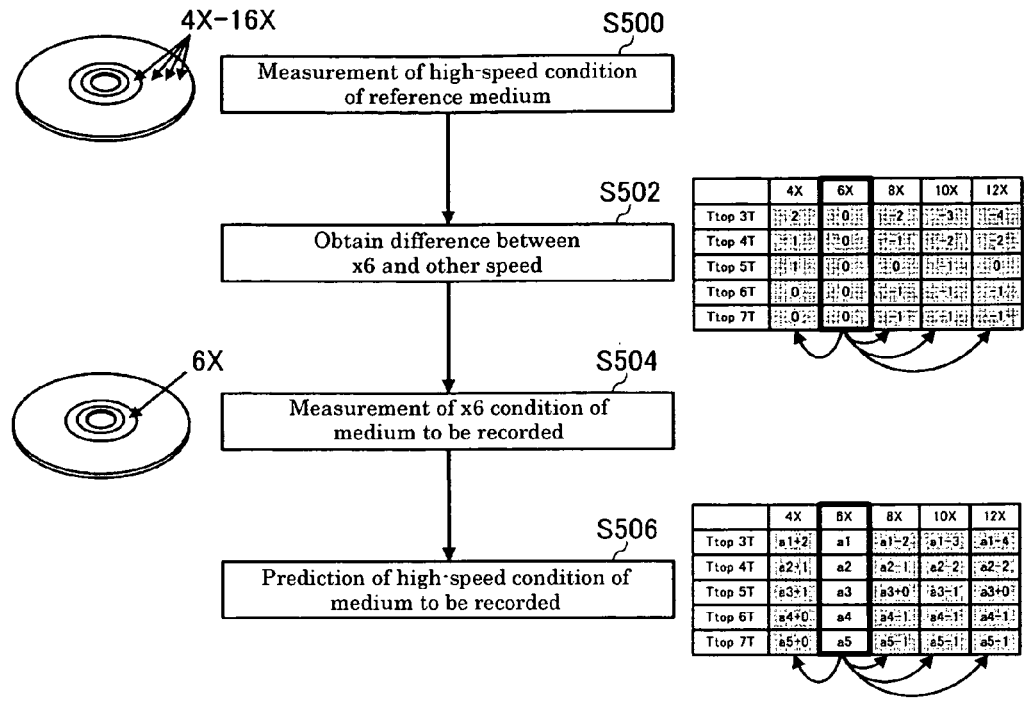
FIG. 50 is a flowchart showing a first method for configuring a high-speed recording condition that cannot be measured in a test area.
FIG. 51 is a data diagram showing an example of the step S500 in FIG. 50.

FIG. 50 is a flowchart showing a first method for configuring a high-speed recording condition that cannot be measured in the test area. As shown in the figure, in the case of using this method to configure a high-speed recording condition that cannot be measured in the test area, a recording condition for each recording speed is first configured by conducting test recordings at all of speeds available in a recording area of a reference medium having a typical recording sensitivity (step S500).

Subsequently, the difference between a recording speed applicable to the test area (×6 for instance) and the other speed is obtained (step S502), and data on the obtained difference are stored in a drive before its shipment.

Then, a test recording onto a medium to be used for an actual recording is conducted within the test area at a speed of ×6, which is used as a reference to obtain the above-described difference (step S504). By adding a result of the test recording to the difference data pre-stored in the drive, a recording condition for each speed is predicted (step S506).

FIG. 51 is a data diagram showing an example of the step S500 shown in FIG. 50. As shown in the figure, for instance, actual measurements under high-speed conditions using the reference medium provide correction amounts Ttop for a front-side phase shift and Tlast for a backside phase shift respectively by using recording speeds ranging from ×4 to ×16.

FIG. 52 is a data diagram showing an example of the step S502 shown in FIG. 50. As shown in the figure, after the actual measurements under the high-speed conditions using the reference medium, the difference between the correction amounts for the reference speed (recording speed applicable to a test area, for instance, ×6) and for each recording speed is obtained. Then, data on the obtained difference are stored in the drive.

FIG. 53 is a data diagram showing an example of the step S504 shown in FIG. 50. As shown in the figure, in the case that a medium to be recorded is loaded into a drive storing the above difference data, a test recording is conducted at ×6 speed, which is the reference speed used to obtain the difference data, using a test area of the medium to be recorded, resulting in the correction amounts (a1 to a5) and (b1 to b5).

Figures 54, 55:
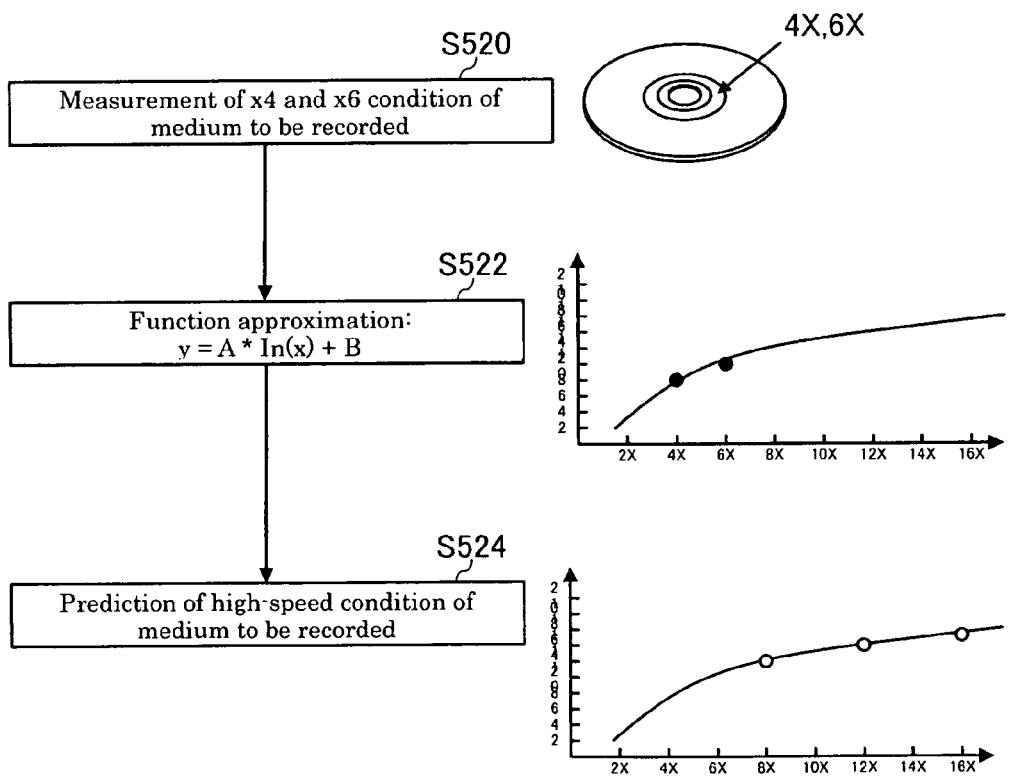
FIG. 54 is a data diagram showing an example of the step S506 in FIG. 50.
FIG. 55 is a flowchart showing a second method for configuring a high-speed recording condition that cannot be measured in a test area.

FIG. 54 is a data diagram showing an example of the step S506 shown in FIG. 50. As shown in the figure, after the actual measurements of the correction amounts at ×6 speed, the correction amounts at ×6 speed is added to the difference data for each recording speed stored in the drive, whereby correction amounts for all of the recording speeds from ×4 to ×16 are obtained. The obtained correction amounts are stored in the storage area 115 shown in FIG. 2, which are to be used for determining a strategy for each recording speed.

FIG. 55 is a flowchart showing a second method for configuring a high-speed recording condition that cannot be measured in the test area. As shown in the figure, in the case of using this method to configure a high-speed recording condition that cannot be measured in the test area, correction amounts for recording conditions are obtained by conducting test recordings using at least two recording speeds applicable to the test area, for instance, ×4 and ×6 speeds (step S520).

Subsequently, the correction amounts obtained at above two points are functionally approximated (step S522), and using the approximated function, a correction amount at any speed that cannot be measured in the test area is predicted (step S524).

Figure 56:
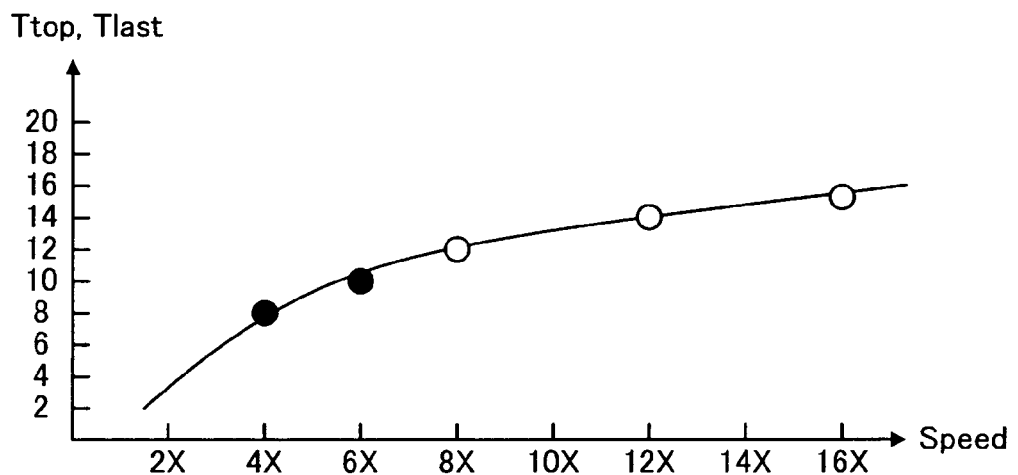
FIG. 56 is a data diagram showing an example of steps S522 and S524 in FIG. 55.

FIG. 56 is a data diagram showing an example of the steps S522 and S524 shown in FIG. 55. As show in the figure, when ×4 speed=8 and ×6 speed=10 are obtained for correction amounts Ttop and Tlast respectively as a result of the test recordings in the step S520, by substituting the amounts for, for instance, the variable x in an exponential function of "$y=A*\ln(x)+B$" where y is a correction amount and x is a recording speed, $A=5.5298$ and $B=0.0361$ are obtained using a least-square method.

By substituting each recording speed for the variable x in the obtained function of "$y=5.5298*\ln(x)+0.0361$," a correction amount y for each recording speed can be determined.

In this example, correction amounts of ×8=12, ×12=14, and ×16=15 are obtained respectively.

Figure 57:
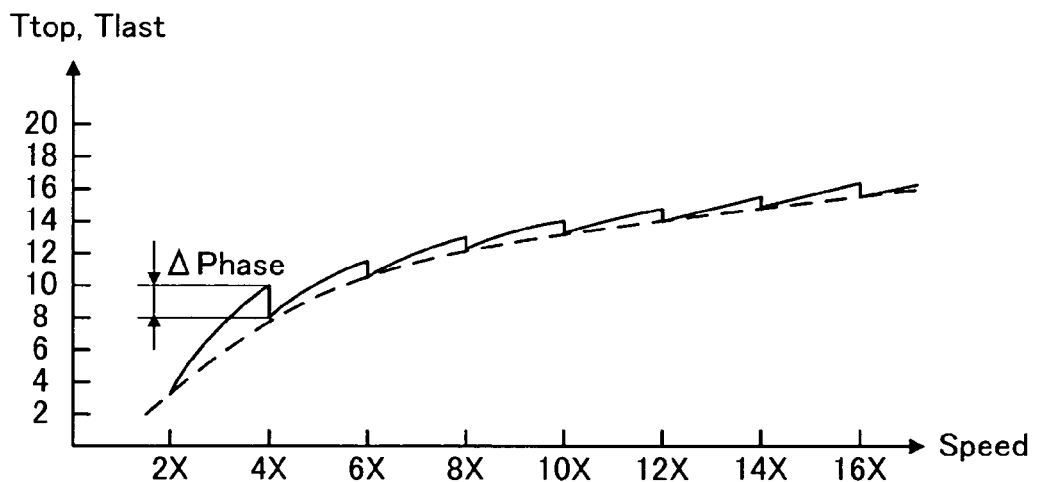
FIG. 57 is a schematic diagram showing an example of correcting a phase condition for a recording pulse, which is predicted based on a test recording, upon an actual recording.

FIG. 57 is a schematic diagram showing an example of correcting a phase condition for a recording pulse, which is predicted based on a test recording, during an actual recording. A dotted curve in the figure shows an exponential function representing the correction amount y for each recording speed shown in FIG. 56, and a solid line shows a state of a phase obtained as a result of the actual recording.

As shown in the figure, a recording state is shifted from an optimum condition due to a variation in recording speed or a recording position such as an inner or outer circumference. Thus, in the example shown in the figure, a recording condition is corrected at a point where a recording speed is changed. In addition, in this correction, a power and a phase of a recording pulse are simultaneously corrected.

For instance, a phase shift length Δphase generated due to a continuing recording from the inner to outer circumference at ×2 speed is corrected at a timing of changing a recording speed from ×2 to ×4. Similarly, a phase shift for the other recording speed is corrected at every timing when the recording speed is changed.

Figure 58:
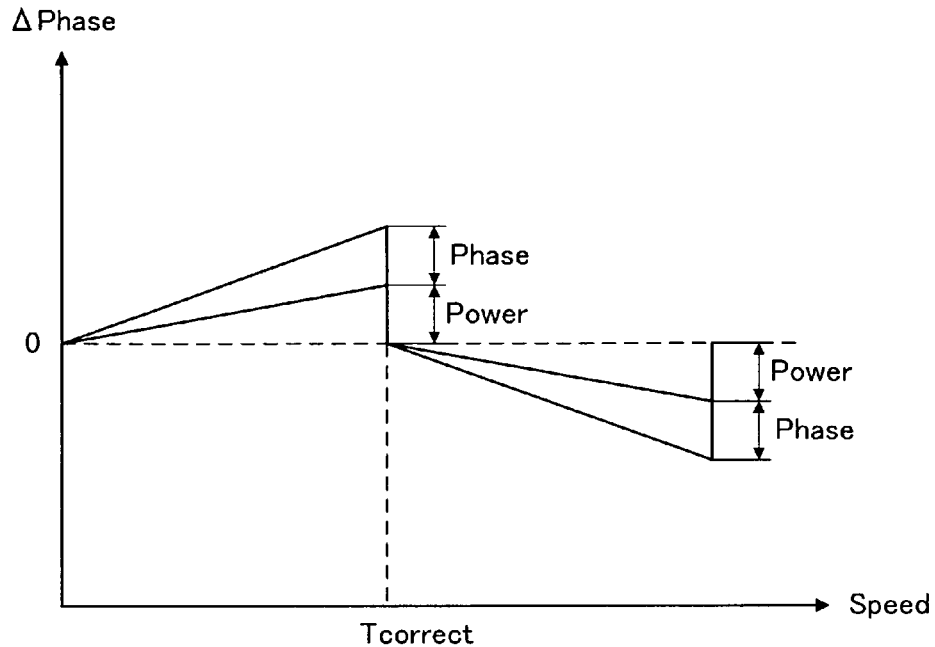
FIG. 58 is a schematic diagram showing causes of a phase shift length Δphase.

FIG. 58 is a schematic diagram showing causes of a phase shift length Δphase. As shown in the figure, the phase shift length Δphase contains two shift lengths: one due to a variation of an optimum power condition (indicated as "Power" in the diagram) and the other due to any factor other than the power (indicated as "Phase" in the diagram).

Accordingly, when precisely correcting a phase shift as well as a power at a correction timing Tcorrect, an amount obtained by subtracting the shift length due to the variation of an optimum power condition from the phase shift length Δphase should be corrected.

Figure 59:
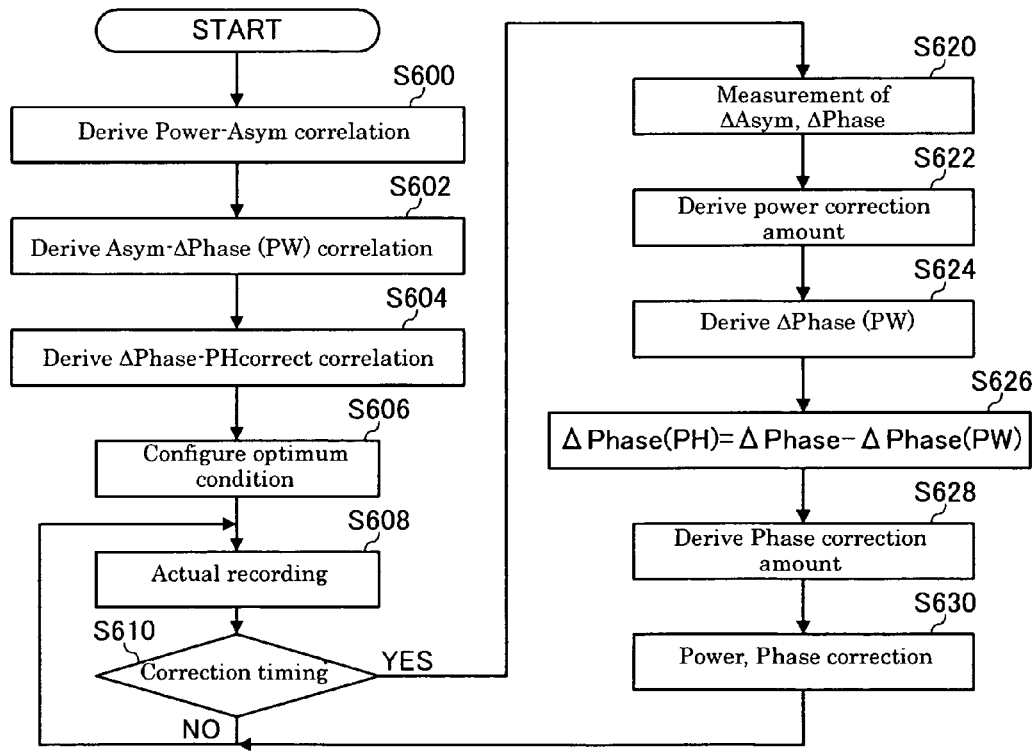
FIG. 59 is a flowchart showing an execution procedure of correcting conditions for a power and a phase of a recording pulse, which is predicted based on a test recording, upon an actual recording.

FIG. 59 is a flowchart showing an execution procedure of correcting conditions for a power and a phase of a recording pulse, which is predicted during an actual recording based on a test recording. As shown in the figure, by the test recording conducted prior to the actual recording, the correlation between a power and an asymmetry and the correlation between the asymmetry and a phase shift length are obtained (steps S600 to S604).

Subsequently, after configuring optimum conditions for the power and the phase (step S606), the actual recording is conducted using the optimum conditions (step S608). When a correction timing is reached during the actual recording (YES in step S610), a pattern recorded immediately before the correction timing is reproduced while pausing or conducting the recording, to measure a variation of the asymmetry ΔΔsym and a variation of the phase shift length ΔPhase (step S620).

Subsequently, by applying the variation of the asymmetry value ΔΔsym detected as above to the correlation derived in the step S600, a power correction amount PWcorrect is obtained (step S622). Further, by applying the variation of the asymmetry value ΔΔsym detected as above to the correlation derived in the step S602, a phase shift length ΔPhase (PW) due to the variation of an optimum power is obtained (step S624).

Subsequently, a phase shift length ΔPhase (PH) due to the other factor is obtained by subtracting the phase shift length ΔPhase (PW) due to the variation of an optimum power obtained in the step S624 from the phase shift length ΔPhase detected in the step S620.

Subsequently, the ΔPhase (PH) is applied to the correlation obtained in the step S604 to obtain a phase shift correction amount PHcorrect (step S628). Then, using the power correction amount PWcorrect obtained in the step S622 and the phase shift correction amount PHcorrect obtained in the step S628, the power and the phase of the recording pulse are respectively corrected (step S630), and the actual recording is conducted under the corrected condition (step S608).

Subsequently, while making the above-described correction of a recording condition at every correction timing of the step S610, the actual recording is conducted onto the recording area of the medium.

Figure 60:
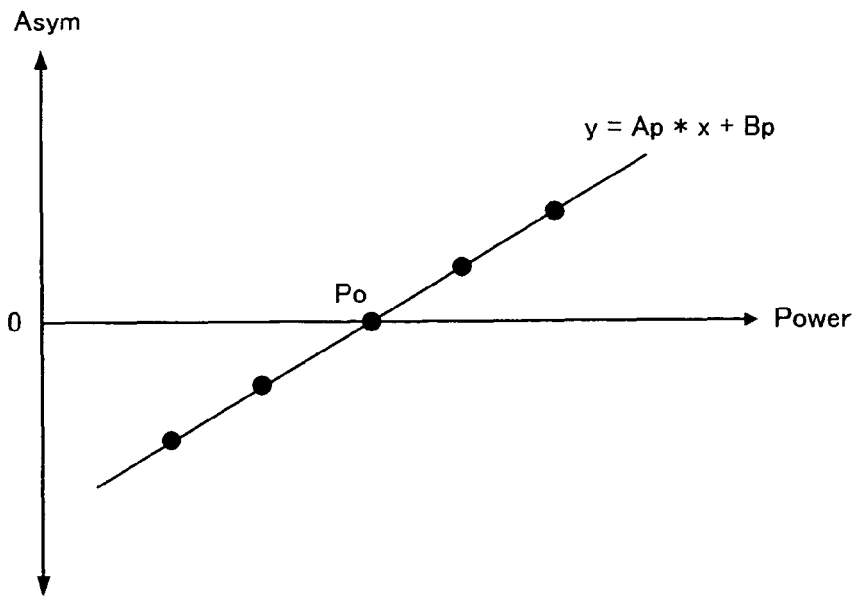
FIG. 60 is a graph showing an example of the correlation between a power and an asymmetry obtained in the step S600 of FIG. 59.

FIG. 60 is a graph showing an example of the correlation between the power and the asymmetry obtained in the step S600 shown in FIG. 59. As shown in the figure, to obtain the correlation between the power and the asymmetry, a variation in the asymmetry value is detected at several points within the test area provided on the inner circumference of the medium while varying the power of the recording pulse, to obtain an approximate function "y=Ap*x+Bp" representing the asymmetry variation with respect to the power variation. In this example, a power value with which the asymmetry value becomes zero is an optimum power Po.

Figure 61:
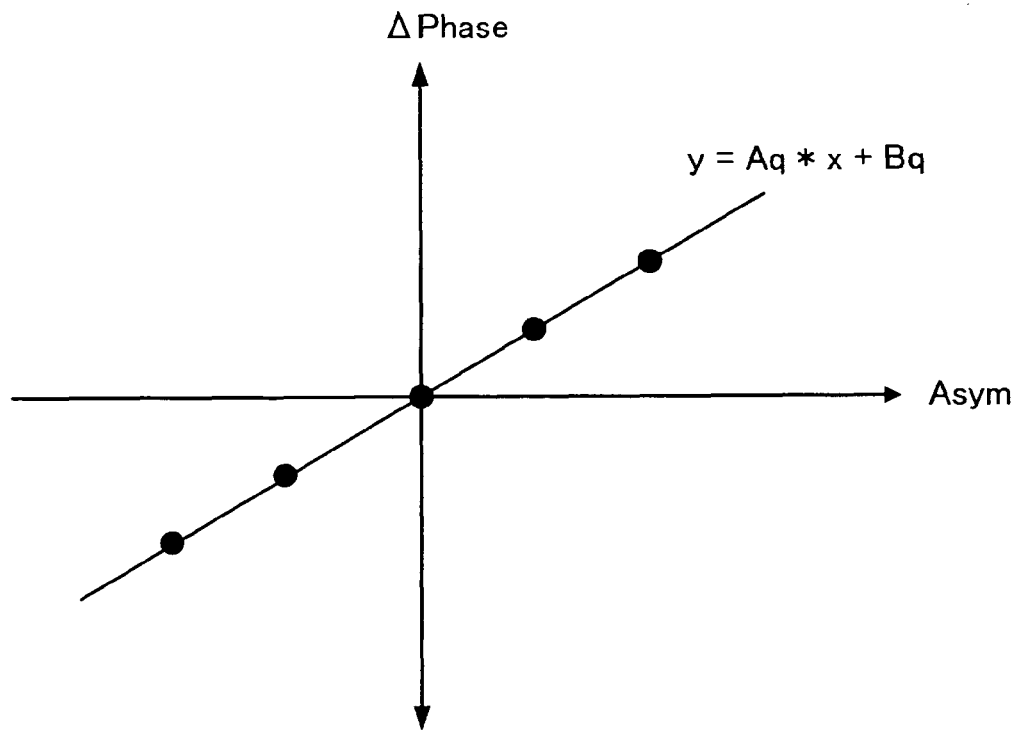
FIG. 61 is a graph showing an example of the correlation between an asymmetry and a phase shift length obtained in the step S602 of FIG. 59.

FIG. 61 is a graph showing an example of the correlation between the asymmetry and the phase shift length obtained in the step S602 shown in FIG. 59. As shown in the figure, to obtain the correlation between the asymmetry and the phase shift length, a variation in the phase shift length is detected at several points within the test area provided on the inner circumference of the medium while varying the power of the recording pulse, to obtain an approximate function "y=Aq*x+Bq" representing the phase shift length variation with respect to the asymmetry variation.

Figure 62:
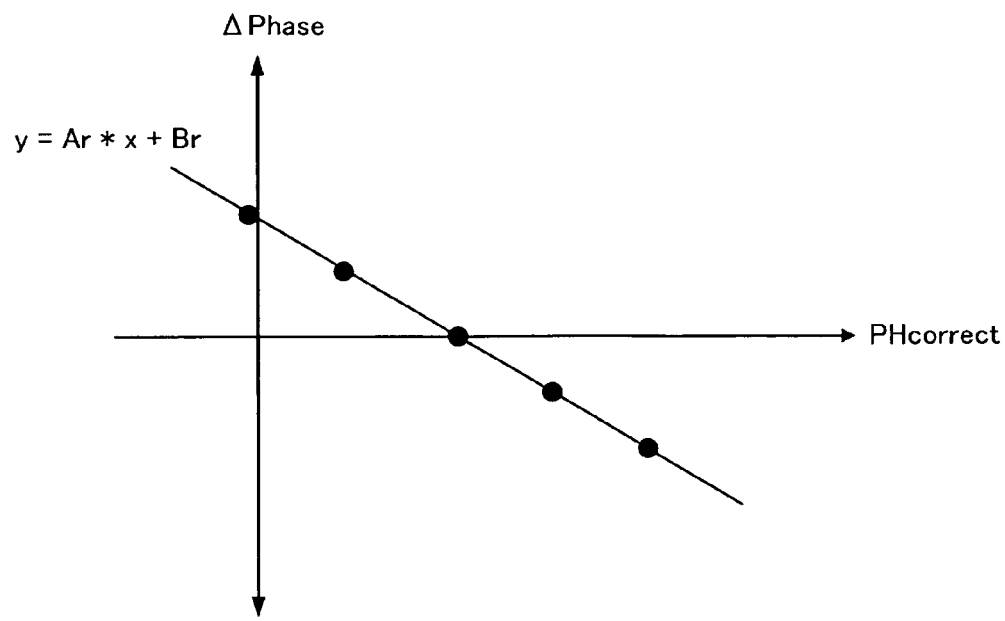
FIG. 62 is a graph showing an example of the correlation between a phase correction amount and a phase shift length obtained in the step S604 of FIG. 59.

FIG. 62 is a graph showing an example of the correlation between the phase correction amount and the phase shift length obtained in the step S604 shown in FIG. 59. As shown in the figure, to obtain the correlation between the phase correction amount and the phase shift length, a variation in the phase shift length is detected at several points within the test area provided on the inner circumference of the medium while varying the phase of the recording pulse, to obtain an approximate function "y=Ar*x+Br" representing the phase shift length with respect to the phase correction amount.

Figure 63:
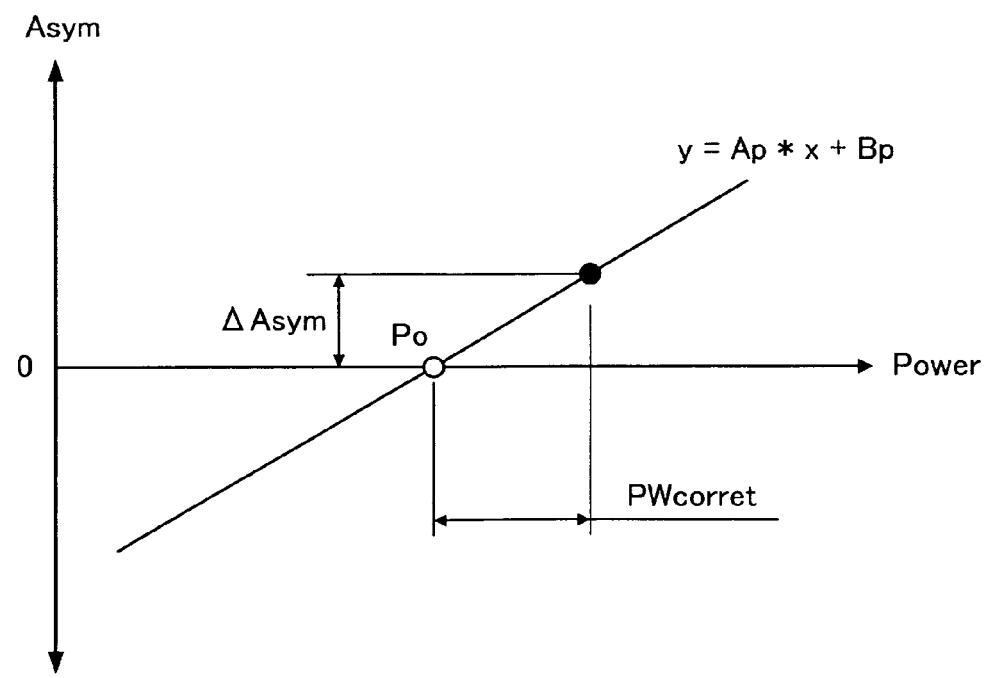
FIG. 63 is a graph showing an example of deriving a power correction amount conducted in the step S622 of FIG. 59.

FIG. 63 is a graph showing an example of deriving the power correction amount conducted in the step S622 of FIG. 59. As shown in the figure, to obtain the power correction amount, the variation amount of the asymmetry ΔΔsym detected in the step S620 is applied to the correlation function between the power and the asymmetry obtained in the step S600 to obtain the power correction amount PWcorrect for determining an optimum power Po.

Figure 64:
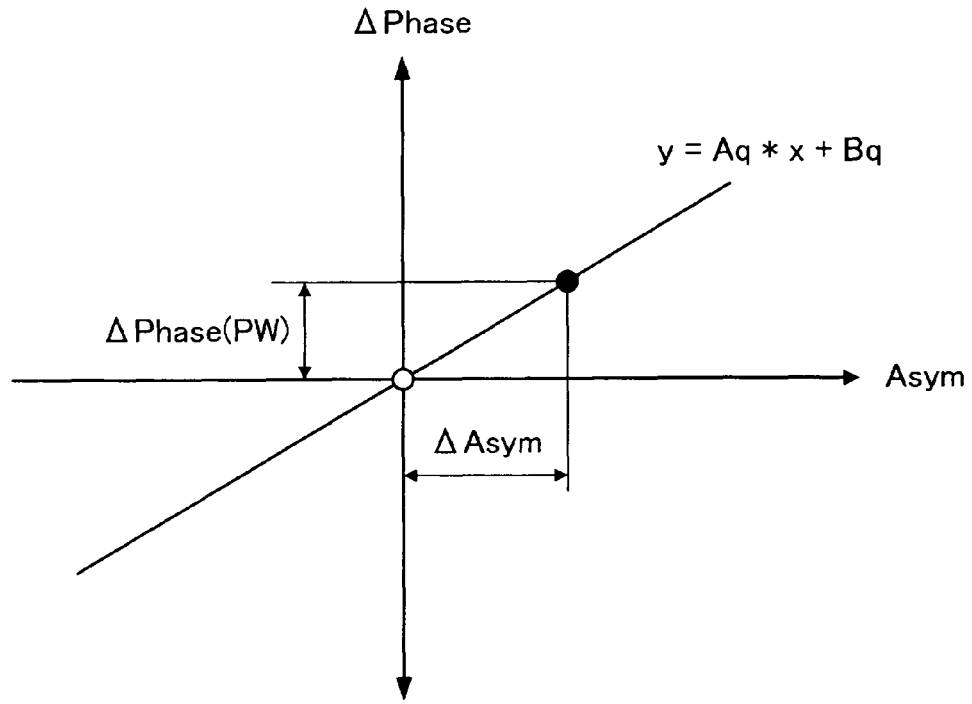
FIG. 64 is a graph showing an example of deriving a phase shift length due to a variation of an optimum power conducted in the step S624 of FIG. 59.

FIG. 64 is a graph showing an example of deriving the phase shift length due to the variation of an optimum power conducted in the step S624 shown in FIG. 59. As shown in the figure, to obtain the phase shift length due to the variation of an optimum power, the variation amount of the asymmetry ΔΔsym detected in the step S620 is applied to the correlation function between the asymmetry and the phase shift length obtained in the step S602 to obtain the phase shift length ΔPhase (PW) due to the variation of an optimum power.

Figure 65:
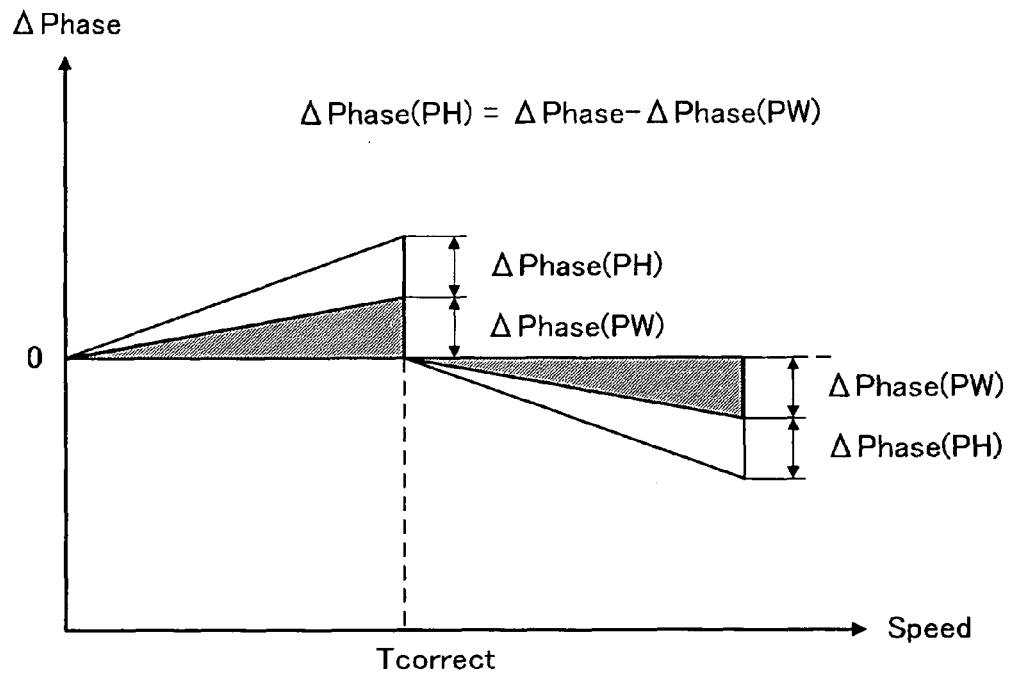
FIG. 65 is a graph showing an example of deriving a phase shift length due to a variation of a factor other than a power conducted in the step S626 of FIG. 59.

FIG. 65 is a graph showing an example of deriving the phase shift length due to any variation other than the power variation, conducted in the step S626 shown in FIG. 59. As shown in the figure, the phase shift length ΔPhase detected in the step S620 is comprised of the phase shift length ΔPhase (PW) due to the variation of an optimum power and the phase shift length ΔPhase (PH) due to the other factor.

Accordingly, by subtracting the phase shift length ΔPhase (PW) represented by a hatched area in the graph from the phase shift length ΔPhase obtained in the step S620, the phase shift length ΔPhase (PH) due to a factor other than the power can be obtained.

Figure 66:
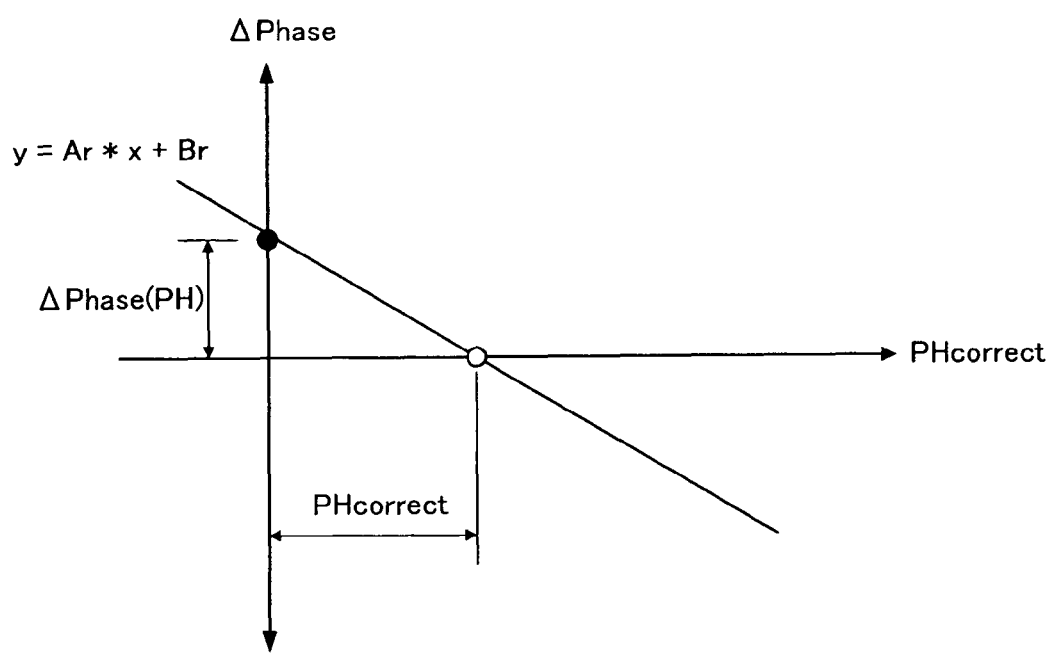
FIG. 66 is a graph showing an example of deriving a phase correction amount conducted in the step S628 of FIG. 59.

FIG. 66 is a graph showing an example of deriving the phase correction amount conducted in the step S628 shown in FIG. 59. As shown in the figure, to obtain the phase shift correction amount, the phase shift length ΔPhase (PH) obtained in the step S626 is applied to the correlation function between the phase shift correction amount and the phase shift length obtained in the step S604 to obtain the phase correction amount Phcorrect.

Certain inventive aspects enable a recording condition closer to an optimum to be obtained even for a medium that is unknown to a drive, resulting in the accommodation of severer recording environments.

What is claimed is:

1. An optical information recording device for forming a recording pattern comprising a pit and a land onto an optical recording medium by irradiating a laser beam based on a recording pulse, the optical information recording device comprising:
    a recording apparatus configured to generate optimum conditions for a power and a phase of the recording pulse by a test recording onto the medium;
    a recording apparatus configured to detect recording states of a pit and a land formed by an actual recording onto the medium;
    a circuit configured to detect a power shift amount from the optimum condition based on the detected recording states;
    a circuit configured to detect phase shift lengths of the pit and the land based on the detected recording states;
    a circuit configured to derive correction amounts for the generated power and the generated phase of the recording pulse from the detected recording states;
    a circuit configured to correct the power and the phase of the recording pulse based on the derived correction amounts;
    a circuit configured to subtract an amount affected by the power shift amount from the detected phase shift length;
    a circuit configured to correct the optimum condition for the phase based on a phase shift length from which the amount affected by the power shift amount is subtracted; and
    a circuit configured to correct the optimum condition for the power based on the detected power shift amount.

2. An optical information recording device for forming a recording pattern comprising a pit and a land onto an optical recording medium by irradiating a laser beam based on a recording pulse, the optical information recording device comprising:
    a recording apparatus configured to obtain a correlation between metrics of a power condition and a phase condition for the recording pulse by a test recording onto the medium;
    a recording apparatus configured to generate optimum conditions for the power and the phase of the recording pulse by a test recording onto the medium based on each of the metrics;
    a circuit configured to detect recording states of a pit and a land formed by an actual recording onto the medium;
    a circuit configured to detect a power shift amount from the optimum condition based on the detected recording states;
    a circuit configured to detect phase shift lengths of the pit and the land based on the detected recording, states;
    a circuit configured to derive correction amounts for the generated power and the generated phase of the recording pulse from the detected recording states;
    a circuit configured to correct the power and the phase of the recording pulse based on the derived correction amounts;
    a circuit configured to subtract an amount affected by the power shift amount from the detected phase shift length by using the correlation;
    a circuit configured to correct the optimum condition for the phase based on a phase shift length from which the amount affected by the power shift amount is subtracted; and
    a circuit configured to correct the optimum condition for the power based on the detected power shift amount.

3. An optical information recording method for forming a recording pattern comprising a pit and a land onto an optical recording medium by irradiating a laser beam based on a recording pulse, the optical information recording method comprising:
    configuring optimum conditions for a power and a phase of the recording pulse by a test recording onto the medium;
    detecting recording states of a pit and a land fonned by an actual recording onto the medium;
    detecting a power shift amount from the optimum condition based on the detected recording states;
    detecting phase shift lengths of the pit and the land based on the detected recording states;
    deriving correction amounts for the configured power and the configured phase of the recording pulse based on the detected recording states;
    correcting the power and the phase of the recording pulse based on the derived correction amounts;
    subtracting an amount affected by the power shift amount from the detected phase shift lengths; and
    correcting the optimum condition for the phase based on a phase shift length from which the amount affected by the power shift amount is subtracted.

4. An optical information recording method for forming a recording pattern comprising a pit and a land onto an optical recording medium by irradiating a laser beam based on a recording pulse, the optical information recording method comprising:
    obtaining a correlation between metrics of a power condition and a phase condition for the recording pulse by a test recording onto the medium;
    configuring optimum conditions for the power and the phase of the recording pulse by a test recording onto the medium based on each of the metrics;
    detecting the recording states of a pit and a land formed by an actual recording onto the medium;
    detecting a power shift amount from the optimum condition based on the detected recording states;
    detecting phase shift lengths of the pit and the land based on the detected recording states;
    deriving correction amounts for the configured power and the configured phase of the recording pulse based on the detected recording states;
    correcting the power and the phase of the recording pulse based on the derived correction amounts;
    subtracting an amount affected by the power shift amount from the detected phase shift lengths; and
    correcting the optimum condition for the phase based on a phase shift length from which the amount affected by the power shift amount is subtracted.

5. A signal processing circuit adapted for incorporation in an optical information recording device for forming a recording pattern comprising a pit and a land onto an optical recording medium by irradiating a laser beam based on a recording pulse, the signal processing circuit including elements to perform each respective step of the method of claim 3.

6. A signal processing circuit adapted for incorporation in an optical information recording device for forming a recording pattern comprising a pit and a land onto an optical recording medium by irradiating a laser beam based on a recording pulse, the signal processing circuit including elements to perform each respective step of the method of claim 4.

* * * * *